Figure 1:
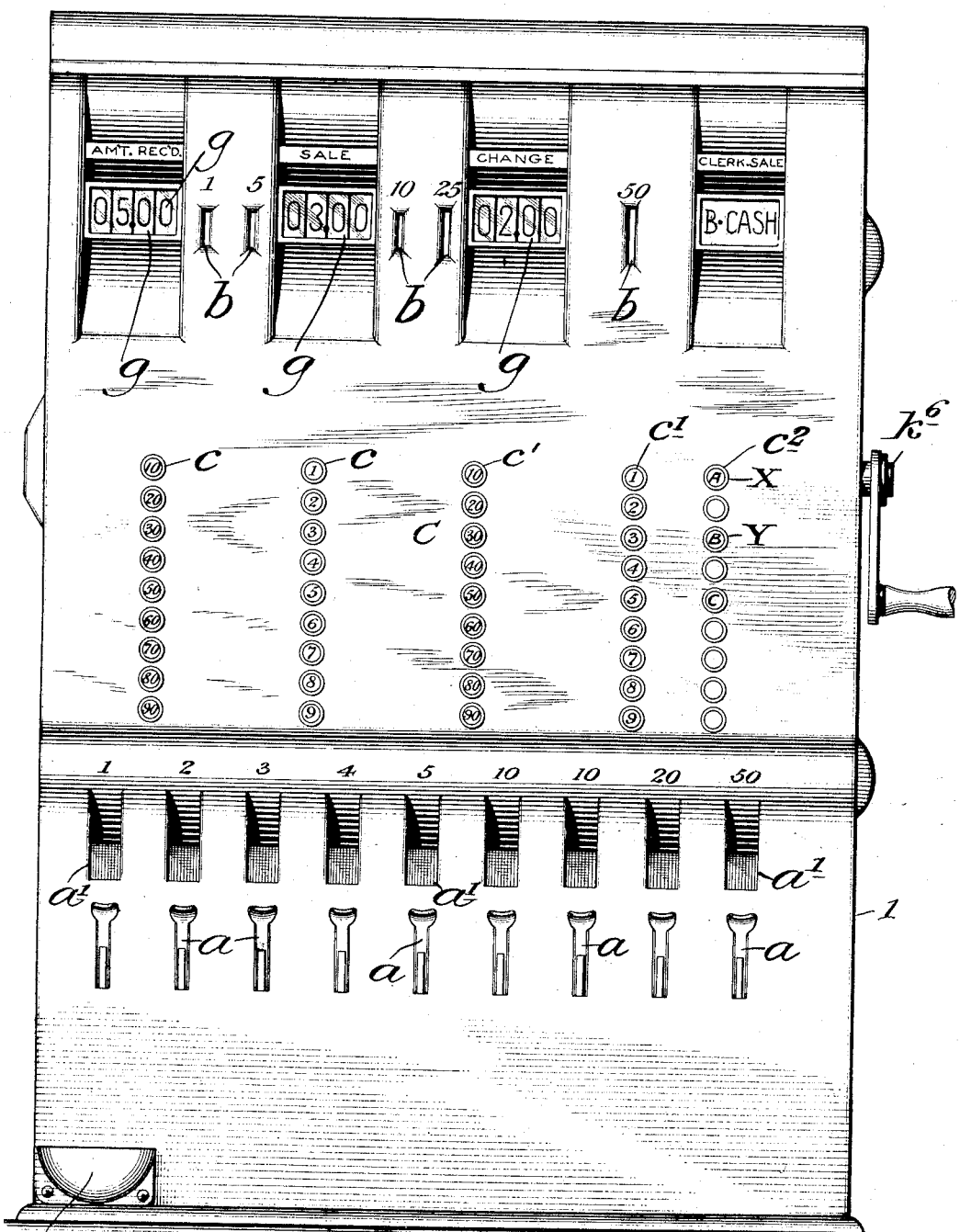

M. P. MORRISON.
CASH REGISTERING, CHANGE MAKING, AND RECORDING AND ACCOUNTING MACHINE.
APPLICATION FILED FEB. 8, 1907.

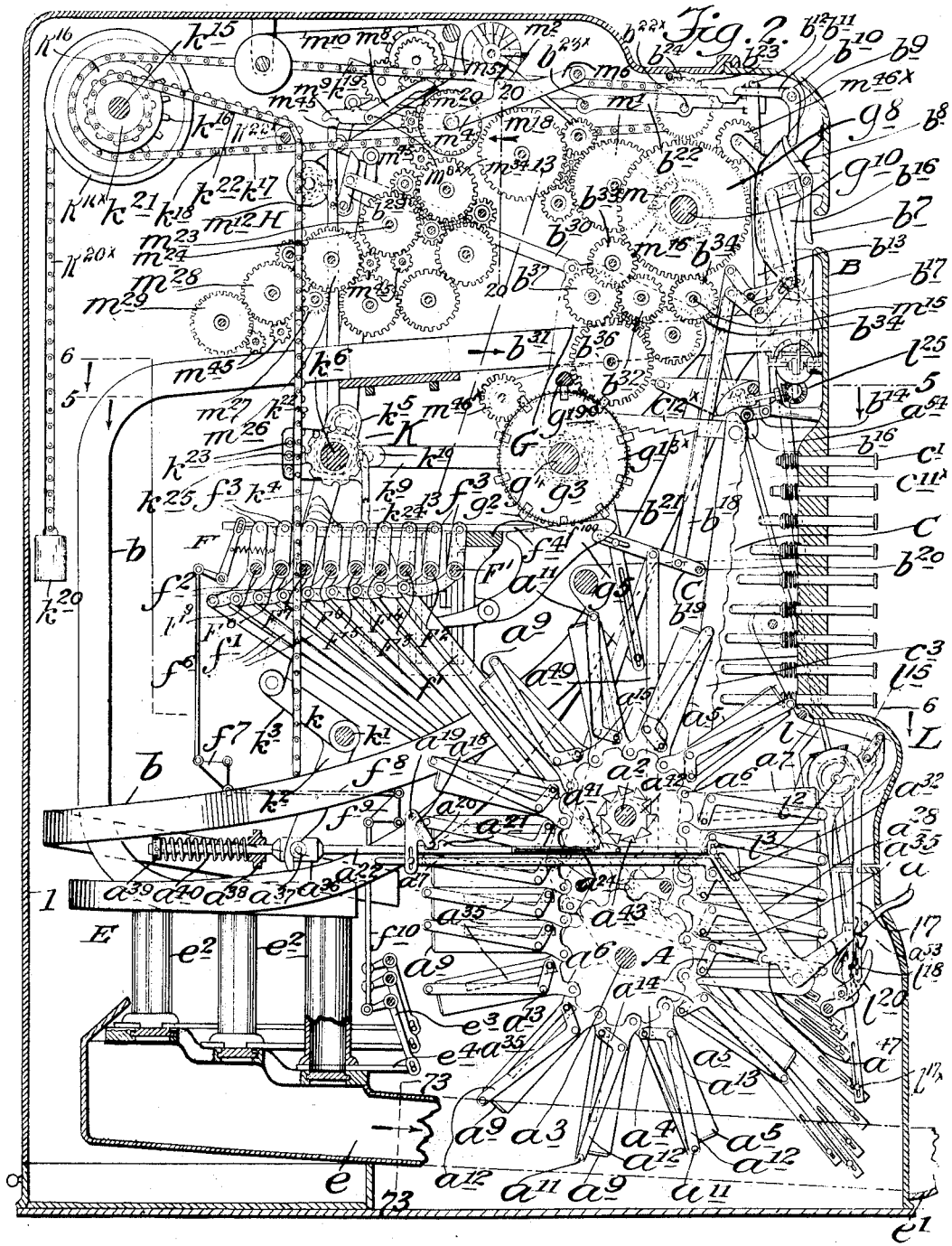
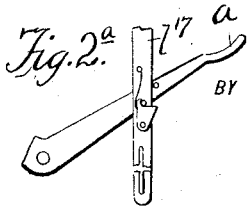

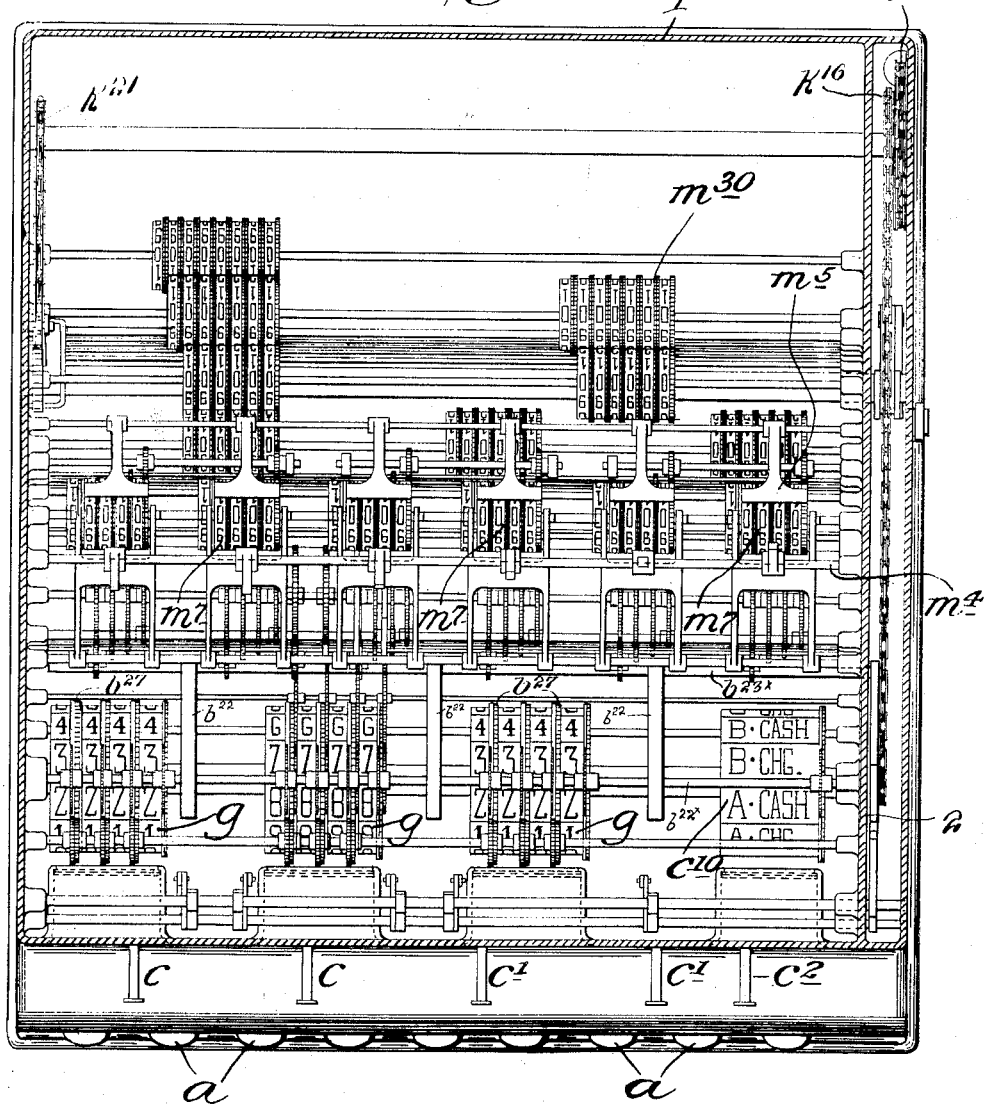

M. P. MORRISON.
CASH REGISTERING, CHANGE MAKING, AND RECORDING AND ACCOUNTING MACHINE.
APPLICATION FILED FEB. 8, 1907.
977,393.
Patented Nov. 29, 1910.
25 SHEETS—SHEET 5.
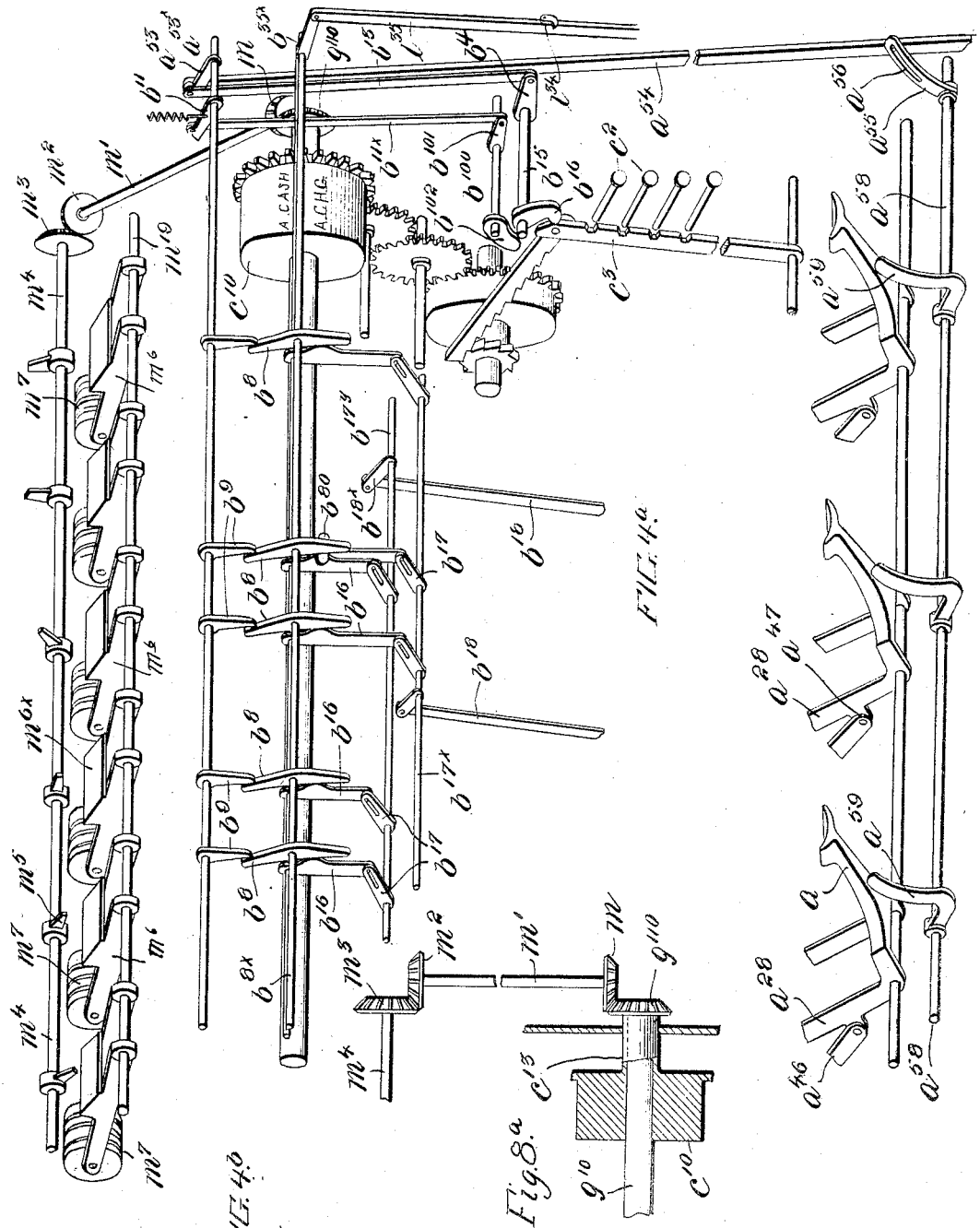
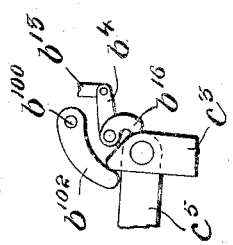

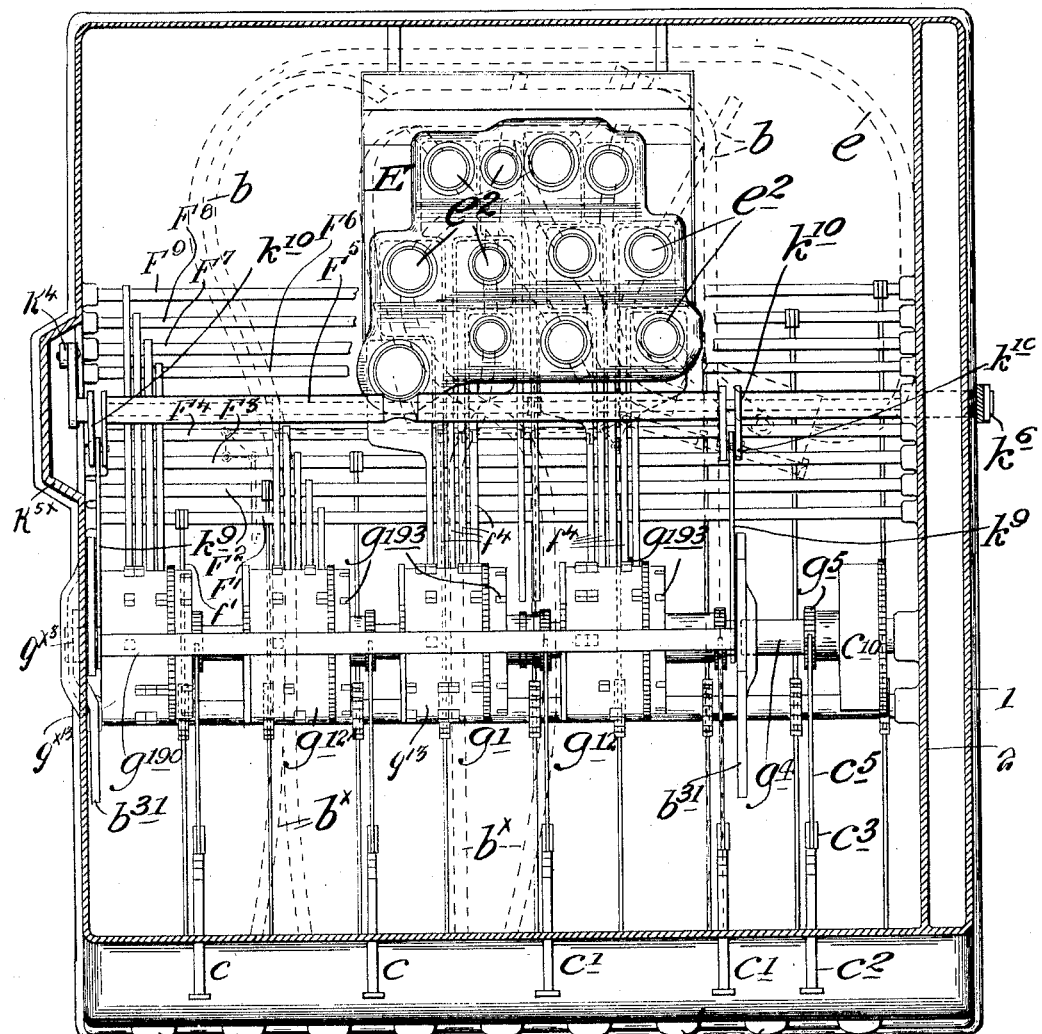

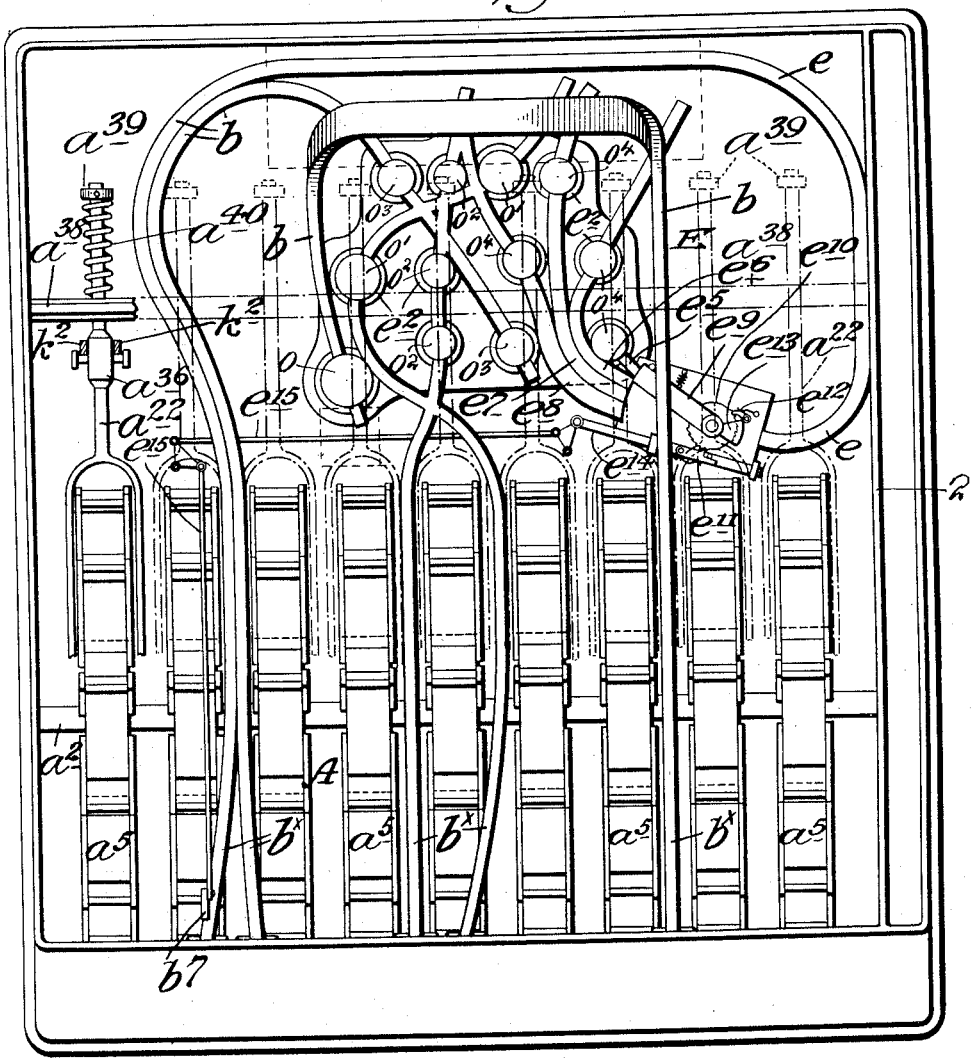

M. P. MORRISON.
CASH REGISTERING, CHANGE MAKING, AND RECORDING AND ACCOUNTING MACHINE.
APPLICATION FILED FEB. 8, 1907.
977,393.
Patented Nov. 29, 1910.
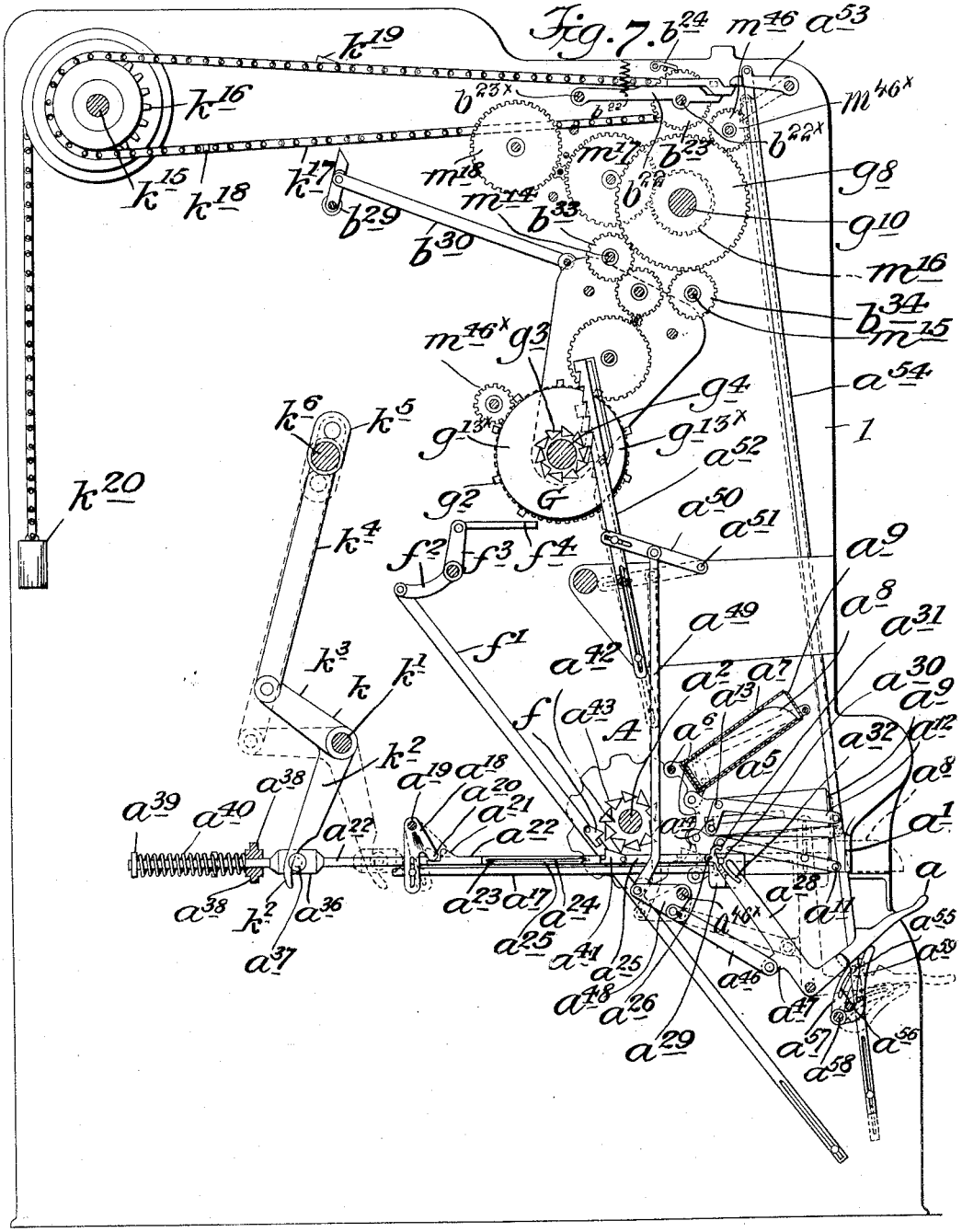
INVENTOR
Montford P. Morrison.
BY Edgar Tate & Co.
ATTORNEYS.

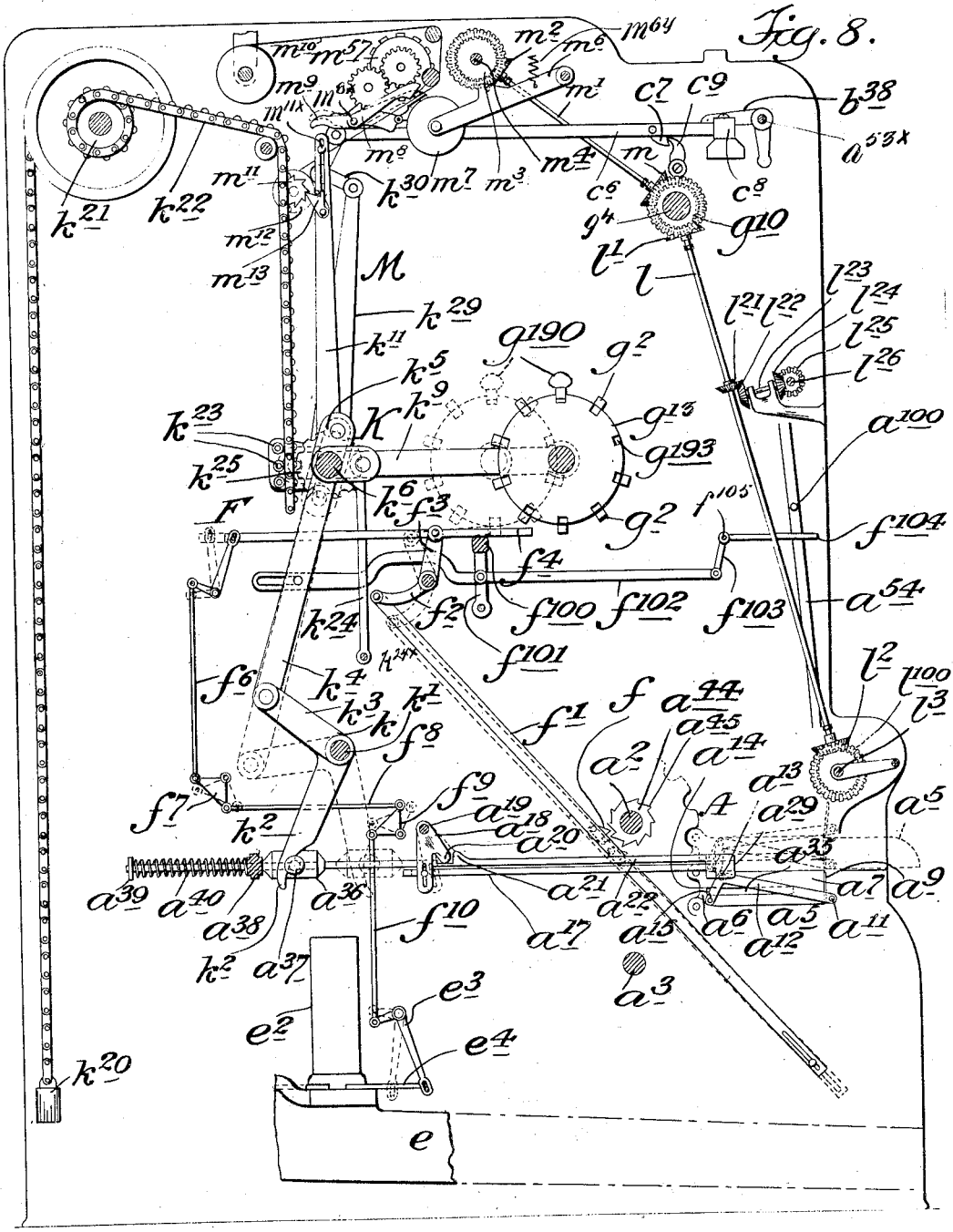

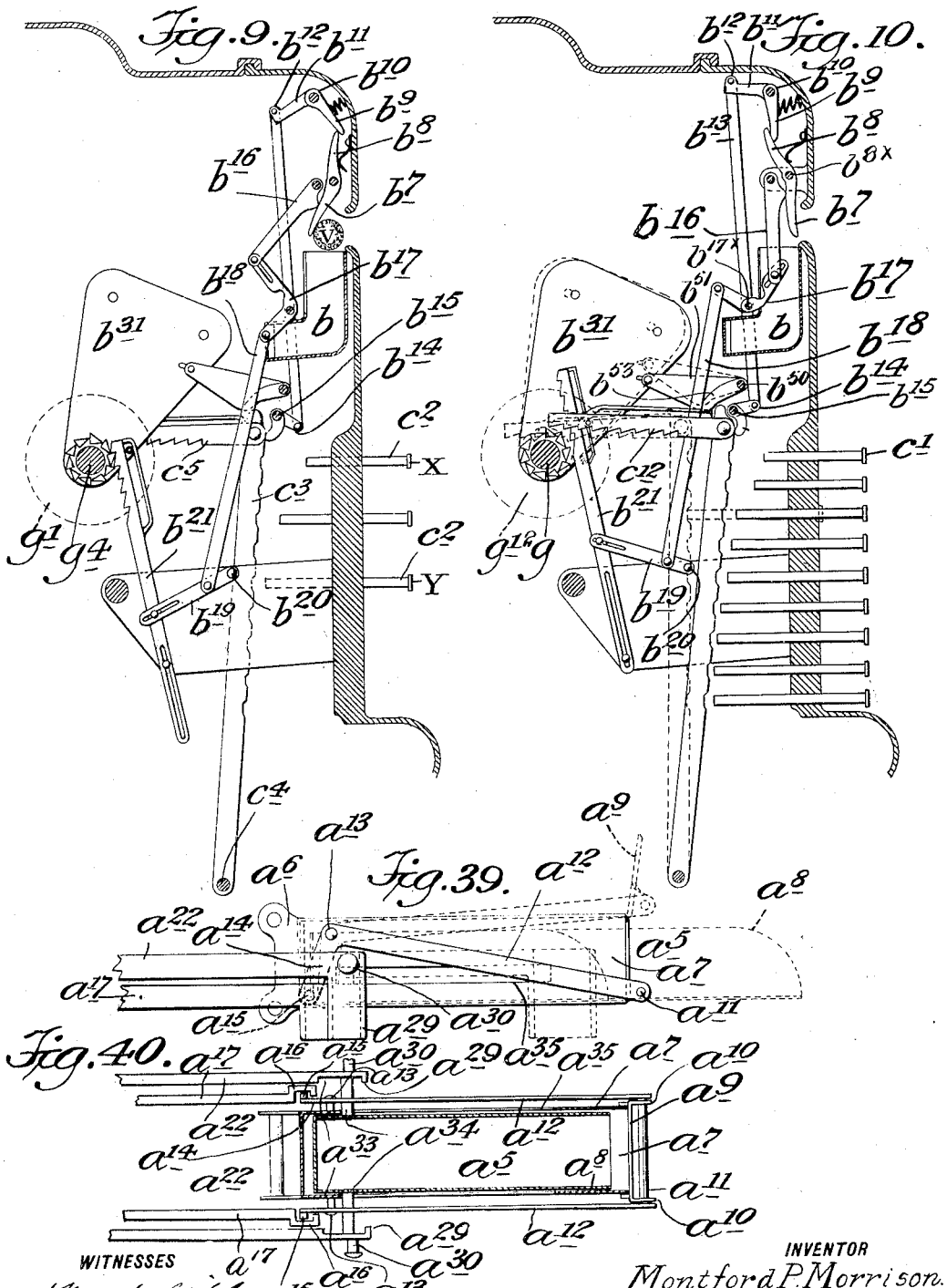

M. P. MORRISON.
CASH REGISTERING, CHANGE MAKING, AND RECORDING AND ACCOUNTING MACHINE.
APPLICATION FILED FEB. 8, 1907.
977,393.
Patented Nov. 29, 1910.
25 SHEETS—SHEET 11.
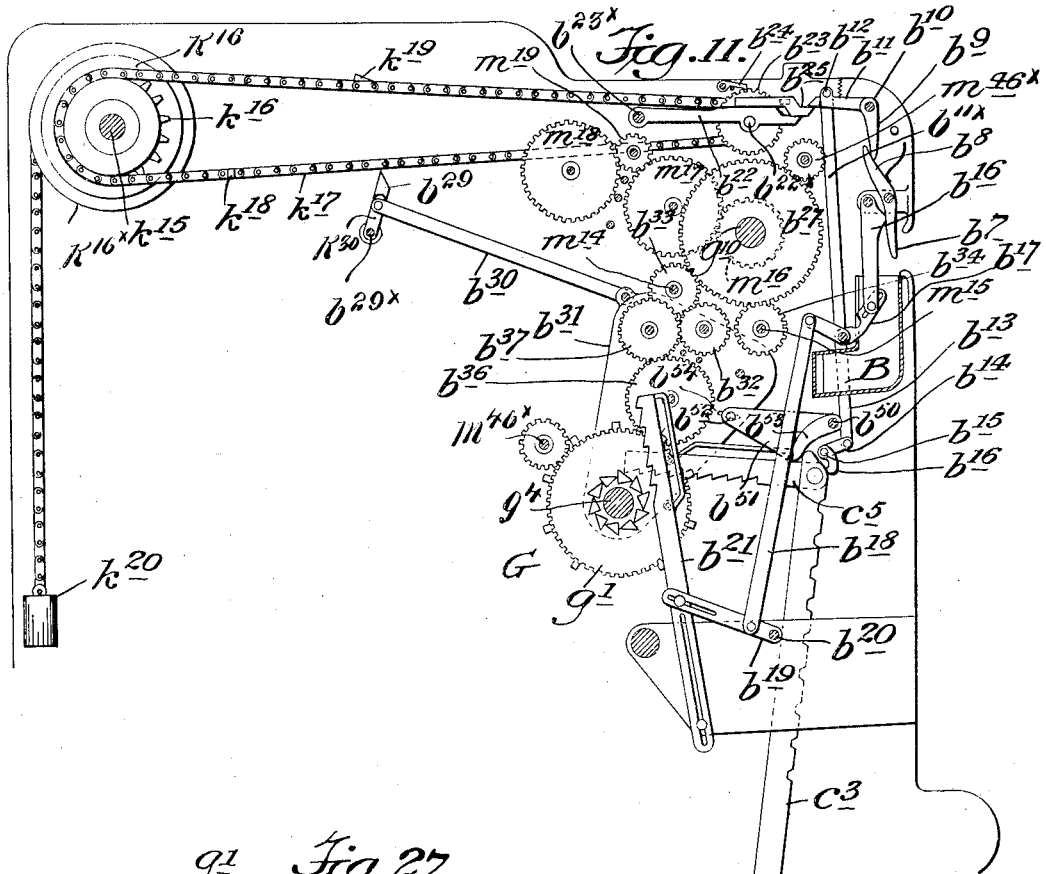
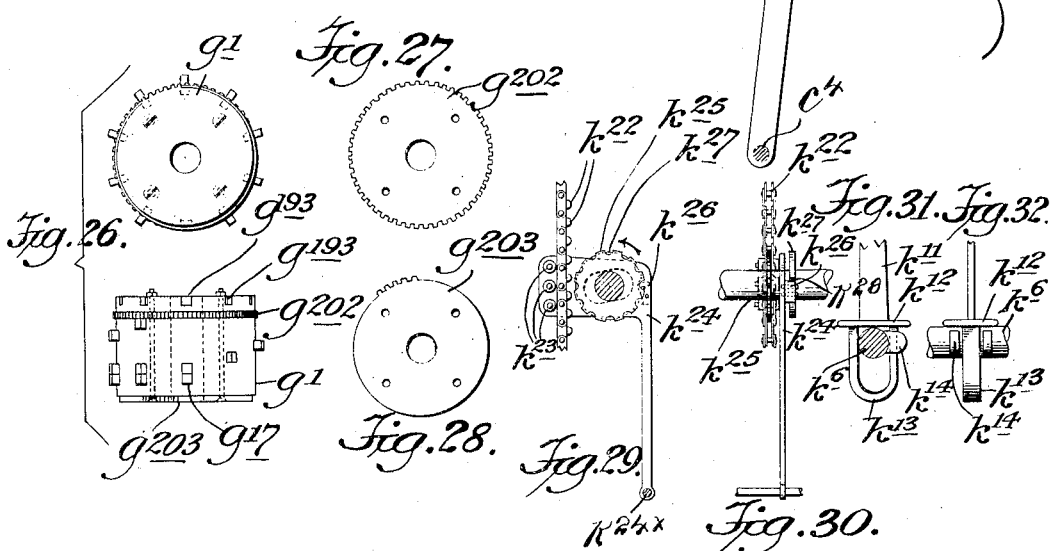
WITNESSES
INVENTOR
Montford P. Morrison.
BY
ATTORNEYS.

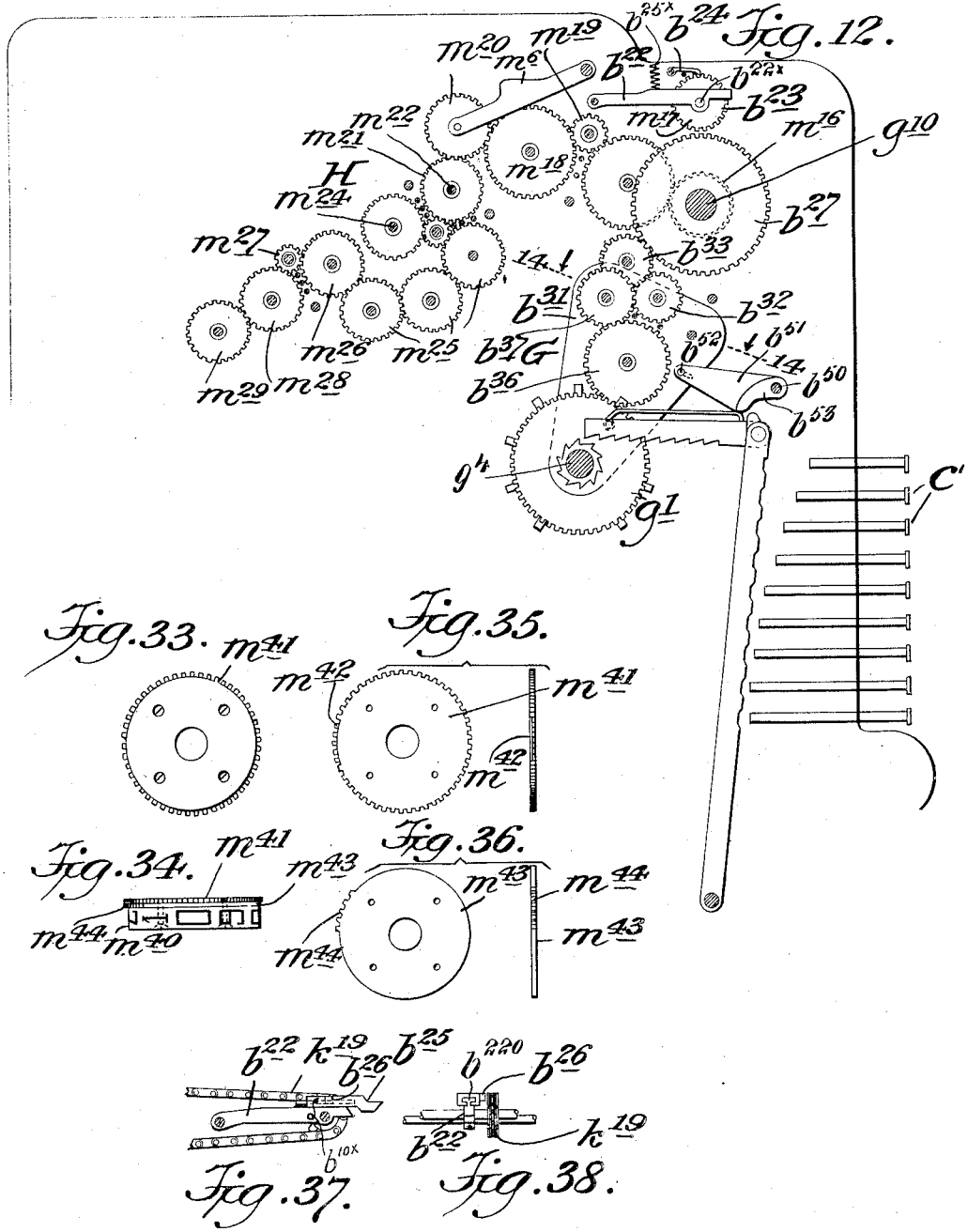

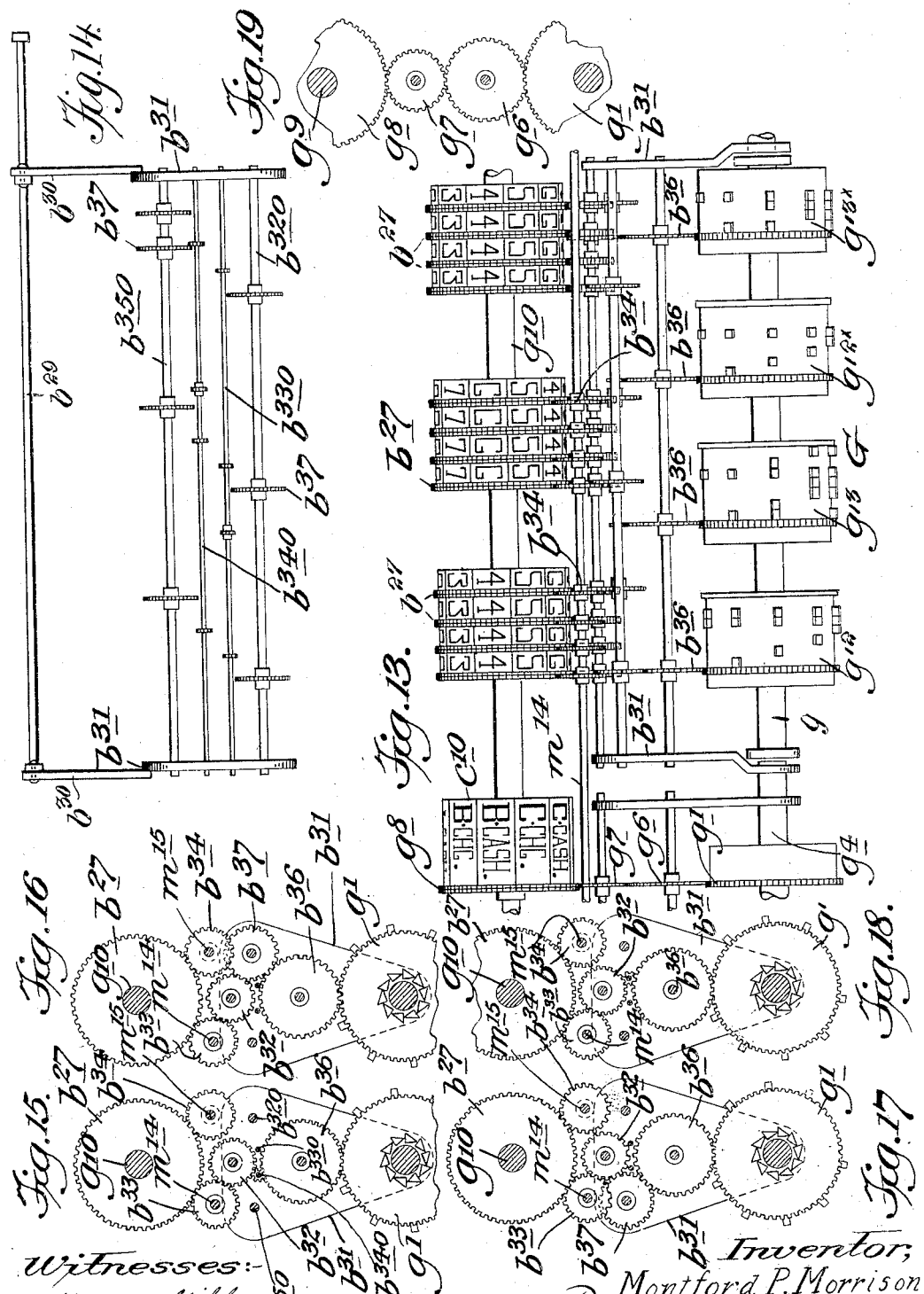

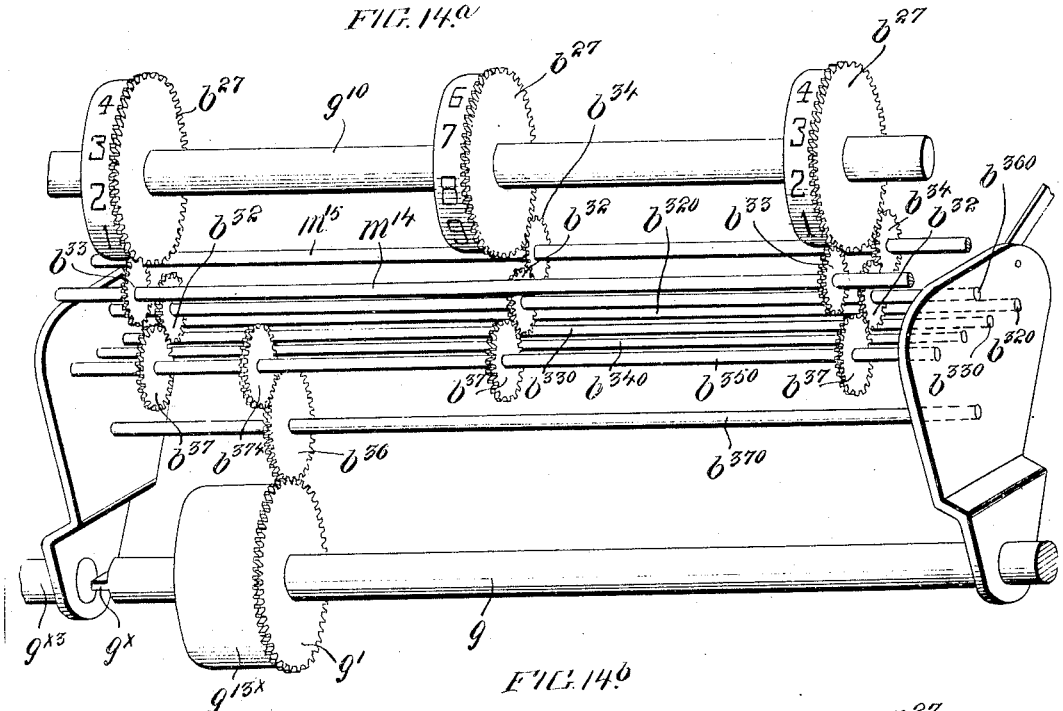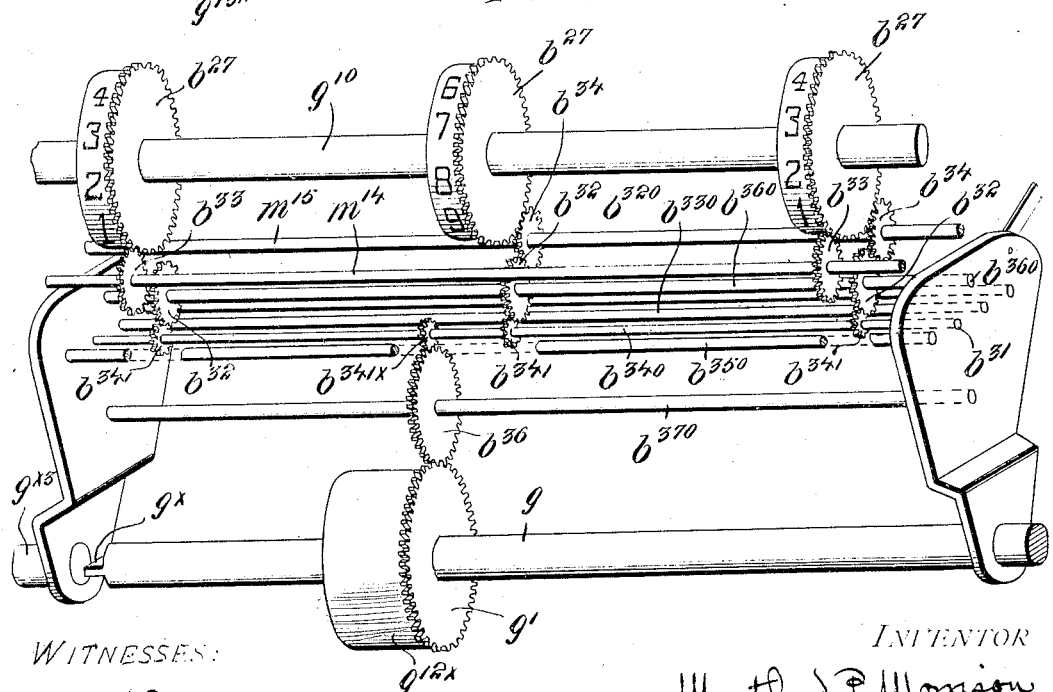

M. P. MORRISON.
CASH REGISTERING, CHANGE MAKING, AND RECORDING AND ACCOUNTING MACHINE.
APPLICATION FILED FEB. 8, 1907.

977,393.

Patented Nov. 29, 1910.
25 SHEETS—SHEET 15.

WITNESSES

INVENTOR
Montford P. Morrison.
BY Edgar Tate & Co.
ATTORNEYS

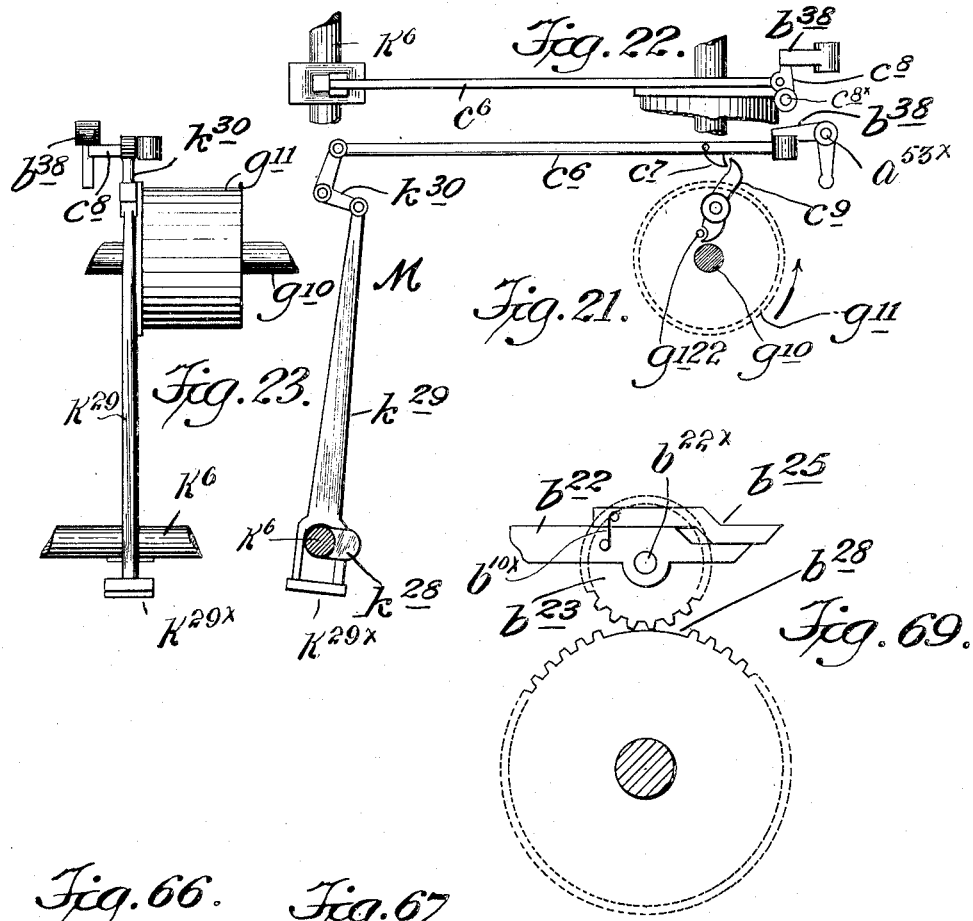

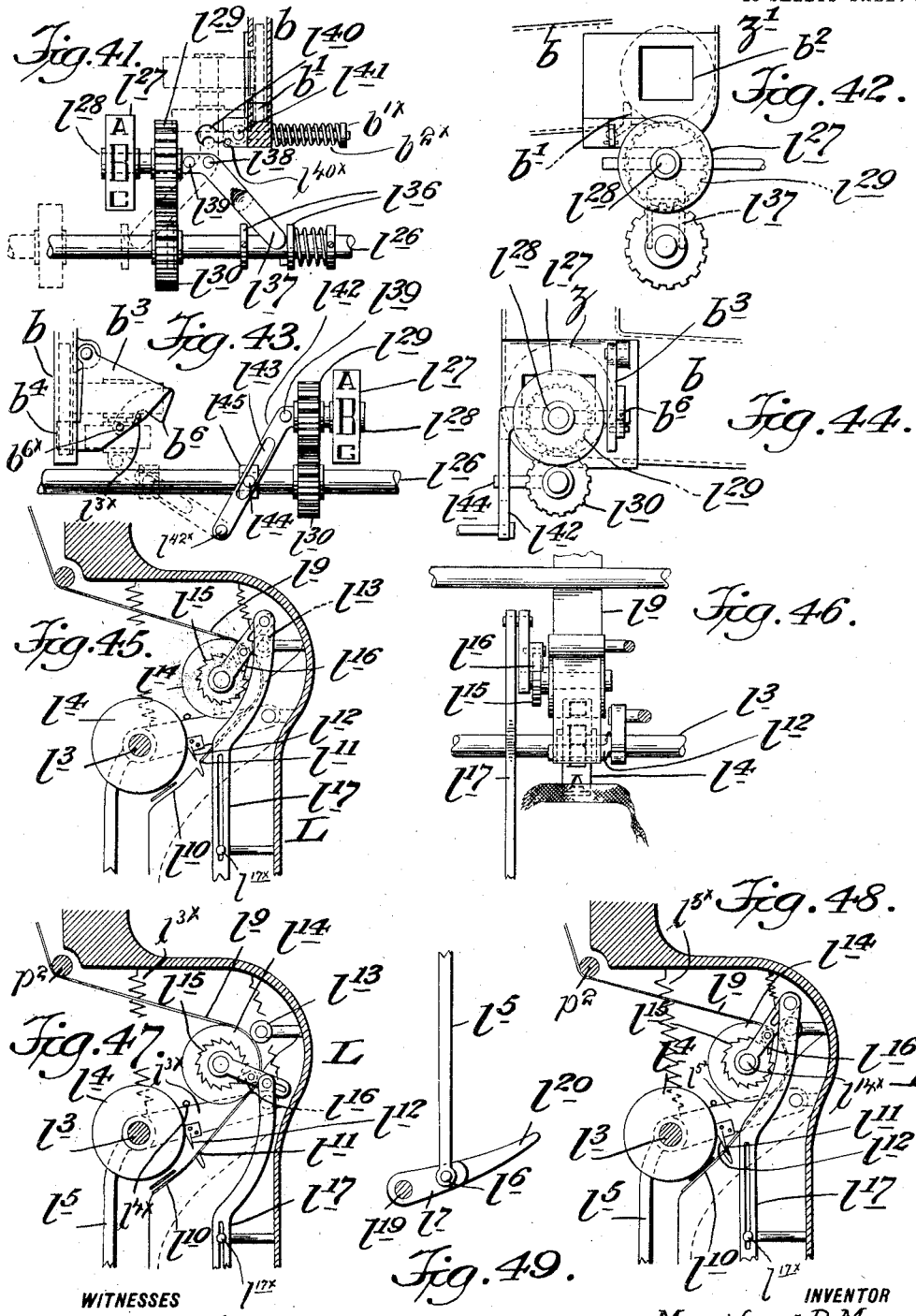

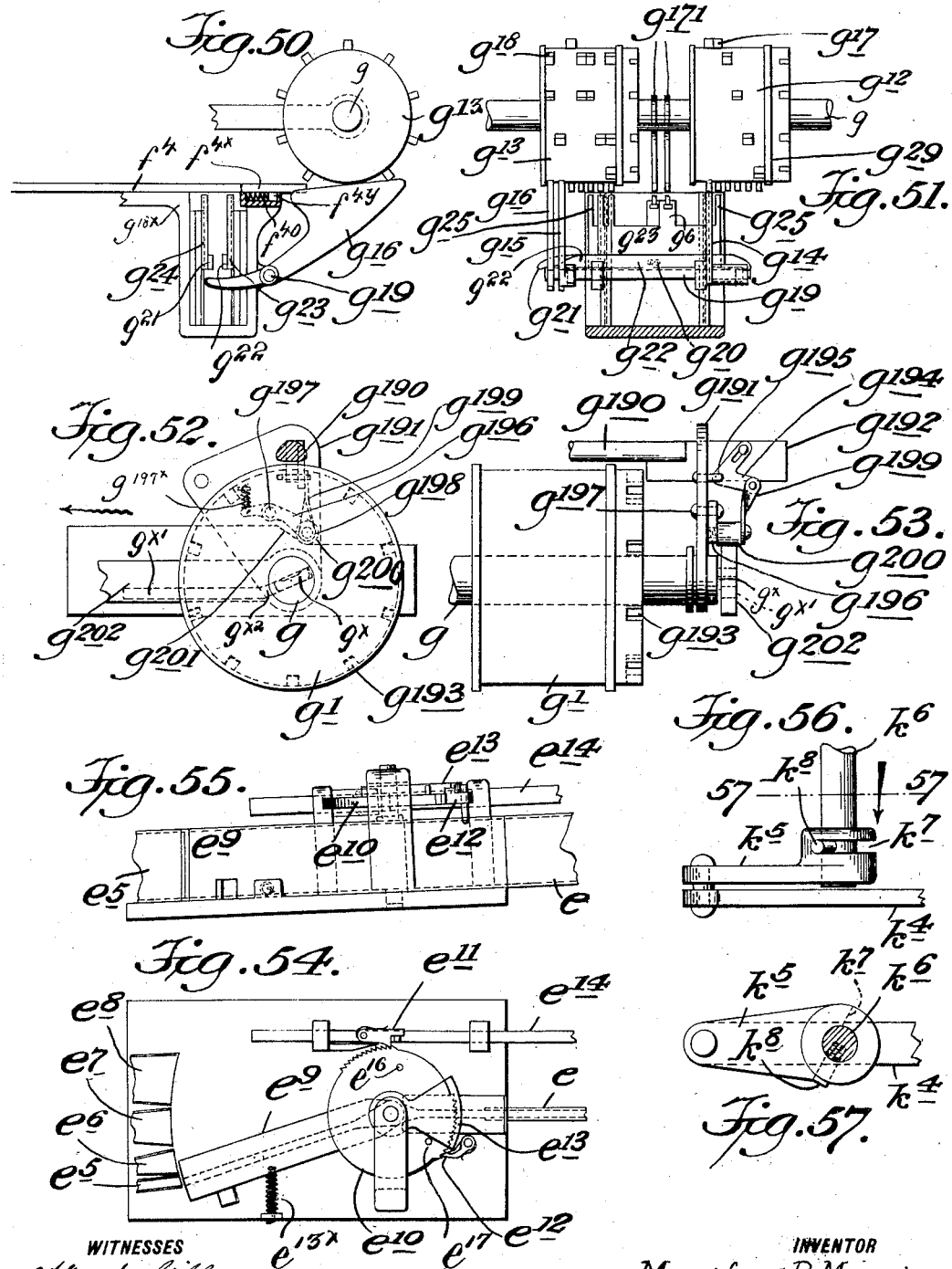

M. P. MORRISON.
CASH REGISTERING, CHANGE MAKING, AND RECORDING AND ACCOUNTING MACHINE.
APPLICATION FILED FEB. 8, 1907.
977,393.
Patented Nov. 29, 1910.
25 SHEETS—SHEET 19.
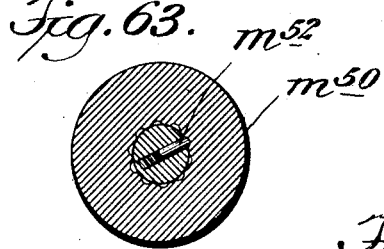
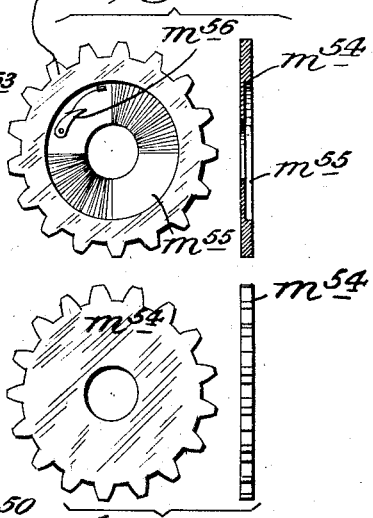
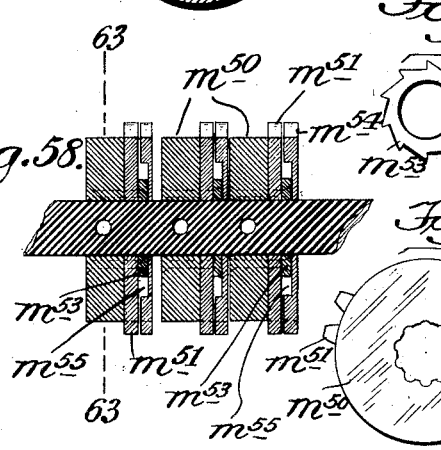
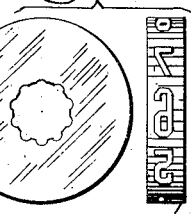
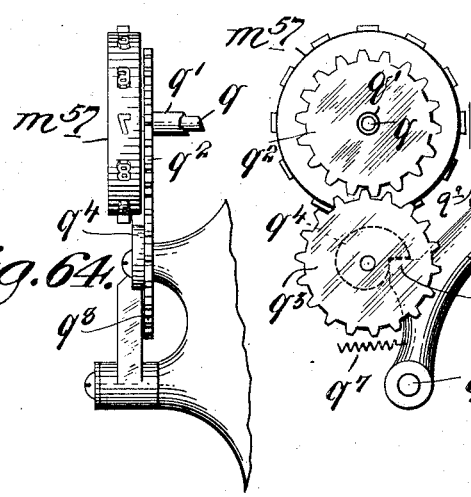
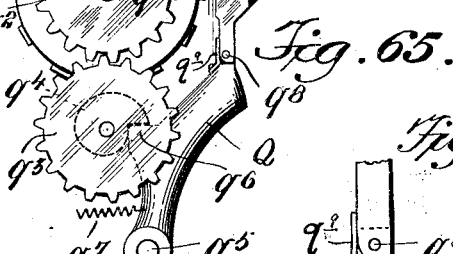
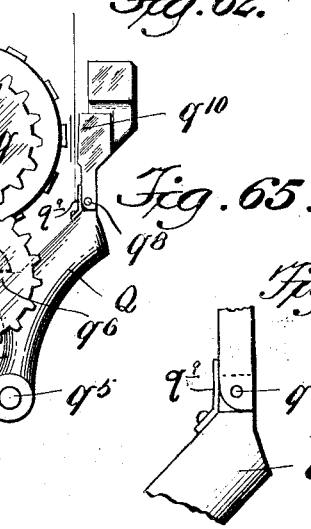
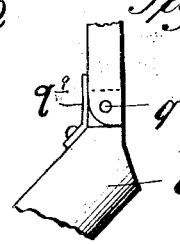
WITNESSES
INVENTOR
Montford P. Morrison.
BY
ATTORNEYS M. P. MORRISON.
CASH REGISTERING, CHANGE MAKING, AND RECORDING AND ACCOUNTING MACHINE.
APPLICATION FILED FEB. 8, 1907.

977,393.

Patented Nov. 29, 1910.
25 SHEETS—SHEET 20.

Fig. 70.

$m^{10x}$

JOHN DOE & CO.

DEPT. F.

JAN., 1, 1907.

| A | | B | | C | | |
|---|---|---|---|---|---|---|
| CHARGE | CASH | CHARGE | CASH | CHARGE | CASH | TIME |
| | | | | | | |

WITNESSES

INVENTOR
Montford P. Morrison.
BY
ATTORNEYS

M. P. MORRISON.
CASH REGISTERING, CHANGE MAKING, AND RECORDING AND ACCOUNTING MACHINE.
APPLICATION FILED FEB. 8, 1907.
977,393.
Patented Nov. 29, 1910.
25 SHEETS—SHEET 21.
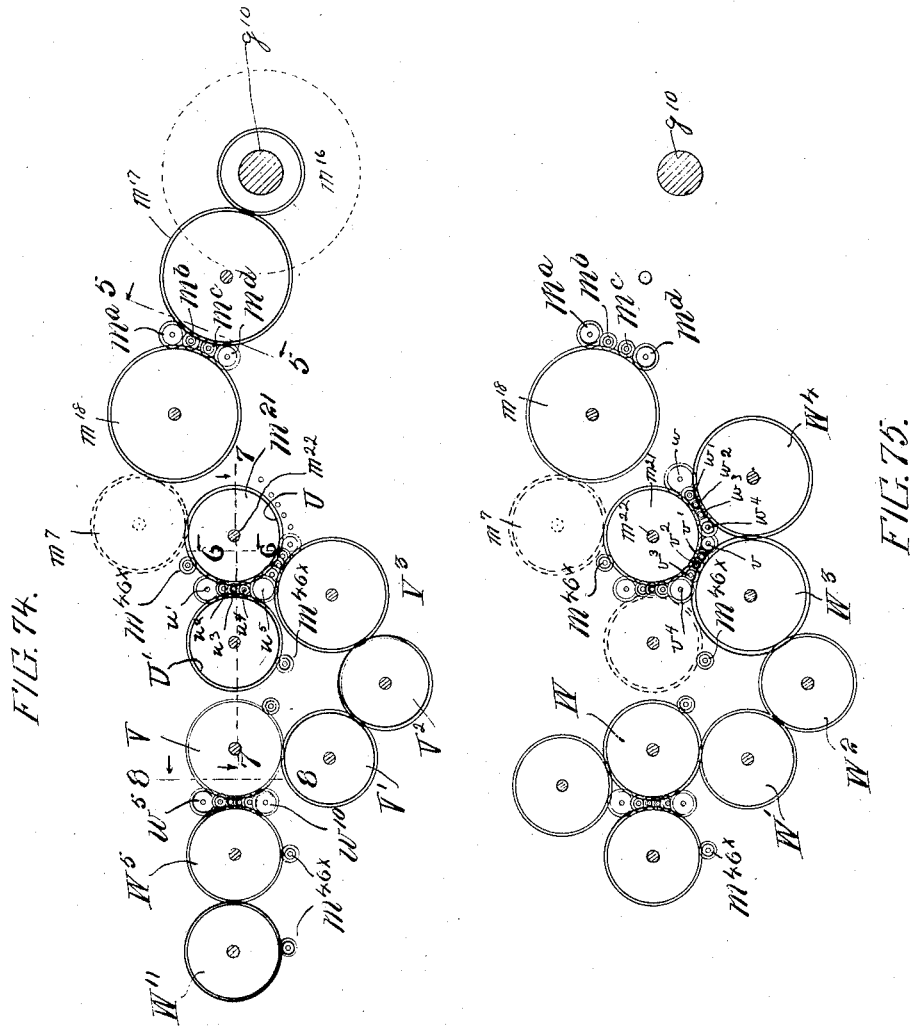

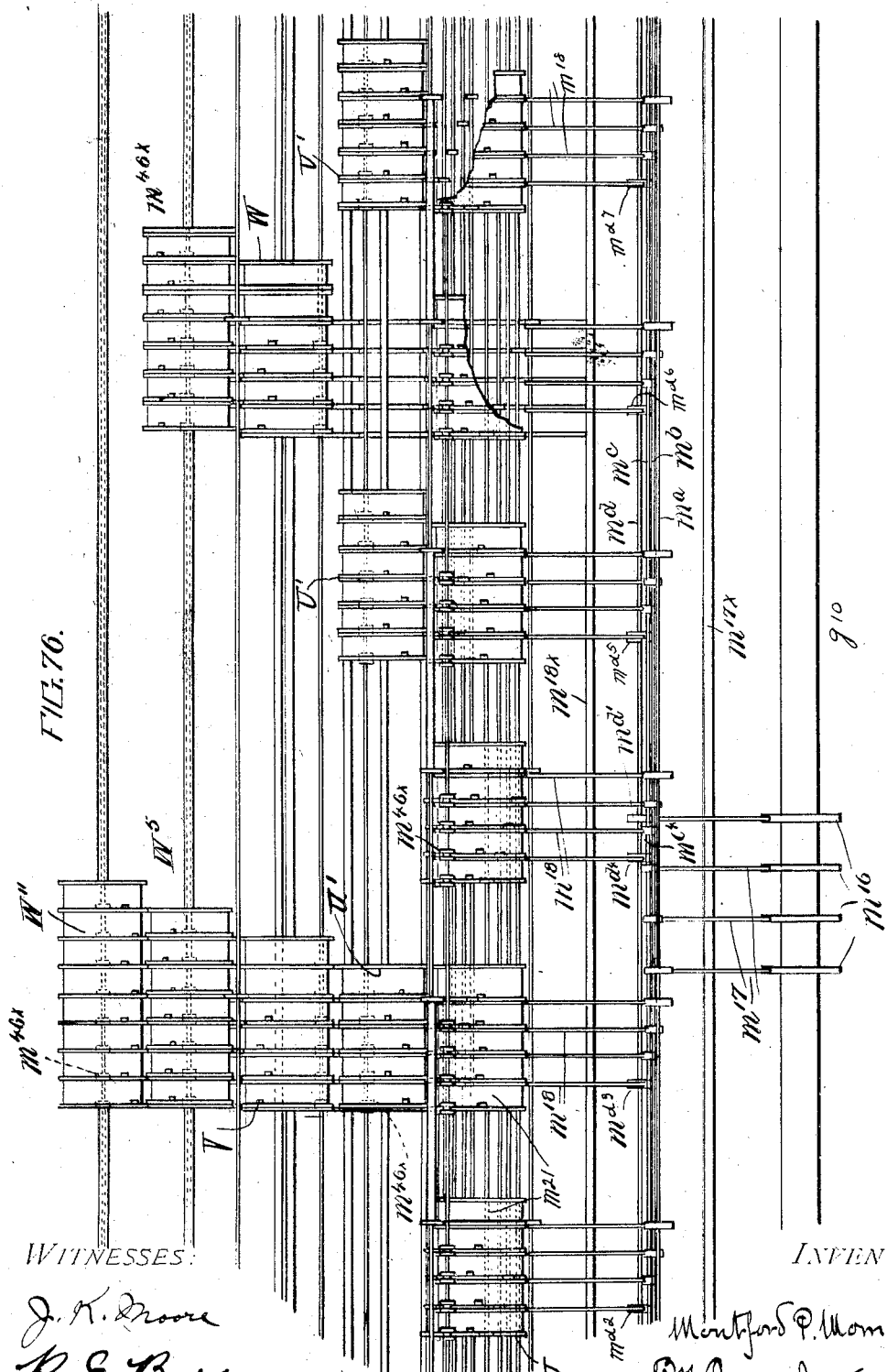

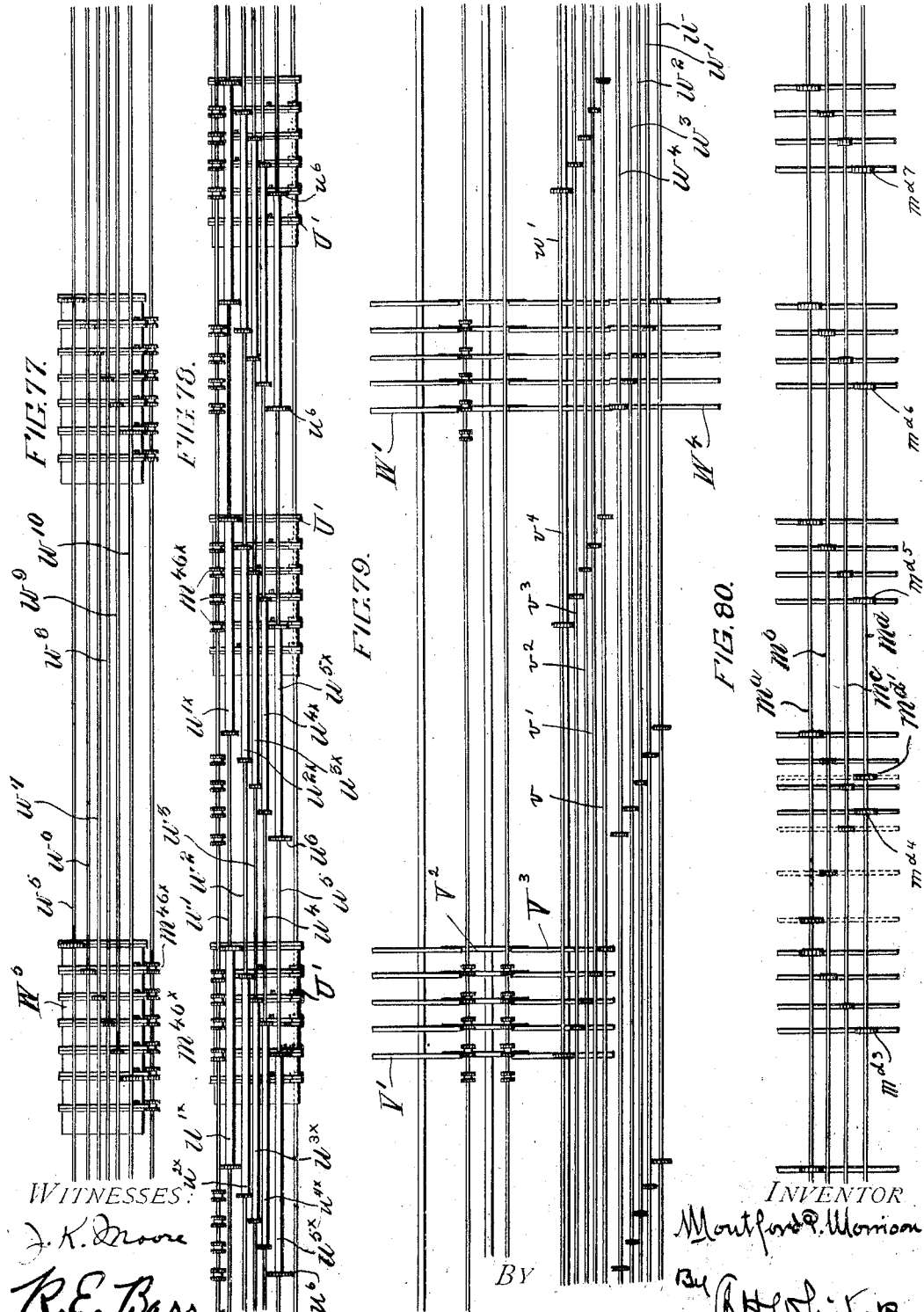

M. P. MORRISON.
CASH REGISTERING, CHANGE MAKING, AND RECORDING AND ACCOUNTING MACHINE.
APPLICATION FILED FEB. 8, 1907.
977,393.
Patented Nov. 29, 1910.
25 SHEETS—SHEET 24.
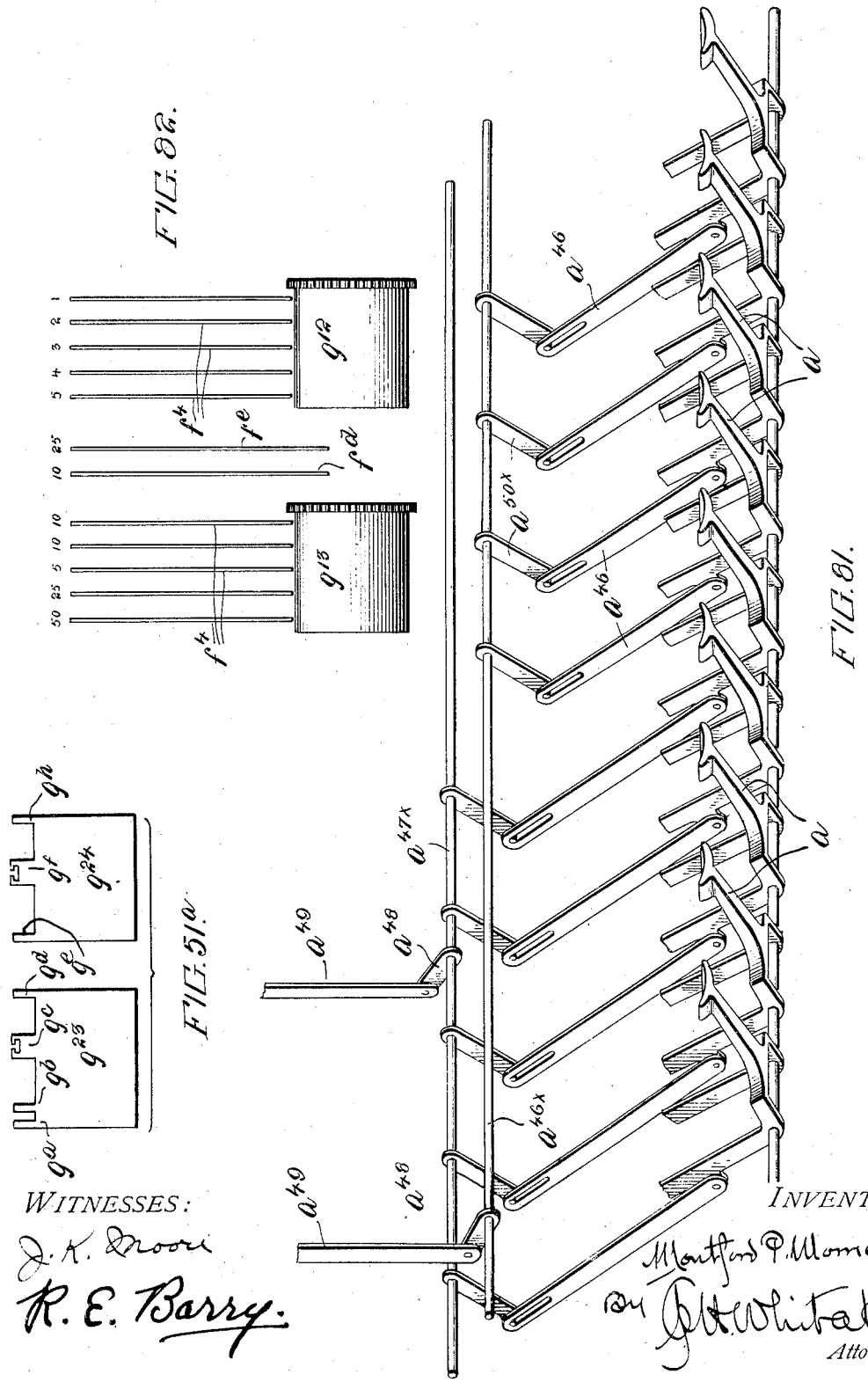

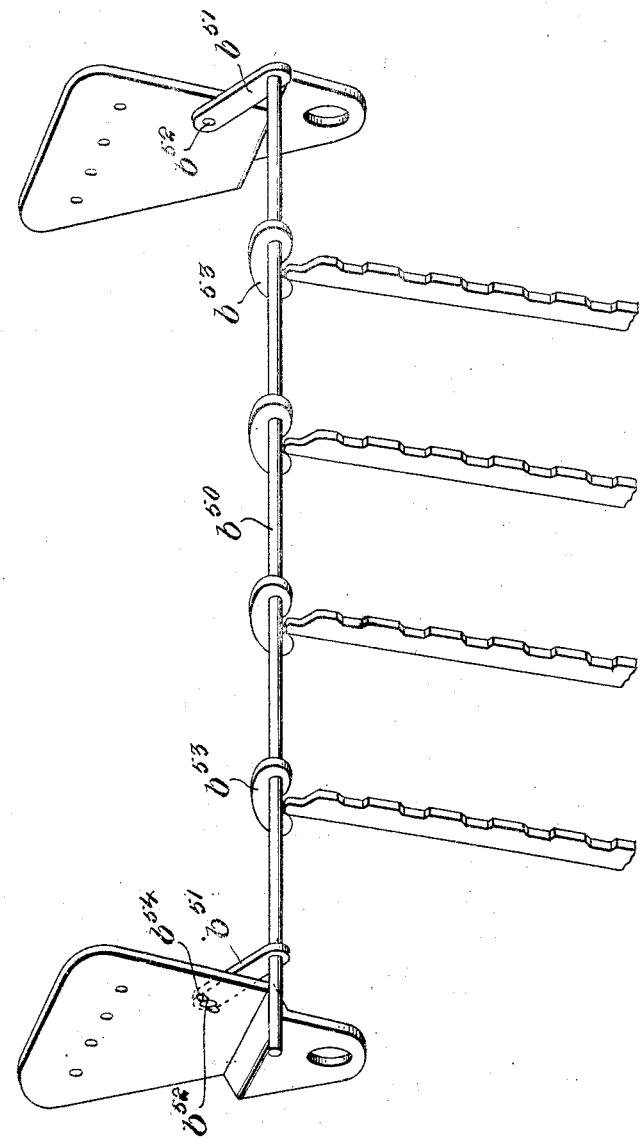

UNITED STATES PATENT OFFICE.

MONTFORD P. MORRISON, OF ATLANTA, GEORGIA.

CASH-REGISTERING, CHANGE-MAKING, AND RECORDING AND ACCOUNTING MACHINE.

977,393.

Specification of Letters Patent. Patented Nov. 29, 1910.

Application filed February 8, 1907. Serial No. 356,473.

*To all whom it may concern:*

Be it known that I, MONTFORD P. MORRISON, a citizen of the United States, and residing at Atlanta, in the county of Fulton and State of Georgia, have invented certain new and useful Improvements in Cash-Registering, Change-Making, and Recording and Accounting Machines, of which the following is a specification, such as will enable those skilled in the art to which it appertains to make and use the same.

This invention relates to machines of the class known as cash registers, and the object thereof is to provide an improved machine of this class, and one that will not only accurately register amounts received but will record the same; one that will register and record the amount of sales of each clerk, the total sales of the day for each clerk and incidentally bring about other desirable results which will be hereinafter set forth.

In the accompanying drawings I have shown the best form in which I have contemplated embodying my invention and the said invention is fully disclosed in the following description and claims.

Figure 3:
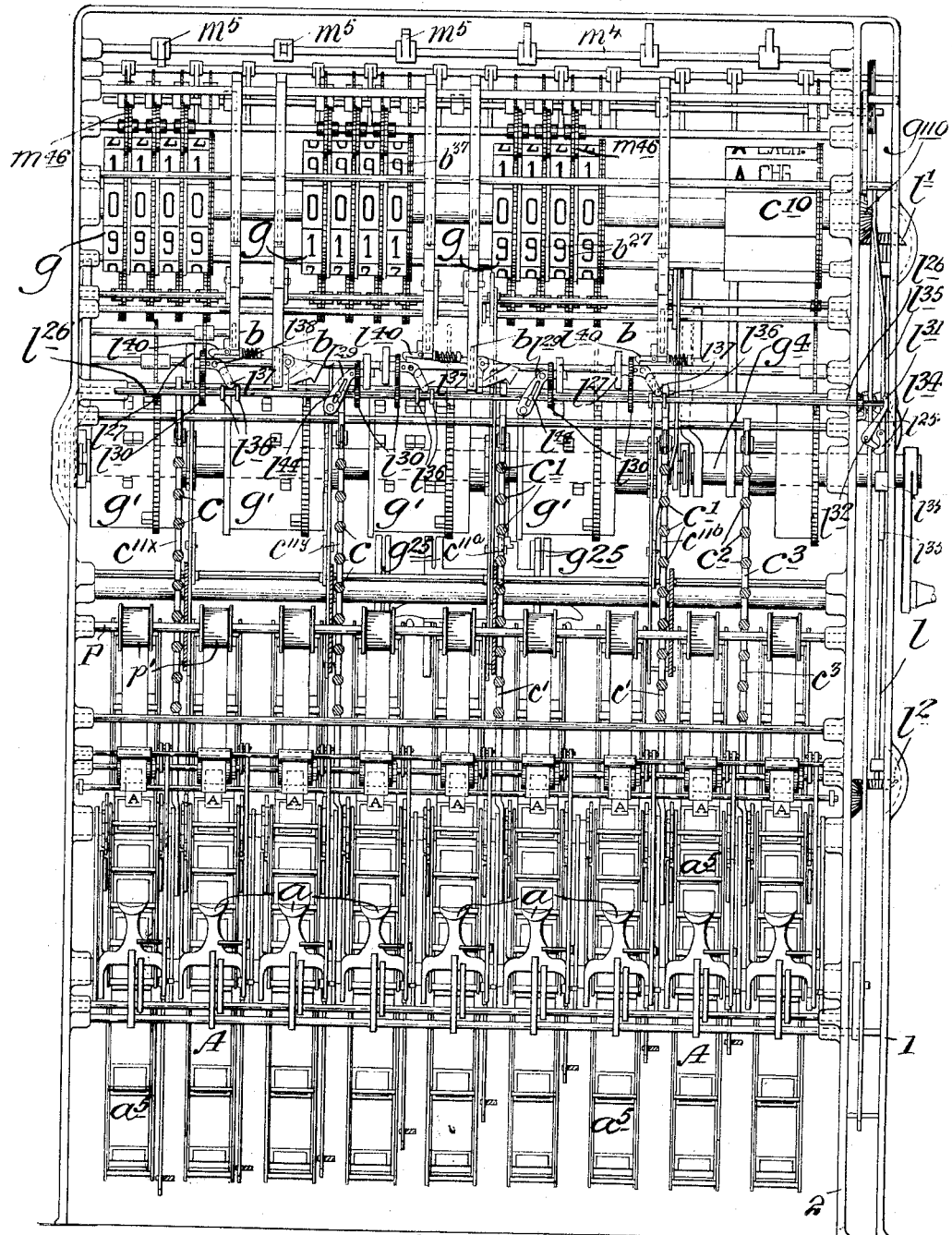
Figure 20:
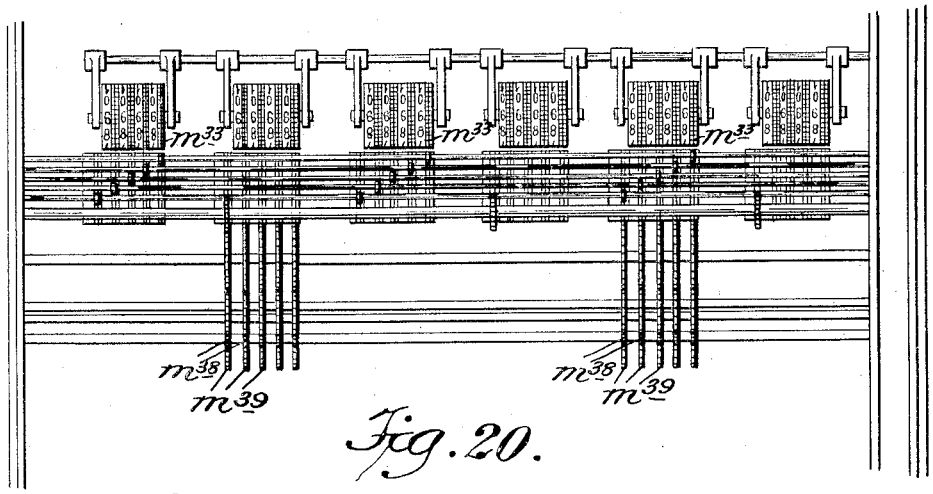
Figure 72:
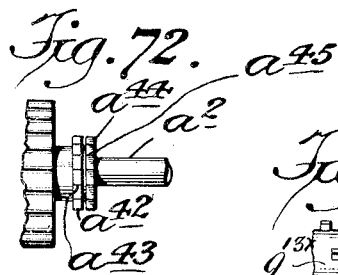
Figure 71:
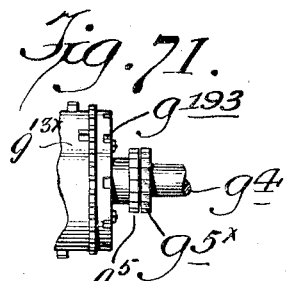
Figure 73:
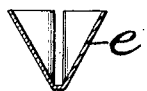

In the said drawings, Figure 1 is a front view in elevation of my machine. Fig. 2 is a view in elevation of the left hand side of the machine with the casing at that side removed. Fig. 2ª is a detail of the means for actuating the bill printing drums. Fig. 3 is a front elevation with the front of the casing removed. Fig. 4 is a partial top or plan view with the top of the casing removed. Fig. 4ª is a perspective view showing the connection of the coin operated levers and bill levers with the clerk indicating drum and the selectors. Fig. 4ᵇ is a detail of devices coacting with the upper end of lever $c^3$. Fig. 5 is a view similar to Fig. 4 of a section on line 5—5, Fig. 2. Fig. 6 is a sectional plan view showing the coin chutes in communication with the coin slots, and other details of construction, said view being taken substantially on line 6—6, Fig. 2. Fig. 7 is a partial sectional view from front to rear showing the mechanism operating when one of the bill levers is depressed and a part of the recording mechanism. Fig. 8 is a like sectional view showing a part of the printing mechanism, the locking means for the bill box and coin operating mechanism. Fig. 8ª is a partial section showing the construction of the hub of the clerk indicating drum. Fig. 9 is a sectional view similar to Fig. 8 showing part of the coin operated mechanism in one position. Fig. 10 is a view similar to Fig. 9 showing the same parts in another position. Fig. 11 is a view showing some of the same parts as are shown in Fig. 10 and connections with the coin operated mechanism. Fig. 12 is also a partial sectional view from front to rear showing in part the operating mechanism of the registering and recording devices. Fig. 13 is a rear elevation of devices forward of line 13—13, Fig. 2, showing the indicator drums and a part of their connections. Fig. 14 is a top view of the swinging frame carrying operating means for the three money indicating drums. Fig. 14ª is a perspective front view of the swinging frame, showing the actuating gearing of the thousand sections of the three indicating drums. Fig. 14ᵇ is a like view showing actuating gearing for hundreds sections. Figs. 15, 16, 17 and 18 are transverse sectional views showing different gearing connections of the swing frame. Fig. 19 is a like sectional view showing the gearing connected with the clerk indicating drum. Fig. 20 is a partial view of the clerk recording and registering drums and controlling mechanism viewed from the rear of the machine. Figs. 21, 22 and 23 are side, top and rear views of a clerk lock for the bill boxes or buckets. Figs. 24 and 25 are a side and top view of a bill lever and a part of its connections. Fig. 26 is a side and top view of one of the master drums of the machine. Figs. 27 and 28 are side views of gear wheels forming part of such drum. Figs. 29 and 30 are a side and front view of a sprocket wheel on the main shaft coöperating with the parts for returning indicating drums to normal position. Figs. 31 and 32 are cams on the main shaft for effecting the printing of sales transactions and immediate connections. Figs. 33 and 34 are side and plan views of one of the sections of the money indicating drums. Fig. 35 is a side and edge view of a gear wheel forming part of said section. Fig. 36 is a side and edge view of a segmental gear wheel forming part of the same disk or section. Figs. 37 and 38 are a side and top view of a part of the mechanism for returning indicator drums to normal. Figs. 39 and 40 are a side and horizontal sectional view of one of the bill buckets and immediately connected parts. Fig. 41 is a side view of one form of coin stamping or marking device. Fig. 42 is an end view of the same. Fig. 43 is a view of another form of coin marking or stamping device, and Fig. 44 is an end view thereof. Fig. 45 is a side view of a bill slip marking device. Fig. 46 is a front view of the same. Fig. 47 is a view of the same parts in a different position. Fig. 48 is a like view showing same parts in still different positions. Fig. 49 is a detail of a connected part. Figs. 50 and 51 are side and front views of a part of the change making devices. Fig. 51$^a$ is a detached view of the lifters forming part of the coin discharging devices. Figs. 52 and 53 are side and front views of a master drum and means for locking in a moved position. Fig. 54 is a bottom view of the mechanism for distributing one cent coins. Fig. 55 is a side view of the same. Figs. 56 and 57 are a top and end view of a crank on the main shaft. Fig. 58 is a partial section of one of the drums of the registering mechanism. Fig. 59 is a side and edge view of a ratchet forming a part thereof. Fig. 60 is a side and edge view of a gear wheel co-acting with said ratchet. Fig. 61 is a side and edge view of one of the figure sections of a registering drum. Fig. 62 is a side and edge view of another gear wheel forming part of the registering drum. Fig. 63 is a section through a figure section, shown in Fig. 58. Fig. 64 is an edge view of a time drum. Fig. 65 is a side view of the same with the printing hammer. Fig. 65$^a$ is a detail of part of the time printing mechanism. Figs. 66 and 67 are views illustrating the mechanism of carrying from one section to another in the indicating, registering and recording and the like drums. Fig. 68 is a side view of one of the gear wheels employed in the same. Fig. 69 is a side view of gears for returning parts to normal position. Fig. 70 is a view of the record sheet employed in connection with the machine. Fig. 71 is a view of a part of a master drum showing ratchet arrangement of same. Fig. 72 shows part of sprocket for bill carrying apparatus and its ratchets. Fig. 73 is a section on line 73—73, Fig. 2, of conducting chute for coins. Fig. 74 is a diagram in elevation showing the gearing connecting the "sales" drum with the printing and registering drums, looking from the left side of the machine. Fig. 75 is a similar diagram of a part of such gearing looking to the right from line 1—1, Fig. 4. Fig. 76 is a diagrammatic plan view of the connections between the sections of the sales drum and the registering drums, the printing drums being omitted. Fig. 77 is a diagrammatic view on line 5—5 in Fig. 74 looking in the direction of the arrows, the group of wheels crossed by said line being omitted. Fig. 78 is a like view on line 6—6 in same figure, looking in the direction of the arrows, the group of wheels crossed by said line being also omitted. Fig. 79 is a view on line 7—7 in same figure, looking downward, the groups of wheels crossed by said line being omitted. Fig. 80 is a like view on line 8—8 in the same figure looking in the direction of arrows, the group of wheels crossed by said line being omitted. Fig. 81 is a perspective view showing connections of levers $a$ with master drums operated thereby. Fig. 82 is a diagrammatic plan view showing arrangement of coin discharging slides or bars operated by two of the master drums. Fig. 83 is a perspective of devices for moving the frame $b^3$ backward. In Figs. 2, 7, 8, 9, 10, 11 and 12 the views are elevations of parts looking from the left to the right side of the machine and in such figures the partition 2 is omitted in order to secure clearness of illustration.

The mechanism of my improved device is mounted in a casing 1 of suitable form, shown in Fig. 1. The interior of this casing is divided into two parts by a partition 2 (see Fig. 4) forming two compartments which for convenience I denominate the "larger" and "smaller" compartments. The mechanism within the casing is operated by the clerks or salesmen of the establishment using the device. This is accomplished by means of certain push and other keys that extend beyond the front of the casing and by revolving the main shaft of the machine by a crank which is also outside of the casing on the right hand side of the same.

Near the top of the front wall of the casing there are four indicating drums, see Figs. 1 and 4. The drum at the right is the "Clerks" drum; that next on the left is the "Change" drum; the next is the "Sale" drum, while that on the left of the line is the "Amount received" drum. The initial movements of all of these drums is effected by levers and push keys. The three drums "Amount received," "Sale" and "Change" drums being operated through mechanism hereinafter described by the four vertical rows of push keys $c$, $c$, $c'$, $c'$ and the levers $a$ and levers actuated by the insertion of coins. While the clerk drum $c^{10}$ is operated mainly by the vertical row of push keys $c^2$. Within the larger compartment of the casing directly behind this row of push keys is a vertically disposed lever $c^3$ pivoted at $c^4$. To the top of this lever is pivoted the ratchet bar $c^5$, the teeth of which are adapted to engage the teeth of a ratchet wheel $g^5$ connected with or forming part of a master wheel $g'$ mounted on a short shaft $g^4$ (see Fig. 13) and this master wheel is connected by suitable gearing with a gear wheel on the clerks drum, $c^{10}$, see Fig. 19. The push keys are of different lengths and are adapted to move the ratchet bar and master wheel different distances, each key being provided with a spring for returning it to normal position after being moved, see Fig. 2. The lever $c^3$ is also returned to normal position by a spring, not shown.

On the face of the clerks drum is placed the number or letter used to indicate each of the different clerks using the device. This character for each clerk is placed twice on the face of the drum in close proximity. The one nearest the normal point is followed by the word "Charge" or the abbreviation thereof and the next one is followed by the word "Cash."

The clerk drum is provided with a sleeve $c^{13}$ extending through the partition 2 into the smaller compartment and at its outer end is provided with a beveled gear $g^{110}$, see Figs. 8 and 8$^a$. The clerk drum $c^{10}$ is loosely mounted on the shaft $g^{10}$ and the sleeve $c^{13}$ forms a support or bearing for the right hand end of said shaft.

A beveled gear $m$ on shaft $m'$ gears with the gear wheel $g^{110}$. The opposite end of the shaft $m'$ is provided with a beveled gear $m^2$ which in turn meshes with a beveled gear $m^3$ mounted rigidly on shaft $m^4$ extending transversely across the machine. The shaft $m^4$ is provided with a series of arms $m^5$ which I term selectors, two for each clerk, and these selectors are set at different angles to a vertical line for purposes hereinafter specified.

Immediately in rear of the two rows of push keys $c'$ $c'$ are two levers $c^{14}$, $c^{15}$ similar to the lever $c^3$, each of which is operated by the push keys of one of the rows of push keys $c'$ in the same manner as the lever $c^3$. These levers $c^{14}$, $c^{15}$ have ratchet bars connected therewith and engaging with ratchets connected with two drums $g^{12}$ and $g^{13}$, see Figs. 13, 50 and 51. These drums are revolubly mounted on shaft $g$. This shaft has its ends reduced to a tenon $g^x$ and these tenons engage grooves $g^{x'}$ at each end, see Figs. 14$^b$ and 52. The grooves, in the main, lie in a horizontal plane but at the forward ends each groove is provided with an upward angular extension $g^{x2}$. This shaft is normally held in a forward position with its tenons $g^x$ in the angular part $g^{x2}$ of the grooves, by two pitmen $k^9$, whose forward ends loosely encircle the shaft $g$ and whose rear ends are connected to the cranks $k^{10}$ on the main shaft $k^6$, see Fig. 5. In like manner the two vertical rows of push keys $c$ $c$ are connected with and operate two drums $g^{12x}$ and $g^{13x}$, also revolubly mounted on the shaft $g$. These four drums $g^{12}$, $g^{13}$, $g^{12x}$ and $g^{13x}$ I call master drums, as they control and impart motion to a large number of the parts of the mechanism.

The shaft $g$ when in its normal position is in alinement with the shaft $g^4$ and with another short shaft or gudgeon $g^x$ at the opposite end of the shaft $g$. A frame $b^{31}$ is pivoted on the shaft $g^4$ and shaft or gudgeon $g^x$. This frame carries a number of shafts and gears by which the movement from the master drums is communicated to the several sections of the indicator drums on shaft $g^{10}$ mounted in the larger compartment of the casing above and slightly forward of the shafts $g^4$ and $g^x$. These indicating or indicator drums, three in number, are each composed of four sections, each section having thereon ten figures from 0 to 9 inclusive. The right hand section of the drum at the right representing units or cents, the next to the left tens; the next, hundreds or dollars, and the next thousands, or tens of dollars. Each section of these three drums is provided with a gear $b^{27}$ by which it is rotated to present the proper figure at its opening in the front of the casing. The mechanism for operating the sections of these indicating drums is best seen in Figs. 13, 14, 14$^a$ and 14$^b$. At each side and below the indicating drums, are two shafts $m^{14}$ and $m^{15}$. On the shaft $m^{14}$ are revolubly mounted gears $b^{33}$ meshing with the gears $b^{27}$ of each section of the "Amount received" and "Change" drums, and on shaft $m^{15}$ are revolubly mounted gears $b^{34}$ which mesh with the gear $b^{27}$ of each section of the "Sale" and "Change" drums. In Figs. 14$^a$ and 14$^b$ but one of each of these gears is shown. In Fig. 14$^a$ those engaging the gears of the thousands section only are shown and in Fig. 14$^b$ only those that engage the gears of the hundreds sections of the drum are shown. The others are omitted together with their actuating gears in order that the connections with the master drums may be clearly seen.

Near the top of the frame $b^{31}$ and centrally of the end pieces of the same is mounted a shaft $b^{360}$ and on this shaft there is also revolubly mounted a gear $b^{32}$ for each section of the three indicating drums, said gears $b^{32}$ meshing alternately with the gears $b^{33}$ and $b^{34}$ opposed to or in alinement therewith as the frame $b^{31}$ is swung to its most forward or backward position.

In the frame $b^{31}$ below the shaft $b^{360}$ are four shafts $b^{320}$, $b^{330}$, $b^{340}$ and $b^{350}$. Each of these shafts is provided with an actuating gear by which motion is given to the shaft and also with three other gears all rigidly secured upon the shaft. Below these shafts there is mounted in the frame $b^{31}$ a shaft $b^{370}$ and upon this shaft are loosely mounted four gear wheels $b^{36}$ each connected by gearing with a gear on one of the sections of the master drums. Each of these gear wheels $g^{36}$ meshes with the actuating gear on one of the shafts $b^{320}$, $b^{330}$, $b^{340}$ and $b^{350}$. The gear $b^{36}$ that meshes with the gear on the master drum, that is actuated by the thousands push keys or the push keys representing thousands of cents or tens of dollars meshes with the actuating gear $b^{374}$ on shaft $b^{350}$ (see Fig. 14$^a$). The other gears $b^{37}$ rigid on this shaft, mesh with gears $b^{32}$ revolubly mounted on shaft $b^{360}$, and these gears $b^{32}$ are positioned to mesh and turn gears $b^{33}$ and $b^{34}$ on shafts $m^{14}$ and $m^{15}$, when thrown into engagement therewith. The gear $b^{36}$ on shaft $b^{370}$ that meshes with the gear on the master drum actuated by the hundreds push keys or those representing units of dollars, meshes with the actuating gear $b^{341x}$, on shaft $b^{340}$. The other gears $b^{341}$ on said shaft also rigid on the shaft, mesh with other gears $b^{32}$, revolubly mounted on shaft $b^{360}$ and they in like manner are adapted to mesh with either gears $b^{33}$ and $b^{34}$ positioned to engage the hundreds sections of the indicating drums according to the position of the frame $b^{31}$. This will be seen from an examination of Figs. 14$^a$ and 14$^b$. In Fig. 14$^a$ the thousands master drum $g^{13x}$ is shown together with its connections with the gears $b^{32}$ on shaft $b^{360}$. In Fig. 14$^b$ is shown the connections between the master drum $g^{12x}$ and gears $b^{32}$ adapted to engage the gears of the hundreds sections of the indicating drums. In this case the gear $b^{36}$ engages the actuating gear $b^{341x}$ on shaft $b^{340}$ and the other gears $b^{341}$ on that shaft mesh with other gears $b^{32}$ on shaft $b^{360}$. The master drum actuated by the tens push keys is in like manner connected with gears $b^{32}$ on the shaft $b^{360}$ and these gears $b^{32}$ are positioned to engage either the gears $b^{33}$ or $b^{34}$ that are in turn positioned to engage the gears on the tens sections of the indicating drums, and the master drum responding to the units or cents push keys is in like manner connected to operate the units sections of the indicating drums.

It is to be noted that the shaft $m^{15}$ has no gears for actuating the sections of the "Amount received" indicating drum, and that shaft $m^{14}$ has no gears for actuating the "Sale" drum. Accordingly when the frame $b^{31}$ is in its forward position, pressure upon one of the push keys will move a section of the "Change" drum and also a section of the "Amount received" drum but will not affect the sections of the "Sale" drum. When, however, the frame $b^{31}$ is in its rearward position any movement of the master drums will actuate a section of the "Sale" and "Change" drums and will not affect the "Amount received" drum in any manner whatever. It will also be seen that the figures on the sections of the "Amount received" and "Change" drums are arranged in like order while the figures on the "Sale" drum are arranged in the reverse order.

Figs. 15, 16, 17 and 18 are sectional views of the frame $b^{31}$ showing the arrangement of gears on the four shafts $b^{320}$, $b^{330}$, $b^{340}$ and $b^{350}$. In Fig. 16 a gear $b^{37}$ is shown as in gear with its corresponding gear $b^{32}$ on shaft $b^{360}$. The actuating gear $b^{36}$ on shaft $b^{370}$ is shown but the gear $b^{37x}$ with which it meshes is not shown as it is in line with and would hide the gear $b^{37}$. In Fig. 18 there is shown a gear $b^{331}$ on shaft $b^{330}$, in gear with its corresponding gear $b^{32}$ on shaft $b^{360}$. The gear $b^{331x}$ meshing with the gear $b^{36}$ on shaft $b^{370}$ actuating the shaft is not shown for the same reason that the gear $b^{37x}$ was omitted. In Fig. 15 a gear $b^{341}$ on shaft $b^{340}$ is shown as meshing with a gear $b^{32}$ on the shaft $b^{360}$ and in Fig. 17 is shown a gear on shaft $b^{350}$ in a like connection, the gears on such shafts meshing with gears $b^{36}$ on shaft $b^{370}$ being for like reasons omitted. The transactions indicated by the "Sale" drum are registered, recorded and totaled by means connected with said drum, see Figs. 4, 4$^a$, 7, 12, 74, 75 and 76. Each section of the "Sale" drum has connected therewith a pinion $m^{16}$. This gear is not shown in Fig. 13 in order to avoid confusion but is clearly shown in the sectional views, Figs. 7 and 12, and the connected gearing is more clearly shown in the diagrammatic views, Figs. 74, 75 and 76. In the latter figure for clearness, the sections of the "Sale" drum are omitted, only the pinions $m^{16}$ being shown.

In the mechanism here set forth, it will be understood that only the arrangement of parts for the transactions of three salesmen or clerks is illustrated and described. Each of the pinions $m^{16}$ meshes with a gear $m^{17}$ revolubly mounted on a shaft $m^{17x}$ extending from side to side of the larger compartment of the casing. On shaft $m^{18x}$ extending in a like manner, are six sets of gears $m^{18}$, there being four gears in each set. These gears are independently revoluble on the shaft. Between the gears $m^{17}$ and $m^{18}$ are four shafts $m^a$, $m^b$, $m^c$ and $m^d$, see Figs. 76 and 80. Each of these shafts is provided with an actuating pinion and six other gears of equal size, all rigidly secured on the shaft. As the registering drums are to be inspected from the rear of the machine and as the printing drums impress the underside of the paper, the position of the sections are the reverse of those in the "Sale" drum. That is, the thousand sections are on the right hand ends of these drums and the units sections on the left hand ends. The gear $m^{17}$ that meshes with the pinion $m^{16}$ connected with the units section of the "Sale" drum, engages the actuating pinion $m^{d'}$ on shaft $m^d$, and each of the other gears $m^{d2}$, $m^{d3}$, $m^{d4}$, $m^{d5}$, $m^{d6}$ and $m^{d7}$ mesh with the left hand gear $m^{18}$ of each of the six sets of gears on shaft $m^{18x}$, see Figs. 76 and 80. In like manner the gear $m^{17}$ in mesh with the pinion connected with the tens section of the "Sale" drum is connected through shaft $m^c$ and the gears mounted thereon with the next gear $m^{18}$ of each set to the right. So also the gear $m^{17}$ meshing with the pinion $m^{16}$ connected with the hundreds section of the "Sale" drum is connected by shaft $m^b$ and its gears with the next gear $m^{18}$ of each set to the right, and the gear $m^{17}$ meshing with the pinion $m^{16}$ connected with the thousands section of the "Sale" drum is connected by the shaft $m^a$ and its gears with the gear $m^{18}$ at the right of each set. Above this series of shafts $m^a$, $m^b$, $m^c$ and $m^d$ I locate a rod or shaft $m^{19}$ extending across the larger compartment of the casing and parallel with shaft $m^{18x}$ see Fig. 4$^a$. Upon this shaft are pivoted six swinging frames $m^6$. These frames extend backward from the shaft and in the rear end of each is a shaft upon which is revolubly mounted the four sections of a clerk printing drum $m^7$ corresponding to the four sections of the "Sale" drum already described, but in the inverse order, as before stated.

Near its center each frame $m^6$ is provided with the bearing plate or face $m^{6x}$, best seen in Figs. 4 and 4$^a$, extending from one side to the other of the frame. Each of the sections of the printing drums is provided with a gear in alinement with one of the gear wheels $m^{18}$ of one set, but the frames $m^6$ are normally held elevated with the gear wheels of its sections out of mesh with the gears $m^{18}$ by a spring $m^{6y}$, see Fig. 8. The printing drums extend farther toward the rear of the machine than the gear wheels $m^{18}$ and when the drums are depressed the gears of their section will engage the rear side of the gears $m^{18}$. Below the printing drums is a shaft $m^{22}$ on which are mounted six clerk registering drums, one beneath each printing drum. Each of these drums is composed of five sections having figures thereon, corresponding to those of the sections of the printing drums and the "Sale" drum. Each of these sections is also provided with a gear in alinement with the gears of the printing drum, and the arrangement is such that when a printing drum is depressed the gears of its sections will mesh with the gears of a set of gears $m^{18}$ and with the gears of the four left hand sections of the registering drum. It will thus be seen that neither the printing drums nor the registering drums will be in any way actuated unless the printing drums are depressed. This depression is effected by the selectors $m^5$ acting on the bearing plates $m^{6x}$ of the frames $m^6$. These selectors are actuated as before described by the clerk drum.

There are two printing and two registering drums for each clerk, one for his credit and one for his cash sales. The selectors are so arranged that but one printing drum can be depressed at one time, so that one record can only be made of a single transaction and it can be but once registered. When a clerk pushes his appropriate key of the series $C^2$ the clerk drum is moved to bring the clerks designating letter or character and the word "Charge" in view. At the same time the selector shaft is turned by its connections with the clerk drum, and the clerks credit printing drum is depressed. If the sale be a cash sale, either a lever will be depressed or a coin be inserted in the machine. Either of these actions will by mechanism hereinafter explained, cause a slight additional movement of the clerk drum and bring the same clerk's designating character in view, with the word "Cash." This further movement of the clerk drum will also move the selector shaft, release the credit printing drum of the clerk and depress the cash printing drum instead.

The printing is effected by levers $m^8$, see Figs. 4 and 8, rigidly secured to a shaft $m^{8x}$ extending across the larger compartment of the casing. Each lever $m^8$ has a broad impression head extending entirely across the printing cylinder. To the shaft $m^{8x}$ is secured the short arm $m^9$ extending rearwardly over the upper end of the vertically sliding bar $k^{11}$. The lower end of the bar $k^{11}$ is bifurcated to embrace the main shaft $k^6$ or has this bifurcated portion formed into a loop as shown in Figs. 31 and 32 at $k^{13}$. On each side of this bifurcated portion or of the loop $k^{13}$ the shaft $k^6$ is provided with cams $k^{14}$, $k^{14}$, and the bar $k^{11}$ is provided with the plate $k^{12}$ extending on each side of the bar and as the shaft is rotated the cams engage the plate $k^{12}$ and raise the bar. The cams serve to keep the lower end of the bar $k^{11}$ in place upon the shaft and the upper end of the bar is provided with a longitudinally extending slot through which a pin $m^{11x}$ is passed to maintain the bar in a vertical position but permit it to be moved upward when desired by the cams $k^{14}$, $k^{14}$ and by engagement with the arm $m^9$ turn the shaft $m^{8x}$ and press the paper upon the printing drums.

The paper is ruled as shown in Fig. 70 and an impression is made in each column but as the sections of but one of the printing drums have been moved, such drum alone will print any number or amount, the impressions of the other drums being merely zeros or ciphers. The paper in a long sheet is carried by a drum $m^{10}$, thence over rollers and between the levers $m^8$ and the printing drums, to an actuating or taking up drum $m^{11}$. This drum is provided with the ratchet $m^{12}$ which is actuated by a spring pawl $m^{13}$ carried by the bar $k^{11}$. After a transaction has been indicated, registered and recorded, the printing drums and "Sale" drum are returned to normal or zero position before a second transaction is proceeded with. The printing drums have therefor the same number of sections as the "Sale" drum, but as the registering drums are not thus returned but are advanced by a second transaction, each registering drum has an additional section for tens of thousands, in order to provide for the totaling of each clerk's transactions should such transactions amount to more than tens and run up to hundreds of dollars. In order that this additional section may be of use, a construction must be provided whereby the additional section shall be advanced one number or figure on its periphery for each entire revolution of the next adjacent section. The means which I employ for this purpose I term my "carrying mechanism" and is most clearly shown in Figs. 66, 67 and 68. In these figures $m^{46}$ and $m^{47}$ are two pinions connected together for joint rotation, most usually by a sleeve $m^{49}$, though in some instances I employ a solid shaft. The pinion $m^{46}$ gears with a gear $m^{46x}$, in this instance I will say, the gear on the additional section of a registering drum.

$m^{48}$ is a wheel receiving motion from the shaft on which it is mounted or from a gear wheel or drum section with which it is connected. In this instance I will say connected to the thousands section of a registering drum. This wheel is provided with a sufficient number of teeth to move the wheels $m^{46}$ and $m^{47}$ such a distance as will cause the gear $m^{46x}$ to make one-tenth of a revolution. This form of carrying device I employ with the master drums, and the three indicating drums, see Fig. 11, in which its presence is indicated by the gear wheel $m^{46}$ there shown in mesh with one of the gears of the indicating sections, as well as with the registering drums, and the totaling drums connected therewith. In the case of the registering and totaling drums I prefer instead of employing a separate gear $m^{48}$ to construct the figure sections with the necessary teeth on the periphery of each figure section at the side of the line of figures, as shown at $m^{51}$ in Fig. 61. The carrying devices or gearing are shown in Figs. 74 and 75 at $m^{46x}$.

In connection with the registering drums already described I employ three totaling drums which register the total sales, both credit and cash sales of each clerk. The means by which this is accomplished is best illustrated in Figs. 58, 59, 60, 61, 62, 63, 74 and 78.

In the diagrammatic view of the gearing presented in Fig. 74, U indicates a gear of one of the sections of a registering drum, cash or credit. U' indicates a gear of one of the sections of a clerk totaling drum, and between the two is seen a series of gears similar to those between gears $m^{17}$ and $m^{18}$. In Fig. 78 this series of gearing is shown in elevation in rear of the totaling clerk drums. The registering drums are not shown. Between the primary registering drums and the totaling drums are a series of shafts $u'$, $u^2$, $u^3$, $u^4$ and $u^5$. On the lower of these shafts $u^5$ is revolubly mounted a sleeve $u^{5x}$ having at each end a gear $u^6$. Each of the registering sections has connected therewith a gear $m^{51}$ (see Fig. 58) in mesh with the gear of one of the sections of the printing drum and to this gear is secured a ratchet $m^{53}$ (see Fig. 59). The figure sections of the registering drums $m^{50}$ are each connected to the shaft by a spring pin and socket construction as shown at $m^{52}$ serving to hold such sections in the position to which they have been moved against frictional displacement. A gear wheel $m^{54}$, see Fig. 60, is hollowed or recessed on one side as at $m^{55}$ and placed against the gear $m^{51}$ with the ratchet within the recess $m^{55}$. Within the recess $m^{55}$ of the wheel $m^{54}$ a spring pawl $m^{56}$ is placed in such position that when the wheel $m^{51}$ is actuated by a gear wheel of the printing drum, a tooth of the ratchet will engage the pawl and move the wheel $m^{54}$ with it, but should the wheel $m^{54}$ be moved in the same direction as the wheel $m^{51}$ the ratchet and figure section $m^{50}$ connected therewith will not be moved as the pawl will pass freely over the teeth of the ratchet. One of the gears $u^6$ on the sleeve $u^{5x}$ is in mesh with the gear $m^{54}$ of the units section of the credit drum of the clerks registering drums and the other is in mesh with the gear $m^{54}$ of the units section of the cash drum. One of the gears $u^6$ also meshes with the gear of the units section of the same clerks totaling drum.

When the units section of the clerks credit registering drum is moved, the ratchet engages the pawl of its companion gear $m^{56}$ and the gear $m^{56}$ is moved therewith. A gear $u^6$ on the sleeve $u^{5x}$ in mesh therewith is revolved and the gear of the units section of the totaling drum is moved a corresponding amount. The gear $u^6$ at the other end of the sleeve although it is in mesh with the gear $m^{54}$ of the units section of the cash registering drum of the same clerk, will not move said section, as the pawl $m^{56}$ slips over the teeth of the ratchet. Again when the gear $m^{54}$ of the units section of the cash registering drum is moved by a gear of the printing drum, the cash units section, the ratchet and its associated gear $m^{54}$ will move with it. The gear $u^6$ meshing with this gear $m^{54}$ and the sleeve, will also move a corresponding space and again actuate the units section of the same clerks totaling gear, but will not move the units section of the clerks credit drum as the gear $u^6$ on the opposite end of the sleeve $u^{5x}$ will move the wheel $m^{54}$ of the units section of the credit drum, but this movement is not communicated to the drum itself for the reason that the pawl of this gear $m^{54}$ passes freely over the teeth of the ratchet as before explained. In like manner the tens sections of the credit and cash registering drums are connected with the tens section of the totaling drum by the sleeve $u^{4x}$ and its gears, the hundreds section of the credit and cash registering drums and the hundreds section of the totaling drum by the sleeve $u^{3x}$ and its gears, and the thousands sections by the sleeve $u^{2x}$ and its gears, and the tens of thousands by the sleeve $u'^x$ and its gears. The totaling clerks drums are provided with the carrying devices already described, as indicated at $m^{46}$. This description of the means for totaling one clerk's credit and cash transactions, applies to the mechanism for the totaling of all the transactions of the other clerks.

In Figs. 74 and 75 there is shown a diagram of the gearing for actuating the printing drums, the registering drums and the totaling drums for the cash and credit sales of each clerk as already described, together with the gearing for actuating the drums for totaling the total cash sales, and gearing for actuating drums for registering the total sales both cash and credit and drums for registering the total sales for a week or other period of time.

In Fig. 75 there is shown the gearing for actuating drums for showing the total credit transactions.

In Fig. 74 there is shown a series of gears meshing with a gear on a total cash drum V, see also Fig. 76. These gears are $V'$, $V^2$, $V^3$ extending toward the primary registering drum $m^{21}$. A series of shafts and small gears are interposed between the gear $V^3$ and the primary registering drum. The connecting mechanism is shown in a diagrammatic way in Fig. 79 the primary cash registering drums being omitted. In this figure there will be seen five sets of the series of gears $V'$, $V^2$, $V^3$ and that there are five shafts $v$, $v'$, $v^2$, $v^3$, $v^4$, and gears thereon, in most particulars resembling the shafts $m^a$, $m^b$, $m^c$ and $m^d$, for conveying motion from the primary registering gears to the first of the sets $V^3$. Each of these shafts is provided with three gears or pinions meshing with the gears $m^{54}$ of the sections of each primary cash registering drum. One of these gears also meshes with the gears $V^3$ which are connected with the gears $m^{51}$ of the sections of the total cash drum V. When a section of the primary registering drum is actuated, through one of the shafts $v$, $v'$, $v^2$, $v^3$ or $v^4$ it actuates a gear $V^3$ and its connected section of the totaling drum V. Thus every cash sale recorded and registered as a part of any clerk's transactions is registered on the total cash drum, the connection of the gear $m^{54}$ permitting each drum to actuate the totaling drum without affecting the cash drums of the other clerks. The total drum V is provided with six sections and the carrying mechanism already described is employed to cause the carrying from one section to another.

In Fig. 75 there is shown a train of gears $W'$, $W^2$, $W^3$, $W^4$ connecting with the gear of a credit registering drum W. The gears $W'$, $W^2$, $W^3$, $W^4$ are revolubly mounted on the same shaft as gears $V'$, $V^2$, $V^3$ but at some distance to the right. There are six sections in the credit totaling drum and there are five sets of actuating gears to actuate them from the sections of the credit registering gear, the other section being actuated by the carrying mechanism. To the right of the shafts $v$, $v'$, $v^2$, $v^3$, $v^4$ are five other shafts $w$, $w'$, $w^2$, $w^3$, $w^4$ each of which is provided with three pinions or gears, each meshing with the gear $m^{54}$ of the sections of the primary registering drums, one of the pinions or gears on each shaft also meshing with one of the five gears $W^4$ of the train connected with the gear $m^{51}$ of the credit totaling drum W. The operation of these parts is the same as that of the corresponding devices for operating the drum V.

It may be desired to have the total of both cash and credit sales. In such case I provide the drum $W^5$ of seven sections and employ the six shafts $w^5$, $w^6$, $w^7$, $w^8$, $w^9$ and $w^{10}$. These six shafts have each two gears, one meshing with the gears $m^{54}$ of the sections of drum V and the other with the gears $m^{54}$ of the sections of the drum W and the gears $m^{51}$ of the drum $W^5$. These shafts actuate the sections of the drum $W^5$ whenever the sections of the drums W and V are moved in the same manner as those already described, and the total cash and credit sales are registered on the drum $W^5$. In order that the total sales for a week may be registered I may provide the additional drum $W^{11}$, the sections of which are provided with gears corresponding to the gears $m^{51}$ of the other drums and these gears mesh with the gears $m^{54}$ of the drum $W^5$. When a sale has been made for which payment is immediately made, such payment is in either coin or bills. The bills or coins received are put into the machine and change, if necessary, is delivered or taken therefrom. Two separate series of receptacles are employed in the machine, one for bills and one for coins, and a separate series of coöperating devices are employed in connection with each series of receptacles.

The bill receiving devices are best shown in Figs. 2, 7, 8, 24, 25, 39 and 40. In these figures $a^2$, $a^3$ are two shafts extending across the larger compartment of the machine and carrying a series of sprocket wheels $a^4$. There sprocket wheels are arranged in pairs and on each pair is mounted a sprocket chain carrying a series of buckets $a^5$, the rear end of each bucket forming a link in the chain. In the present instance the bucket consists of an outer casing $a^7$ and an inner drawer or casing $a^8$. The front end of the bucket, as shown in Figs. 7 and 39, when the bucket is in normal position is closed by a sliding door $a^9$. This door is pivoted on a shaft or rod $a^{11}$ mounted in the forward ends of angle levers or arms $a^{12}$. These arms are pivoted at $a^{13}$, and the short angular arms extend downwardly and at their lower ends are provided with a pin $a^{15}$. A sliding bar $a^{17}$ is provided with a hook $a^{16}$ and is so secured as to move in a horizontal plane. The forward or right hand end of the bar $a^{17}$ is widened somewhat and the hook is formed in this head in the form of a vertical groove completely across the same, so that the movement of the bucket will bring the pin $a^{15}$ into and out of the hook by a movement in either direction. When the bucket is brought by the chain in position for use, that is directly in rear of one of the openings $a'$ in the front of the casing, the pin will be in position within the groove or hook $a^{15}$. In this sliding bar $a^{17}$ is secured a pin that passes through a slot in the lower end of a lever $a^{18}$ pivoted upon shaft $a^{19}$. The lever is provided with a nose $a^{20}$ and coöperates with a notch and an abutment $a^{21}$ which are parts of another sliding bar or rod $a^{22}$. The bar $a^{22}$ is provided with a pin $a^{23}$ which passes through a sloot $a^{24}$ in a bar $a^{25}$. This bar $a^{25}$ is connected at its forward end by a pin $a^{26}$ to a boss $a^{27}$ on the arm $a^{28}$ of the lever $a$. The rod or bar $a^{22}$ is provided with a plate $a^{29}$ having a pin $a^{30}$ for engagement with a hook at the end of arm $a^{28}$ of lever $a$. The lever $a$ below the hook is provided with a slot $a^{32}$. When this lever is actuated the pin $a^{30}$ is engaged by the hook and the bar $a^{22}$ is drawn forward. As the lever moves, the pin will follow the rear wall of the slot and move downward in such slot. As the bar $a^{25}$ is pivoted to the arm $a^{28}$ of the lever $a$ when the lever is actuated both of the bars $a^{22}$ and $a^{25}$ are drawn forward. When, however, the bar $a^{22}$ is actuated from the crank or main shaft $k^6$, the bar $a^{25}$ will not be moved as the pin $a^{30}$ will move forward out of the hook without engaging the forward wall of the slot; a sufficient space being provided between the hook and the forward wall of the slot to permit the pin $a^{30}$ to pass freely forward.

By referring to Figs. 39 and 40 it will be seen that the plate $a^{29}$ is provided with a vertical groove $a^{33}$ of like character to the groove forming the hook $a^{16}$, for the reception of a lug or pin $a^{34}$ on the inner casing $a^8$, and that the outer casing is slotted longitudinally at $a^{35}$ to permit the said inner casing to be moved forward independently of the outer casing of the bucket. The groove or vertical recess permits the buckets to be moved freely upward or downward and yet provides for the operative engagement of the plate $a^{29}$ with the lug or projection $a^{34}$, when the bucket is arrested in its operative position before its appropriate opening in the outer or supporting casing A of the machine.

The rod or bar $a^{22}$ is shown as provided with a sleeve $a^{36}$ having a headed pin $a^{37}$ on each side. The bar or rod has a single rearward prolongation extending through a guide $a^{38}$ and is provided at its rear end with a collar or head $a^{39}$ and a retracting spring $a^{40}$ located on said rod between said head or collar and the guide $a^{38}$ which serves to move the rod rearward thus restoring it and its connected parts to normal position after the rod has been moved forward by means of the lever $a$ or its connections with the main shaft $k^6$ of the machine, as hereinafter explained.

It is to be understood that there are nine series of bill buckets, one for each of the openings $a'$ in the front of the inclosing and supporting casing as shown in Fig. 1 and that there is a rod or bar $a^{22}$ for each series of buckets. It is also to be understood that the previously described construction of parts connected with the rod $a^{22}$ are duplicated one on each side of the chain of buckets, the rod $a^{22}$ being bifurcated at its forward end and one arm extending forward on one side of the chain and buckets and the other arm on the opposite side as shown in Fig. 6. Above the rods $a^{22}$ a rock shaft $k'$ extends across the main compartment of the casing from side to side and to this shaft is rigidly secured a series of arms $k^2$ one for each series of buckets and these arms extend downward and each has its lower end bifurcated and engaging the rear side of the pins $a^{37}$ on each side of the sleeve $a^{36}$ on the rod or bar $a^{22}$. The sleeve $a^{36}$ is preferably adjustably secured to the rod $a^{22}$ so that the movement imparted to the rod can be easily adjusted to secure the exact amount of forward movement required. The rock shaft $k'$ at its left end is provided with an arm $k^3$ rigidly secured thereto, and a link $k^4$ connects the outer end of this arm with a crank $k^5$ on the main shaft $k^6$. These devices, the arm $k^3$, link $k^4$ and crank $k^5$ extend beyond the main wall of the casing and the latter is provided with the projecting housing $k^{5x}$ to cover and protect the same as shown in Fig. 5. It will thus be seen that all of the rods or bars $a^{22}$ will be operated at the same time. The crank is placed on the shaft $k^6$ and is slotted at $k^7$ for the reception of a pin $k^8$ as shown in dotted lines in Fig. 57. This slot extends approximately through an effective arc of one hundred and eighty degrees, in order that the shaft may make approximately a half revolution before the crank arm will be moved and it also permits the springs $a^{40}$ to return the rod or bar $a^{22}$ arms $k^2$ and rock shaft $k'$ to normal position without affecting the main shaft.

On the initial movement of one of the rods $a^{22}$ the rear wall of the notch in such bar will engage the nose $a^{20}$ of the lever $a^{18}$ and swing the same forwardly and upwardly to raise the nose out of the notch. The movement of the lever $a^{18}$ will give a short quick movement to the rod or bar $a^{17}$, causing the forward end of the same to throw up the door $a^9$ of the bucket in position, through its action on the angle levers $a^{12}$. As soon as the notch passes the nose $a^{20}$, the bar or rod $a^{17}$ no longer moves but is retained in position by the nose $a^{20}$ resting on the rod $a^{22}$. On the return movement of the rod or bar $a^{22}$ the abutment $a^{21}$ will engage the front opposite side of the nose $a^{20}$ and move the lever $a^{18}$ backward causing the bar $a^{17}$ to move rearwardly and draw down the door $a^9$ closing the forward end of the bucket.

The levers $a$ are actuated at the time of the receipt of a bill by a clerk and they each open a bucket of the series holding bills of the same denomination and bring forward the inner casing in which the bills are deposited. This movement of the levers $a$ effects the proper movement of the "Amount received" drum through the following means. To the bar $a^{25}$ is secured the spring pawl $a^{41}$ which on the return movement of the bar engages a ratchet $a^{42}$ secured to the sprocket of the series of buckets with which the bar is associated and moves the sprocket to carry the bucket just operated downward out of position. Beneath the upper sprockets of the bucket chains are mounted two rock shafts $a^{46x}$ and $a^{47x}$ extending entirely across the machine. At one point near the left end of the casing intermediate two series of buckets an arm $a^{48}$ is rigidly secured to the shaft $a^{46x}$. This arm extends rearwardly and to its free end is pivoted the lower end of a link $a^{49}$, which extends upward and has its upper end pivoted to a lever $a^{50}$ pivoted to some support as at $a^{51}$, see Fig. 7. The other end of the lever is slotted and a pin secured to a sliding ratchet bar $a^{52}$ passes through said slot. This ratchet bar is adapted when drawn downward to engage a ratchet wheel connected with the master wheel $g^{13x}$ and turn the latter.

The levers $a$ are constructed as shown in Fig. 81, the arm extending outward through the casing being located directly in front of one of the series of bill buckets and in the vertical plane of the openings $a'$ in the casing. This arm is secured to a hub or sleeve or is provided with two separate bearings on the shaft on which it is pivoted and at each end of this sleeve or connected with each part of the bifurcated portion is an arm $a^{28}$, such arms extend upwardly and rearwardly one on each side of the series of buckets with which it is associated. To one of the arms $a^{28}$ is pivoted one end of a link $a^{46}$ which extends rearwardly therefrom and is pivoted to an arm $a^{50x}$ rigidly secured to the shaft $a^{46x}$. Hence, whenever one of the levers $a$ is depressed the ratchet bar $a^{52}$ connected therewith will actuate a master wheel a distance proportionate to the denomination of the bills assigned to the series of buckets with which it is associated. As before explained the master wheel $g^{13x}$ is connected with and actuates the thousand or tens of dollars sections of the "Am't received" and "Change" drums. The four levers $a$ shown at the right in Figs. 1 and 81, are in this manner connected with shaft $a^{46x}$, each of the links $a^{46}$ being pivoted to an arm $a^{50x}$ by a pin extending through a slot in the link so that the movement of one of the levers $a$ will in no wise affect the other levers, the pin of the arm $a^{50x}$ moving forward in the slots of the links of the levers not actuated, without affecting any change in their position. In like manner the shaft $a^{47x}$ is connected with a ratchet bar for actuating master wheel $g^{12x}$, and the five levers $a$ at the left hand in Fig. 1 are connected with the shaft $a^{47x}$. The master wheel $g^{12x}$ as before explained is connected with the hundreds section of the "Am't received" and "Change" drums, and the depression of any one of these five levers $a$ will cause the appropriate number to appear on said indicating drums. The actuation of the master wheels or drums has been hereinbefore briefly referred to but will now be described in greater detail.

The master wheels $g^{12}$, $g^{13}$, $g^{12x}$ and $g^{13x}$ are each provided with two ratchet wheels $g^5$ and $g^{5x}$ having their teeth arranged to actuate the wheel in opposite direction. In front of the ratchet $g^5$ of the master wheel $g^{13x}$ is a lever $c^{11x}$ similar to lever $c^3$ which is pivoted at its lower end and adapted to be moved or swung backward upon its pivot different distances by the keys of the left hand series of push keys. These keys are for use in such sales as amount to tens of dollars or thousands of cents. To the top of this lever $c^{11x}$ is pivoted a ratchet bar $c^{12x}$ which when the lever $c^{11x}$ is forced backward by one of the keys, engages the ratchet $g^{5x}$ and actuates the master wheel or drum $g^{13x}$. A lever $c^{11y}$ of like character to lever $c^{11x}$ is pivoted in the same manner before the series of push keys $c$ for units of dollars or hundreds of cents, and is provided with a ratchet bar $c^{12y}$ for engaging the ratchet $g^5$ of the master wheel or drum $g^{12x}$, and this drum or wheel is operated in like manner to the drum $c^{13x}$ as just described.

Below the main shaft $k^6$ a series of nine shafts $F'$, $F^2$, $F^3$, $F^4$, $F^5$, $F^6$, $F^7$, $F^8$ and $F^9$ extend entirely across the larger compartment of the casing, see Figs. 2 and 5. A short distance from the left of the compartment, there is secured to the shaft F' an upwardly extending arm $f^3$. To this arm $f^3$ is pivoted a bar or rod $f^4$ which rests upon a support $f^{100}$ and extends forwardly of such support into close proximity to the master wheel or drum $g^{12x}$. Nearer the left end of the shaft F' this shaft is provided with a downwardly and rearwardly extending curved arm $f^2$, and to the outer end of this arm is pivoted a sliding bar $f'$. This bar $f'$ extends downwardly into close proximity to a ratchet $a^{43}$ of the left hand chain of buckets having its teeth disposed oppositely to those of the ratchet $a^{42}$, and said sliding bar $f'$ is provided with a spring pawl $f$ to engage the said ratchet $a^{43}$ when said bar is moved downwardly and turn the sprocket in a direction opposite to that in which it is moved by the pawl $a^{41}$ bringing a bucket in which one or more bills have been deposited upward into operative position.

The sliding bar connected with shaft F' extends downward in close proximity to and coöperates with the sprocket carrying the chain of buckets located at the extreme left of the larger compartment of the casing and in rear of the opening $a'$ having the number "1" above it, in Fig. 1. The shaft $F^2$ has a like arm $f^3$ and bar $f^4$ resting on the support $f^{100}$ and extending also into close proximity to the master drum or wheel $g^{12x}$. It is also provided with a like arm $f^2$ and sliding bar $f'$ and pawl $f$ located in line with and co-acting with a like ratchet connected with the sprocket wheel carrying the chain of buckets located in rear of the opening $a'$ in the casing over which is the number "2." In like manner the shafts $F^3$, $F^4$ and $F^5$ are connected for coöperation with the sprockets of the three chains of buckets located in rear of the openings in the casing over which are the numbers 3, 4 and 5.

The master drum $g^{13x}$ is provided with pins $q^{17}$ arranged to engage one of the bars $f^4$, when the master wheel is drawn backward by the main shaft $k^6$. The shafts $F^6$, $F^7$, $F^8$ and $F^9$ are in like manner connected to actuate the series of bill buckets in rear of the openings in the casing above which are the numbers 10, 10, 20 and 50, and like provision is made for operating one at a time by the pins upon the master wheel or drum $g^{13x}$.

As hereinbefore explained the main shaft $k^6$ when revolved draws the shaft $g$ backward with all of the master drums or wheels thereon, and as the drums or wheels $g^{12x}$ and $g^{13x}$ are drawn backward, a pin of one of these drums engages one of the bars $f^4$ and moves the appropriate series of bill buckets one step, to bring another bucket before the opening with which it is associated. To do this the master wheels must be held from rotation during their backward movement.

This may be accomplished in many ways. In this instance I have shown a mechanism for this purpose clearly shown in Figs. 5, 52 and 53. Each of the master drums is provided on one end with the slots or notches $g^{193}$. A bar $g^{190}$ supported in the end plate of the frame in which the shaft $g'$, is mounted, so as to be capable of longitudinal movement across all of the drums. At intervals this bar is provided with locking fins $g^{192}$ each adapted to enter the slots or notches $g^{193}$ of one of the drums. The bar is reciprocated to bring the fins into said notches to lock the drums by a bell crank lever $g^{194}$ pivoted at $g^{195}$ to one of the end plates of the frame. One arm of this lever is slotted and a pin secured to the bar $g^{190}$ or one of the fins $g^{192}$ engages said slot. The other arm of the lever is connected by a link $g^{199}$ to a lever $g^{196}$ which is provided with a roll $g^{200}$, and a spring $g^{197x}$ is provided to hold this lever in position to maintain the bar $g^{190}$ in unlocked position. The guide arm $g^{202x}$ that supports the shaft $g$ is provided with the cam $g^{201}$. When the shaft $g$ begins its backward movement, the roll $g^{200}$ engages the cam and is moved upward, and through the link $g^{199}$ and bell crank lever $g^{194}$ moves the bar $g^{190}$ thrusting a fin $g^{192}$ into a notch of its associated master drum and locks it from movement. The reverse movement of the shaft $g$ permits the spring to move the bar in the opposite direction to unlock the drums.

In Fig. 7 the drum there seen is shown in its normal position, and when in this position when moved backward with the shaft $g$ none of the bars $f^4$ will be moved as there are no pins $q^{17}$ on the portion of the periphery of such drums that will pass immediately above such bars. In order that a bar $f^4$ may be moved the drum with which it co-acts must be actuated. Beneath the levers $a$, a shaft $a^{58}$ extends across the larger compartment and into the smaller. Under each lever $a$ the shaft $a^{58}$ is provided with an upwardly extending arm $a^{59}$ rigidly secured to the shaft; the upper end of these arms is in such close relation to the levers $a$ that whenever a lever is depressed its associated arm $a^{59}$ is also moved downward and the shaft $a^{58}$ partially turned. Within the smaller compartment of the casing, an arm $a^{57}$ is rigidly secured to said shaft $a^{58}$ This arm is slotted as at $a^{56}$ and such slot is engaged by a pin $a^{55}$ secured to a link $a^{54}$, so that when a lever $a$ is drawn downward the link $a^{54}$ will also be given a downward movement. The upper end of this bar is pivoted to an arm $a^{53}$ rigidly secured to a shaft $a^{53x}$ that like shaft $a^{58}$ extends from the smaller compartment entirely across the larger compartment. To this arm $a^{53}$ is also pivoted a link $b^{18}$ which extends downwardly and is pivoted to a forwardly extending arm $b^4$ of a rock shaft $b^{15}$. The opposite end of the shaft is provided with an arm $b^{16}$ which is in line with and engages the forward side of the lever $c^3$ actuated by the clerk push keys $c^2$, see Figs. 4$^a$ and 4$^b$. The effect of these connections is that whenever a lever $a$ is depressed the link $a^{54}$ is drawn downward, the arm $a^{53y}$ depresses the link $b^{13}$ and through the arm $b^{14}$ turns the shaft $b^{15}$ causing the arm $b^{16}$ to move the lever $c^3$ sufficiently to turn the clerk indicating drum one step farther or sufficiently to bring the clerk's designating number and the word "Cash" to view. It also through the connections with the clerk indicating drum actuates the selector shaft and brings the cash printing drum into operative position to print the cash sale and to have the amount of the sale registered when a sales key is pushed and the main shaft is turned.

If we now suppose a sale amounting to $3.00 is made and a $5.00 bill is handed to the clerk in payment. After pushing the clerk key and returning the parts to normal, as hereinafter explained, the clerk will pull down the lever $a$ connected with the series of bill buckets in rear of the aperture over which is the number 5. This lever acting upon the pin $a^{30}$ will draw the bar $a^{22}$ forward. The bar $a^{25}$ being also pivoted to said lever the two bars will move together opening the outer casing and moving the inner casing or bill bucket outward through the opening $a'$ in the supporting and inclosing casing. At the same time the link $a^{46}$ connected with the lever will turn the rock shaft and the appropriate arm $a^{48}$ will draw down the link $a^{49}$ bringing down the sliding ratchet bar $a^{52}$ which will turn the master wheel or drum $g^{12x}$ the proper distance to show $5.00 on the "Amt. recd." indicating drum and on the "Change" drum. The lever $a$ also depresses the arm $a^{59}$, turns shaft $a^{58}$ and through the link $a^{54}$, arm $a^{53}$, link $b^{13}$, shaft $b^{15}$ and arm $b^{16}$ moves the clerk indicating drum and the printing drums as before described. The lever $a$ is then released and the parts just actuated except the master drum and the clerk indicating drum return to their normal positions. In moving backward the pawl on the bar $a^{25}$ will engage the ratchet of series 5 of bill buckets and move the chain to carry the bill bucket just opened downward and bring a fresh bucket in its place. As the amount of the sale is $3.00 the clerk next pushes the push key of the series C, marked 3. This actuates the lever $c^{117}$ and ratchet bar $c^{137}$ and turns the master wheel three steps in the reverse direction causing the sales indicating drum to show $3.00. The "Change" drum being also moved in the reverse direction, will indicate $2.00 the amount of change required. The master drum actuated having been returned three of the five steps it was originally moved by the lever $a$, is now brought into position with a pin in place to engage the bar $f^4$ connected with the series of bill buckets indicated by the number 2. The shaft $k^6$ is now turned by its crank. The first movement of this shaft draws the shaft $g$ back and the bar $f^4$ connected with shaft $F^2$ is actuated and the sliding ratchet bar $f'$ connected therewith is moved downward turning the sprocket of series 2 of bill buckets back one step bringing a bucket in which one or more bills have been deposited into position before the opening $a'$. This takes approximately one-half of a revolution of the shaft $k^6$. A quarter turn now causes the link $k^4$ to turn the rock shaft $k'$ so as to thrust an entire series of buckets out through the openings $a'$. Only one of the series of buckets, the 2 series, has been given a retrograde movement and in this bucket only, will there be any bills exposed. The clerk now takes out a bill or bills for change and then completes the movement of the shaft returning all parts to normal position except the master drum, the "Sales," "Change" and clerk indicating drums, which remain in the position to which they have been moved until a clerk key is again pressed. When the amount of sale is small and a coin is tendered in payment, such coin is to be inserted in one of the coin openings marked $b$ and this brings into action a different set of devices.

A little below the shaft $a^{53x}$ is a shaft $b^{8x}$ extending entirely across the larger compartment of the casing. Upon this shaft are movably mounted a number of two armed levers $b^8$ one for each coin opening $b$. The lower arm of the lever $b^8$ is directly in front of the opening $b$ with which it is associated. The shaft $a^{53x}$ has rigidly secured thereto an arm $b^9$ extending downward in front of each of the upwardly extending arms of the levers $b^8$, so that the insertion of a coin at any one of the coin openings will actuate the shaft $a^{53x}$. The arm $b^{53}$ being rigidly secured to the shaft $b^{53x}$ this arm will move downward causing the arm $b^{16}$ to move the lever $c^3$ and the clerk drum forward one step to show a cash sale for the clerk.

The two master drums $g^{12}$ and $g^{13}$ at the right on shaft $g$ are actuated by the insertion of the various coins by the following instrumentalities, see Figs. 2, 10 and 11. These drums are each provided with two ratchets adapted to move said drums in opposite directions.

Below and slightly to the rear of shaft $b^{8x}$ are two shafts $b^{17x}$ and $b^{17y}$. On shaft $b^{17y}$ is rigidly secured an arm $b^{18x}$. A link $b^{18}$ pivoted to said arm extends downwardly and has its lower end pivoted to a lever $b^{19}$ pivoted at $b^{20}$. The free end of the lever is slotted and engages a pin secured to a sliding ratchet bar $b^{21}$, adapted to engage one of the ratchets connected with the master drum $g^{12}$ and move it in the same direction as the sliding bars $a^{32}$ move the master drums with which they are associated. Behind each of the levers $b^8$ located in rear of the coin openings marked 1 and 5, is pivoted a lever $b^{16}$. Each of these levers at its lower end is provided with a pin engaging a slot in an arm $b^{17}$ rigidly secured to the shaft $b^{17y}$. On inserting a coin in either of the coin openings $b$ marked 1 or 5, the lower end $b^7$ of the lever in rear of the same will be swung backward and this movement will actuate the lever $b^{16}$ associated therewith moving the arm $b^{17}$ with which it is connected and turning the shaft $b^{17y}$, which through arm $b^{18x}$, link $b^{18}$, lever $b^{19}$ and ratchet bar $b^{21}$ will turn the master drum $b^{12}$ the proper distance to show the amount of the coin on the "Am't rec'd" and "Change" drum. The other lever $b^{16}$ connected with said shaft $b^{17y}$ will also be moved but this one will not cause any action of any part of the machine, as it will be moved away from the lever $b^8$ with which it is associated. In a like manner the shaft $b^{17x}$ is connected with the master drum $g^{13}$, and in rear of each of the levers $b^8$ of the coin openings $b$ marked 10 and 50 is mounted a lever $b^{16}$ which in like manner is connected with shaft $b^{17x}$. The insertion of a coin in either of these openings will cause a movement of the shaft $b^{17x}$ to turn the master drum $g^{13}$ a sufficient distance to cause the amount of the coin inserted to be indicated on the "Am't rec'd" and "Change" drums as heretofore described.

In rear of the coin opening marked 25, there is a lever $b^8$ of slightly different construction. In order to register the amount of coins of this denomination both of the drums $g^{12}$ and $g^{13}$ must be actuated. To enable this to be done by the insertion of a single coin the lever $b^8$ in rear of this opening is provided with an enlarged or expanded portion $b^{80}$ and two levers $b^{16}$, one connected with shaft $b^{17x}$ and one connected with shaft $b^{17y}$ are pivoted behind it, so that the backward movement of this lever $b^8$ will cause a movement of both of these shafts, and the appropriate actuation of the master drums $g^{12}$ and $g^{13}$.

In front of the ratchets of the master drums $g^{12}$ and $g^{13}$ are two levers $c^{11a}$, $c^{11b}$ corresponding to levers $c^{11x}$, $c^{11x}$ which are each provided with ratchet bars or levers for moving said drums in the reverse direction from that in which they are moved by the sliding bars actuated by the insertion of a coin. These levers are immediately in rear of the two series of push keys $c'$ and move the drums to indicate the amount of sales below one dollar or below a hundred cents.

A chute $b^x$ is connected with each coin opening for conducting the coin to certain coin receptacles located near the bottom of the casing and at the rear of the same as seen in Figs. 2, 5 and 6. The reference letter E designates this group of coin receptacles, which are mounted on bars $E'$ over a collecting plate $E^2$, the sides of which incline downwardly to a discharging chute $e$ which in turn leads to a cup $e'$ on the outside of the casing, as seen in Fig. 1.

While but one receptacle $e^x$ is shown for the reception of fifty cent pieces, each of the other chutes are shown as connecting with more. Where more than one is employed the coins will in most instances first fall into the nearest and when this is filled the coins will pass to the next and so on. Each of the chutes extends beyond the last receptacle and beyond the collecting plate, so that when all of the receptacles of each chute are filled the coins will be carried beyond said plate and be dropped into a drawer or box at the bottom of the machine.

I employ four receptacles for cents and employ a special means for distributing the coins between all of such receptacles. This mechanism is best shown in Figs. 54 and 55. The means which I employ to discharge the coins from these receptacles, discharge from one, one cent, from another two cents, from another three cents and from the fourth four cents at a time. It is, therefore, important that each receptacle shall have some coins in the same and that a greater number shall be deposited in those from which the greatest number are discharged at one time.

The chute leading from the opening $b$ marked 1 on the front of the casing, receives the one cent pieces as deposited and conducts them to a swinging chute $e^9$. This chute is carried by a ratchet wheel $e^{10}$ and may be swung to connect with chutes of different dimensions $e^5$, $e^6$, $e^7$ and $e^8$. The ratchet wheel is a mutilated ratchet being provided with teeth on two separated points on its periphery. One of the series of ratchet teeth is arranged to be engaged by the pawl $e^{11}$ carried by the sliding bar $e^{14}$, and the other to be engaged by a retaining pawl $e^{12}$. The rod $e^{14}$ is connected by lever and link connection (see Fig. 6) with the lever $b^8$ in rear of the opening in the casing to receive one cent pieces, so that at the insertion of each coin the bar $e^{14}$ will be moved sufficiently to advance the ratchet one tooth. It will take two movements of the bar $e^{14}$ to carry the adjacent end of $e^9$ past the chute $e^6$ consequently during the advance of the ratchet $e^{10}$ and the swinging chute $e^9$ two coins will be deposed in the receptacle connected with chute $e^6$. In like manner the width of the chute $e^7$ is such that in passing the same the chute $e^9$ will deposit three coins in the receptacle connected with that chute and four coins will be deposited in the receptacle connected with the chute $e^8$.

An arm $e^{13}$ is pivoted on the shaft or journal of the ratchet $e^{10}$. This arm extends outward and is provided with a flange extending at right angles from the main portion of the arm across the periphery of the ratchet. On the underside of the ratchet wheel over which the arm $e^{13}$ is movable are two pins $e^{16}$ and $e^{17}$. The pin $e^{16}$ is so placed that when the actuating pawl has reached the end of its section of ratchet teeth and the swinging chute has guided four coins into the chute $e^8$, the pin strikes one side of the arm $e^{13}$ and forces the flange under the retaining pawl $e^{12}$ raising the pawl out of engagement with its section of ratchet teeth. The bar $e^{14}$ carries the pawl $e^{11}$ in a path tangential to the ratchet wheel and when in its retracted position the pawl is out of engagement with its ratchet section. When, therefore, the retaining pawl $e^{12}$ is raised by the flange of the arm $e^{13}$, as soon as the sliding bar $e^{14}$ and pawl are returned to normal position, the spring $e^{13x}$ draws the swinging chute and ratchet back to their original position. As the ratchet completes its retrograde movement the pin $e^{17}$ comes in contact with the opposite side of the arm $e^{13}$ and forces the flange of the same out from under the retaining pawl $e^{12}$ and the operation is repeated.

The master drums $g^{12}$ and $g^{13}$ are operated by the mechanism already described, starting with the coin levers $b^8$ in the same manner as the master drums $g^{12x}$ and $g^{13x}$ are operated as hereinbefore described, to indicate the amount received on the "Am't rec'd" and "Change" indicating drums and they are also operated in like manner by the push keys of the series $c'$ to indicate the amount of the sale on the "Sale" drum and the amount of change required on the "Change" drum. These master drums are in like manner provided with pins to coöperate with slides or bars corresponding to the slides or bars $f^4$, see Figs. 5, 8 and 13. The slides or bars $f^4$ that are engaged by the pins of the master drums $g^{12}$ and $g^{13}$ have each its rearward end pivoted to a bell crank $f^5$ which is connected by a series of links and bell cranks with a lever $e^3$ operating a slide $e^4$ working horizontally through the bottom of a coin receptacle and adapted when actuated, to expel one or more coins from the receptacle upon the collecting plate $E^2$ to be guided to the cup $e'$ in front of the casing. There are four receptacles for holding one cent pieces and these four are provided with slides of differing thicknesses. The receptacle connected with chute $e^5$ is provided with a slide $e^4$ of a thickness to discharge a single coin. The slide of the receptacle connected with the chute $e^6$ is provided with a slide to eject two coins; the slide of the receptacle connected with the chute $e^7$ ejects three, and the slide connected with the chute $e^8$ ejects four coins at a single movement of the slide.

By an inspection of Fig. 6, it will be seen that there are twelve coin receptacles to receive the five different coins in most common use. Of these receptacles one $o$ receives and holds fifty cent pieces; two $o'$, receive and hold twenty-five cent coins; three $o^2$, receive and hold ten cent coins; two $o^3$ hold five cent coins, and four $o^4$ hold one cent coins.

Referring to Fig. 5, it will be seen that the master drum $g^{12}$ has associated with it five bars $f^4$ which bars are connected to and operate the slides for discharging coins from the coin receptacles. Four of these bars are connected to the slides of the receptacles $o^4$, the remaining bar is connected to and operates the slide of one of the receptacles $o^3$. It will be observed that the master drum $g^{13}$ also is associated with five bars which are to be operated thereby. The three bars at the right of this group although of the same construction do not extend as far forward and are associated and co-act with a supplementary construction best seen in Fig. 50. All of the bars $f^4$ have their forward ends resting upon and supported by a movable bar $f^{100}$. A bracket $g^{18x}$ through which this bar $f^{100}$ extends has in the upper face of its forward part, three grooves preferably of dovetail form. These grooves are alined with the forward ends of the three bars $f^4$ at the right of the group just mentioned, and in these grooves are mounted three bars $f^{4x}$ fitted to move longitudinally therein. On the underside each of these bars is provided with a lug $f^{4y}$ which enters a recess in the bottom of the groove and a spring $f^{40}$ is placed between the rear wall of this recess and the lug $f^{4y}$ serving to maintain the bar $f^{4x}$ in its most forward position. These bars $f^{4x}$ extend forward into the position occupied by the forward ends of the other two bars of the group, that is, in position to be engaged by the pins of the master drum $g^{13}$. The bars $f^4$ alined therewith are of such a length that they can be raised and lowered without engaging the bars $f^{4x}$, but when in line therewith will be quickly engaged and moved backward when the bars $f^{4x}$ are engaged by the pins of the master wheel. It will also be observed that there are five bars $f^4$ associated with the master wheel or drum $g^{12}$. The bar $f^4$ at the left of this group is of the character just described, does not extend as far forward and has associated to coact therewith, the short sliding bar $f^{4x}$. This irregularity of construction of the bars associated with these drums and of the arrangement of the same in respect to the coin receptacles, is made necessary by the fact that the denomination of the coins does not agree with the progressive amounts represented by the cash push keys associated and coöperating with these two drums. For instance, suppose that the amount of a sale is twenty cents, and that a fifty cent coin is given in payment, the amount of change thirty cents, will be correctly indicated on the change drum but there is no coin of that value. In this case only the tens drum $g^{13}$ will have been moved and the construction and arrangement of parts must be such that the drum $g^{13}$ will discharge the proper amount of change. This can be done by placing pins on this drum to contact with and actuate a bar connected with one of the twenty-five cent receptacles and at the same time actuate another bar connected with a five cent coin receptacle.

The five bars $f^4$ associated with each of the master drums $g^{13}$ and $g^{12}$ are shown in Fig. 82. In this figure each of the bars $f^4$ is numbered to show the coin receptacle with which it is connected. As a bar connected with a receptacle holding twenty-five cent coins, and one connected to a five cent receptacle are associated with the drum $g^{13}$ the proper amount of change can be discharged by a proper placing of pins on the drum. Should the amount of change required be twenty-five cents a coin of this amount of change cannot be discharged by the drum $g^{13}$ as that drum will be in the position to discharge two tens or twenty cents and the drum $g^{12}$ will be in position to discharge five cents. In order, under these circumstances to discharge a twenty-five cent coin, I employ the construction shown in Figs. 5, 50 and 51.

Between the two groups of sliding bars associated with the drums $g^{12}$ and $g^{13}$, are two slides or bars $f^d$, $f^e$ one of which is connected to a bell crank lever $f^5$, connected with the discharge slide of the other twenty-five cent receptacle and the other connected in like manner with the remaining ten cent receptacle. The bracket $g^{18x}$ is of the construction shown in Figs. 50 and 51. On the interior of the bracket $g^{18x}$ are two sliding plates or lifters $g^{23}$ and $g^{24}$ mounted to slide vertically. To one of these plates or lifters $g^{23}$ is pivoted a bar $g^{21}$ and to the other $g^{24}$ is pivoted a bar $g^{22}$. These bars are pivoted at or near their centers and extend outwardly to the right and left beyond the ends of the bracket $g^{18x}$. The sliding plate or lifter $g^{23}$ is provided with four upwardly extending projections $g^a$, $g^b$, $g^c$, $g^d$ (Fig. 51$^a$). The first two $g^a$ and $g^b$ or the two at the left end of the lifter are directly beneath the two bars $f^4$ at the right of the group associated with the master drum $g^{13}$ and which are connected with two receptacles holding ten cent coins. The projection $g^s$ at or near the center of the lifter is provided with a dovetailed or inverted T-shaped opening in which the forward end of the sliding bar $f^e$ is movably fitted. The other projection $g^d$ extends upward beneath the bar $f^4$ associated with the drum $g^{12}$, which said bar is connected with a receptacle for holding five cent coins. The other lifter $g^{24}$ is also provided with three upwardly extending projections $g^e$, $g^f$, $g^h$. The projection $g^e$ at the left end of this lifter is immediately beneath the bar $f^4$, associated with the master drum $g^{13}$ and connected with a receptacle for holding five cent coins. The projection $g^f$ located a little to one side of the projection $g^e$ of the lifter $g^{23}$ is provided with an opening in the top of like character to that of $g^c$ in which the other bar $f^d$ is movably fitted, the said bar $f^d$ is connected with the discharging slide of the remaining receptacle holding ten cent coins. The other projection is located in line with the projection $g^d$ of the lifter $g^{23}$ and beneath the bar $f^4$ connected with a five cent coin receptacle.

On the front of the bracket $g^{18x}$ is mounted a rod or shaft $g^{19}$ upon which are journaled three levers $g^{14}$, $g^{15}$ and $g^{16}$. These levers are of the shape shown in side elevation in Fig. 50. The lever $g^{14}$ is at the right end of the bracket $g^{18x}$ and the two levers $g^{15}$ and $g^{16}$ are at the left end of the same. The forward end of these levers is broadened and extends upward into position to be acted on by pins on the master drums. The upper end of these levers is provided with a bearing surface of such extent that they will be engaged by the drums before the drums would engage the bars $f^4$ or $f^{4x}$, and when once engaged and depressed by the pins of such drums would be held in a depressed position until the very last of the return movement of the drums. Lever $g^{14}$ extends rearwardly of the shaft $g^{19}$ under both of the bars $g^{21}$, $g^{22}$. At the opposite end of the bracket $g^{18x}$ the levers $g^{15}$, $g^{16}$ are located at different distances from the bracket and the rearwardly extending arm of the lever $g^{16}$ passes by the end of the bar $g^{22}$ and extends under the end of the bar $g^{21}$ while the rearwardly extending arm of the lever $g^{15}$ extends under the end of the bar $g^{22}$ only.

Upon the shaft $g$ on which the master drums are journaled are mounted two downwardly extending arms $g^{171}$, one in position above the bar $f^e$ and the other above the bar $f^d$. When either or both of these bars are raised by the lifters, on the backward movement of the shaft $g$ and the master drums one or both of these bars will be engaged and forced backward by one or both of these arms and through their connections with the slides in the coin receptacles will eject a coin from one or both of such receptacles.

The pins on the two master drums $g^{12}$ and $g^{13}$ are so placed that when the change drum indicates two tens and five units or twenty-five cents, when the master drums are drawn backward the pins will first engage levers $g^{14}$ and $g^{15}$. This will depress the forward ends of the levers and raise lifter $g^{23}$ and raise the bar $f^e$ into the path of one of the bars $g^{171}$; the bar $f^e$ will be moved backward and a twenty-five cent coin will be ejected.

It will be seen that when the master drum $g^{13}$ is in the position just described, it will be in the same position that it would be were the amount of change twenty cents, and drum $g^{12}$ will be in the same position it would be were the amount of change five cents. The slides or bars $f^4$ and $f^{4x}$ that would normally be operated by these drums when in this position, must be kept from movement. This is effected by the upwardly extending projections of the lifter $g^{23}$. When the lifter $g^{23}$ is raised it lifts the two bars $f^4$ connected with two of the receptacles containing ten cent coins and also the bar $f^4$ associated with the master wheel $g^{12}$ and connected with one of the receptacles containing five cent coins. These parts being raised, when the bars $f^{4x}$ are engaged and forced backward by the drums, the corresponding bars $f^4$ will not be actuated. If both lifters are raised at one time by the actuation of the three levers $g^{14}$, $g^{15}$, $g^{16}$, thirty-five cents will be ejected, one twenty-five cent coin and one ten cent piece. The necessary combinations of these parts to secure the ejection of coins for any amount of change less one dollar, can be readily made.

It may be sometimes desired to mark or stamp each coin with the designating character of the clerk depositing the same. Accordingly I have devised and incorporated in the cash register herein described and shown in the drawings, a mechanism for this purpose. The main mechanism for accomplishing this result is shown in Figs. 41, 42, 43 and 44 while the connections with other parts will be seen in Figs. 2, 3, 7 and 8. By reference to Figs. 3 and 8, it will be seen that a shaft $l$ located in the smaller compartment is provided with a bevel gear $l'$ meshing with the bevel gear $g^{110}$ on shaft $g^{10}$. The shaft $l$ extends downwardly and inclines toward the front of the casing. About one-third of its length from the shaft $g^{10}$ it is provided with the bevel pinion $l^{21}$ gearing with a bevel pinion $l^{22}$ on a short shaft $l^{23}$. This shaft at its opposite end is provided with a bevel pinion $l^{24}$ meshing with a like pinion $l^{25}$ on shaft $l^{26}$. This latter pinion is splined upon the shaft $l^{26}$, so that rotary motion is imparted to the shaft, while a longitudinal movement of the shaft is permitted, the pinion $l^{25}$ being held from movement in one direction by the partition dividing the casing and in the other by a bracket $l^{25x}$ (see Fig. 3).

In Figs. 41, 42, 43 and 44 $b$ indicates one of the coin chutes of the machine. In Fig. 42 there is shown the bend of the chute immediately below the opening in the front wall of the casing. At a short distance from the forward wall of the chute is placed a stop $b'$. The distance of this stop from the forward wall of the chute is sufficient to permit a coin passed into said chute to rest steadily between the two. The chute is also provided with an aperture $b^2$ to permit the marking or stamping wheel to come in contact with the coin. It will be seen from an inspection of Figs. 41 and 43 that there are two different modes of operating the coin stamping or printing devices. This is found desirable as one operates to engage a coin on the right and the other to engage a coin on the left. The one, therefore, can be used in places where the other cannot conveniently be used, and by the use of the two space may be economized. Referring to Figs. 41 and 42, the shaft $l^{26}$ is provided with the collars $l^{36}$. A forked lever $l^{37}$ pivoted at $l^{38}$ has its forked end embracing the shaft between them. The other end of the lever constitutes the shaft $l^{28}$ upon which is revolubly mounted the type wheel $l^{27}$ having on its periphery projecting types of the designating characters of the clerks or salesmen. Secured to this type wheel and for joint movement therewith, is the gear wheel $l^{29}$ which meshes with the gear $l^{30}$ on the shaft $l^{26}$. It will be seen that when the shaft $l^{26}$ is moved to the left the parts will be moved to the position shown in dotted lines Fig. 41, bringing the type wheel sharply in contact with the coin in the chute. The stop in the chute is secured to a sliding rod $b^{1x}$ which passes through the chute and is held in normal position with the stop in the chute in position to arrest the movement of a coin therein by the spring $b^{2x}$. To the opposite end of the rod $b^{1x}$ is pivoted the hook $l^{40}$, which is held from descending below a certain level by a pin $l^{40x}$. The forked lever $l^{37}$ is provided with a pin $l^{39}$, which is so placed that when the lever is actuated by the movement of the shaft $l^{26}$ to the left the pin engages the hook and raises the same thereby permitting the pin to pass the point of the hook, the weight of the latter causing the hook to fall and catch upon the pin as the wheel $l^{27}$ comes in contact with the coin in the chute. On the return movement of the shaft to the right the pin pulls the rod to the left drawing the stop $b'$ out of the path of the coin permitting the latter to pass down the chute to its proper receptacle. The pin $l^{39}$, moving in a descending curve is shortly disengaged from the hook and the spring $b^{2x}$ returns the stop to its normal position to arrest the next coin inserted in the chute.

In the construction shown in Figs. 43 and 44, the type wheel is carried by a lever $l^{42}$ of a construction similar to the lever $l^{42}$. In this case the downwardly inclining ends of the lever which is pivoted at $l^{42x}$ is slotted at $l^{43}$ and this slot is engaged by a pin $l^{44}$ extending from a collar $l^{45}$ secured upon the shaft $l^{26}$ for longitudinal movement therewith but permitting the shaft to revolve freely within it. At one side of the path of movement of the type wheel there is pivoted to the chute a triangular plate $b^3$ having a projection $b^4$ which normally extends within the chute and constitutes the stop for the coin. To this plate a hooked pawl or dog $b^6$ is pivoted at $b^{6x}$. The weight of the pawl or dog maintains it in its lowest position against a pin $l^{3x}$ secured to the plate $b^3$. The lever $l^{42}$ is provided with a pin $l^{39}$, which on the movement of the type wheel toward the chute engages the pawl or dog $b^6$ forcing the same out of its path and on the return movement the pin engages the pawl and swings the plate $b^3$ to the right withdrawing the lug or projection $b^4$ from the chute permitting the coin to pass downward. The pin $l^{39}$ moving in a curve before reaching its highest point escapes from the pawl and permits the plate $b^3$ and its projection $b^4$ to return to normal position. The shaft $b^{8x}$ within the smaller compartment is provided with a rigid arm $b^{35x}$ see Fig. 4$^a$ to which is pivoted a link $l^{35}$, the lower end of which passes through a guide $l^{34x}$ secured to the outer wall of the casing. Within this compartment is also pivoted the bell crank lever $l^{31}$, the longer arm of which extends upwardly and engages the end of the shaft $l^{26}$. The shorter arm of this lever extends in an inclined direction downward toward the sliding bar $l^{35}$. Upon this sliding bar is pivoted the hook or pawl $l^{34}$. This pawl is of a shallow hook form and when moved upwardly will maintain a hold upon the shorter arm of the lever $l^{31}$ so long as the same is in a position below the horizontal, but will release the arm of the lever when the latter reaches a horizontal position. Whenever a coin is inserted in any of the openings in the face of the casing and passes into the chute the shaft $b^{10}$ is partly revolved drawing the sliding bar $d^{35}$ downward causing the pawl $l^{34}$ to pass below the shorter arm of the bell crank lever $l^{51}$. As soon as the coin drops below the turn in the chute or below the lever $b^8$ a spring raises the link $l^{33}$ causing the dog $l^{34}$ to engage the bell crank lever $l^{31}$ and move the shaft $l^{26}$ sharply to the left effecting the movement of all of the printing wheels $l^{27}$ connected therewith.

It will be seen that the shaft $l$ is geared with the disk indicating drum and moves in unison therewith, and the parts are so arranged that the last movement of the clerks drum to bring the clerks designating character and the word "Cash" to the opening before it, also brings the same clerks character on the printing wheels $l^{27}$ to the position to impress the same upon a coin.

The lower end of shaft $l$ is provided with a bevel gear $l^2$ which meshes with a bevel gear $l^{100}$ on a horizontal shaft $l^3$ carried in a series of arms $l^{5x}$ pivoted to the front of the casing, the opening in the partition between the two compartments through which the shaft passes being sufficiently large to permit the shaft $l^3$ to have a slight swinging movement on said arms. A spring $l^{3x}$ connected to the arms $l^{5x}$ at each end of the shaft normally maintains the shaft in an elevated position with the arms at each side of the compartment in contact with stops $l^{4x}$ in the wall of the casing and the partition.

The shaft $l^3$ in line with each of the bill buckets is provided with a drum of wheel $l^4$ having on its periphery the clerks designating characters in raised type. This shaft, as will be readily seen, is connected with the clerk indicating drum for joint movement therewith and the characters thereon like those of the coin stamping drums are arranged to be brought into the proper position for printing when the clerks indicating drum has been moved to the proper position to show the clerks indicating characters and the word "Cash."

Links $l^5$ pivoted upon the shaft $l^3$ extend downward and are pivoted at $l^6$ to arms $l^7$ rigidly secured to a shaft $l^{19}$ extending across the larger compartment, below the lever $a$ and an arm $l^{20}$ extends forward from the shaft beneath each of the levers $a$ so that when any one of the levers $a$ is depressed before reaching the limit of its downward movement it will come in contact with one of the arms $l^{20}$ thereby depressing the shaft $l^3$ and all of the printing wheels carried thereby.

A shaft $p$ (see Fig. 3 and Figs. 45 to 48 inclusive) extending across the larger compartment of the casing is provided with paper carrying rolls $p'$ movably mounted thereon, and a strip of paper leading therefrom over an idler roller $p^2$, partially around a feeding drum $l^{14}$ and between a printing bed $l^{10}$ and each of the printing drums $l^4$. These feeding drums are preferably mounted for independent movement on a shaft $l^{14x}$ extending across the larger compartment of the casing. To each feeding drum is secured a ratchet $l^{15}$. This ratchet is engaged by a pawl secured to a lever $l^{16}$ pivoted on the shaft $l^{14x}$. The outer end of this lever is slotted and a pin passing through said slot is secured to the upper end of a sliding bar $l^{17}$ Fig. 2$^a$. The bar $l^{17}$ is slotted near each end and pins $l^{17x}$ pass through said slots to insure a right line movement. A spring secured to the lever $l^{16}$ serves to normally maintain the two devices in an elevated position. The bar $l^{17}$ slightly below the point at which the lever $a$ crosses it, when both are in normal position, is provided with a spring pawl extending beyond the forward side of the link, and the lever $a$ is provided with a pin that in such position is slightly above the said pawl. On moving the lever $a$ downward the pin engages the pawl and depresses the link. As the pin moves in the arc of a circle, when the bar $l^{17}$ has been depressed sufficiently to effect the proper feed of the paper strip, the pin will leave the pawl allowing the spring connected with the lever to draw the lever and bar upward to normal position. The further downward movement will depress the shaft $l^3$ and all of the printing wheels carried thereby. The wheel at which there has been a feed of the paper strip will print the clerks designating character upon the same. At the same time, a knife $l^{12}$ will sever the paper strip and when the wheel is raised by the springs connected to the shaft $l^3$, the severed strip of paper with the clerks designating character printed thereon, will drop into the bill box beneath the same upon the bill just deposited therein. The printing bed is notched at $l^{11}$ to receive the knife in its movement downward to sever the paper strip.

I sometimes provide a time mechanism with the printing devices for printing the cash and credit sales, and employ devices actuated thereby to print in the time column of the account sheet shown in Fig. 70 the hours of the day. This will enable the proprietors to see the amount of business transacted during any given hour of the day. The devices for accomplishing this are shown in Figs. 2, 8, 64 and 65. The time mechanism is not shown as such devices are old and well known. The simplest method of connecting it for the purposes described, is to place such a mechanism in the casing, and connect the shaft carrying the hour hand with the shaft $q$ (see Fig. 64) and also connect the sleeve or hollow shaft carrying the minute hand with a hollow shaft or sleeve $q'$. To the shaft $q$ is secured the printing wheel $m^{57}$, while to the sleeve is connected the gear wheel $q^2$. This gear wheel meshes with another gear $q^3$. To one side of the gear wheel $q^2$ is secured a tappet or cam $q^4$. A lever Q pivoted at $q^5$ is provided with a lug $q^6$ lying in the path of the tappet or cam $q^4$. A spring $q^7$ is connected with said lever and serves to draw the same toward the cam and maintain the projection $q^6$ in contact therewith.

The lever Q is formed in two parts hinged together at $q^8$. The hinge is of the knife blade type. It is constructed in a well known way, see Fig. 65$^a$, so that the upper part cannot be turned any farther to the right than it is shown in the drawing, while it is free to move a short distance to the left. One or more short plate springs $q^9$ are employed to maintain it in the position shown. These parts are placed in the casing in the position shown in Fig. 8 so that the account sheet passes between the outer end of the lever Q and the wheel $m^{57}$, the periphery of the latter being provided with the figures from 1 to 12 to correspond with the hours on the dial of the clock. The lever Q opposite the wheel is provided with a flat striking or pressure face $q^{10}$. As the time mechanism moves, the cam $q^6$ forces the lever farther and farther away from the printing wheel $m^{57}$ until the point of the tappet is reached. At this point the tappet passes the projection $q^6$ and the spring draws the lever Q quickly toward the tappet bringing the projection $q^6$ against the lower grade of the cam. There is sufficient weight in the upper end of the lever to cause it to be carried by its momentum against the force of the springs beyond its normal position in respect to the main body of the lever. The face $q^{10}$ strikes the paper against the printing wheel with a quick blow or pressure, printing on the paper the number on the printing wheel opposite the face $q^{10}$. The plate springs before described immediately withdraw the lever end until the lever is again brought into operation by the time mechanism.

As a means of securing the bill boxes or buckets from being tampered with, I provide a lock for locking them from movement except in the regular order of operation for a business transaction. The mechanism for accomplishing this is shown more particularly in Figs. 8, 21, 22 and 23. To the shaft $a^{53x}$ is rigidly secured an arm $b^{38}$ extending rearwardly therefrom. A lever $c^8$ is pivoted at $c^{8x}$. A link or bar $c^6$ is pivoted to the lever $c^8$ intermediate its ends and extends rearwardly, its rear end being pivoted to the vertically disposed arm of a bell crank lever $k^{30}$. The other arm of this bell crank lever is pivotally connected to a link or bar $k^{29}$. The lower end of this bar $k^{29}$ is bifurcated, the main shaft $k^6$ passing through the fork thus formed. The lower ends of the bifurcated portion of the bar are secured to a bearing plate $k^{29x}$. On one or both sides of the link or bar $k^{29}$ the shaft $k^6$ is provided with a cam or tappet $k^{28}$, the bearing plate extending on each side of the link $k^{29}$ far enough to be engaged by said cam or cams $k^{28}$ during the revolution of the shaft. On the underside of the link $c^6$ is a projection $c^7$ and a lever $c^9$ is pivoted with its upper end in close proximity to the projection $c^7$. The lower end of the lever lies in the path of a pin $g^{122}$ secured to the clerk indicating drum $g^{11}$, see Fig. 21.

When the clerk indicating drum is actuated the pin moves the lower end of the lever $c^9$ forward causing the upper end thereof to engage the projection $c^7$ of the link $c^6$ and move said link backward drawing the lever $c^8$ rearwardly from under the arm $b^{38}$, thereby permitting the shaft $a^{53x}$ to be turned and permitting the levers $a$ to be drawn down or the shaft to be turned by the insertion of a coin in one of the coin openings or chutes. This movement of the link $c^6$ draws the bar $k^{29}$ upward bringing the bearing plate $k^{29x}$ close to the shaft $k^6$. When the shaft $k^6$ is rotated at the close of the series of operations for a business transaction, to expel coin for change or to open a bill bucket to enable change to be made, the cam or tappet $k^{28}$ will come in contact with the bearing plate and force it downward, thereby throwing the lever $c^8$ again under the arm $b^{38}$, locking the parts as desired. In order to secure the coin expelling devices in a like manner from action unless as a part of the operation of the machine in connection with a business transaction, I provide a means whereby the bars $f^4$ are held from movement unless a coin is inserted or a bill placed in a bucket. The bar $f^{100}$ (Fig. 8) extends across the machine beneath the forward ends of the bars $f^4$. This bar $f^{100}$ that passes through the brackets $g^{18x}$ between the lifters $g^{23}$ and $g^{24}$ is supported at each end by a toggle lever $f^{101}$. A bar $f^{102}$ is connected to the central pivot of each of these toggle levers. The rear ends of these bars are slotted and a pin secured to the link $k^4$ engages such slot. The forward end of each bar $f^{102}$ is pivoted to an arm $f^{103}$ secured to a shaft $f^{105}$. An arm $f^{104}$, secured to this shaft extends forwardly beneath a pin $a^{100}$ secured in link $a^{54}$. The arrangement is such that when the shaft $k^6$ is revolved, during the latter half of the movement, the pin in link $k^4$ engages the forward end of the slot in the bar $f^{102}$ and moves that bar forward, flexing the toggle lever and lowering the bar $f^{100}$ thereby lowering the forward ends of the bars $f^4$ out of operative position. The movement of the bar $f^{102}$ also moves the arm $f^{103}$ forward partially turning the shaft $f^{103x}$ and raising the arm $f^{104}$ into close relation to the pin $a^{100}$ on the link or sliding bar $a^{54}$. When the parts are in this position a revolution of the shaft $k^6$ will not effect any movement of the coin discharging devices. When a coin is inserted in one of the coin slots or chutes and the shaft $a^{3x}$ is turned the link or sliding bar $a^{54}$ will be depressed. The pin $a^{100}$ will then engage the arm or lever $f^{104}$ and forcing the same downward will move the bars $f^{102}$ rearwardly straightening the toggle and raising the bar $f^{100}$ and the forward ends of the bars $f^4$ into operative position.

As before indicated the first thing for a salesman and clerk to do upon completing a sale is to press the push key having his letter or other designating character, the first result of this action is to return the indicating drums and connected parts including the printing, master drums and the frame $b^{31}$ to their normal or original positions. This is effected by the following instrumentalities, see Figs. 2, 4, 7, 8, 11. At the rear of the casing near the top of the same a shaft $k^{15}$ extends from side to side through both compartments of the casing. Within the smaller compartment a pulley $k^{16x}$ having attached or made integral therewith a sprocket $k^{16}$, is secured to shaft $k^{15}$. A cord or chain $k^{20x}$ passes around the pulley and carries a weight $k^{20}$. On the sprocket is a sprocket chain $k^{17}$ which extends forward and passes around another sprocket wheel secured to a shaft $b^{22x}$, carried in the forward ends of arms or levers $b^{22}$, the rear ends of which are rigidly secured to a shaft $b^{23x}$. Three of the arms $b^{22}$ see Fig. 4 are within the larger compartment of the casing and one is within the smaller compartment thereof.

The clerk drum and each of the sections of the indicating drums is provided with a mutilated gear wheel of the form shown in Fig. 69 having a space $b^{28}$ from which the teeth are removed. On the shaft $b^{22x}$ are mounted a series of gear wheels $b^{23}$ each meshing with a mutilated gear of the clerk drum and sections of the indicating drums. The shaft $b^{22x}$ is normally held in an elevated position with its gears $b^{23}$ out of mesh with the mutilated gears by springs $b^{25x}$ bringing one or more of the gears $b^{23}$ into position to have the teeth of the same engage with a pawl or pawls $b^{24}$ secured in the casing near the upper wall of the same in any preferred manner. It will thus be seen that so long as the shaft $b^{22x}$ and the gear wheels $b^{23}$ are held in their elevated position such shaft and wheels will be held from movement and that when such shaft and wheels are depressed so as to be forced from engagement with the pawl or pawls $b^{24}$ the wheels and shaft will be actuated by the weight through the sprocket chains.

The forward end of the lever $b^{22}$ within the smaller compartment is provided with an upwardly extending dovetailed or T-headed lug $b^{220}$ (see Figs. 37 and 38). On this is slidingly mounted a nose portion $b^{25}$ which is maintained in a forward position beyond the end of the lever $b^{22}$ by a spring $b^{10x}$. This nose portion is provided with a lug $b^{26}$ extending toward the sprocket chain and the chain is provided with a projection $k^{18}$ extending from the side of the same, the lug $b^{25}$ lying in the path of the projection $k^{18}$.

Upon the shaft $a^{53x}$ in the front of the casing, an arm $b^{11}$ is loosely mounted, see Fig 4ᵃ. It extends rearwardly and its end is above the nose $b^{25}$ of the lever $b^{22}$. To the arm $b^{11}$ is pivoted a link $b^{11x}$ that extends downwardly and has its lower end pivoted to an arm $b^{101}$ extending forwardly from a shaft $b^{100}$. This shaft extends into the larger compartment and at the left end of the same is provided with a rearwardly extending arm $b^{102}$, see Fig. 4ᵇ. This arm or at least a portion of it lies above and in the path of movement of the upper end of the lever $c^3$. A spring connected with the arm $b^{11}$ maintains the arm and link in their highest position.

When a clerk key is pressed the upper end of lever $c^3$ immediately engages the underside of the arm $b^{102}$ forcing the same upward. This turns the shaft $b^{100}$ and draws down the arm $b^{11}$, bringing the gears $b^{23}$ into contact with the mutilated gears beneath them. The gears $b^{23}$ being released from the retaining pawl or pawls $b^{24}$, the weight $k^2$ through its connections revolves the same and such of the mutilated gears as are out of normal position and connected devices are returned to normal.

The arm $b^{102}$ is of such construction that the lever $c^3$ cannot pass backward from under it while it is engaged with the nose $b^{25}$ of the lever $b^{22}$, so that the lever $c^3$ is held from actuating the clerk indicating drum until the normalizing devices just described have completed their action. The projection $k^{18}$ is located so that as soon as the devices moved thereby are restored to their original positions by the normalizing devices it will engage the projection $b^{26}$ of the nose piece and move it rearwardly from under the arm $b^{11}$. The springs connected therewith will then raise shaft $b^{22x}$ and the gears $b^{23}$, the pawls $b^{24}$ will be reëngaged and the movement of the said shaft and gears will be arrested. The disengagement of the nose $b^{25}$ from the arm $b^{11}$ causes the lever $c^3$ to now complete its rearward movement. When the lever $c^3$ passes from under the arm $b^{102}$ the spring connected with the arm $b^{11}$ raises such arm and link $b^{11x}$ and depresses the arm $b^{102}$.

The rear end of the arm $b^{102}$ is so shaped that when the retracting spring of the lever $c^3$ draws such lever forward to its normal position, it will raise the arm $b^{102}$. This action will depress the arm $b^{11}$ but as the nose $b^{25}$ is held in its rearward position by the projection $b^{18}$ on the sprocket chain $b^{17}$, it will have no effect on the normalizing devices. For the same reason the additional movement of the lever $c^3$ to cause the clerk indicating drum to show a cash transaction produces no change of parts further than to move the link $b^{11x}$ and arm $b^{11}$ and the final return of the lever $c^3$ to normal position will leave the arm $b^{11}$ and the parts connected therewith also in normal or original position. The sprocket chain $k^{17}$ is also provided with a projection $k^{19}$ projecting from the outer face of the chain. During the movement of the chain necessary for the full movement of the normalizing devices this projection will come in contact with an arm $b^{29}$ rigidly secured to shaft $b^{29x}$ extending entirely across the casing through both compartments thereof. The arm $b^{29}$ is within the smaller compartment.

Within the larger compartment the shaft $b^{29x}$ is provided with two arms $b^{30x}$ extending from the shaft $b^{29x}$ in the same direction as arm $b^{29}$, one opposed to each end of the frame $b^{31}$. A link $b^{30}$ pivoted to each of these arms extends forward and is pivoted to the end plates of the frame $b^{31}$. When the arm $b^{29}$ is engaged by the projection $k^{19}$ of the sprocket chain, the arm $b^{29}$ is moved forward and the shaft turned. Through this movement of the arms $b^{30x}$ and the links $b^{30}$ the frame $b^{31}$ is moved or swung forward, in position to have the "Amt. received" and "Change" drums actuated by a lever $a$ or by the insertion of a coin.

The rearward movement of the frame $b^{31}$ is effected by the push keys of the series $c$, $c$, $c'$, $c'$ through the following instrumentalities, see Fig. 83. Above and slightly forward of the upper ends of the levers operated by these keys, a shaft $b^{50}$ extends across the larger compartment. To this shaft are secured two arms $b^{51}$ extending rearwardly and having their rear ends extending a little past the front edges of the end plates of frame $b^{31}$. In the rear ends of these arms $b^{51}$ are pins $b^{52}$ engaging slots $b^{54}$ in the end plates of the frame $b^{31}$.

On the shaft $b^{50}$ immediately above each of the four vertically disposed levers operated by the four series of push keys is an arm $b^{53}$ rigidly secured to shaft $b^{50}$. These arms $b^{53}$ are so positioned that should either of the levers be forced backward by the keys of its series, the upper end of the lever will engage an arm $b^{53}$ and slightly rock the shaft $b^{50}$. This movement of the shaft $b^{50}$ will raise the rear ends of arms $b^{51}$ and move the frame $b^{31}$ rearwardly to position it to have the "Sale" and "Change" drums actuated. This movement of the frame $b^{31}$ takes place before the ratchet bar associated with the lever actuated will engage and move the ratchet of the master drum with which the lever is associated.

On the end of shaft $k^{15}$ opposite that on which are mounted pulley $k^{16x}$ and sprocket $k^{16}$, is a pulley $k^{21}$ upon which a sprocket chain $k^{22}$ is wound in a direction the reverse of that in which the chain $k^{20x}$ is wound upon the pulley $k^{16x}$. This chain is passed over the idle pulley or roller $k^{22x}$ and then passes downward forward of the guide rollers $k^{23}$. These rollers are carried on a swinging frame $k^{24}$ which is slotted to permit the main shaft $k^6$ to pass through and allow the frame to be moved slightly forward and back when desired. The frame $k^{24}$ when in its rearward position is slightly forward of the idler pulley or roller $k^{22x}$, so that the chain rests against the guide rollers $k^{23}$, and the weight of the same also serves to keep the frame in its most rearward position. The frame $k^{24}$ has a downwardly extending arm which is pivoted at $k^{24x}$ so that the walls of the slot do not engage the shaft, thereby permitting the frame to be easily moved.

A cam $k^{27}$ is secured to the shaft in close relation to the frame $k^{24}$. This cam is provided with a reduced or cut away portion $k^{28}$ as shown in Figs. 29 and 30. A short arm $k^{26}$ extends from the frame over the edge of the cam, normally in contact with the cut away or reduced portion $k^{28}$. On the opposite side of the frame $k^{24}$ is a sprocket wheel $k^{25}$ rigidly secured to shaft $k^6$ in the same vertical plane as the sprocket chain $k^{22}$. When, however, the main shaft is turned, the higher part of the cam $k^{27}$ engages the arm $k^{26}$ and moves the frame forward drawing the chain $k^{22}$ against the sprocket $k^{25}$, which engages the links thereof and draws the chain downward reversing the movement of the sprocket chain $k^{17}$ and bringing it back to normal position. The size of the sprocket wheel $k^{21}$ in relation to the pulley on the other end of the shaft, is that a single revolution of the shaft $k^6$ effects the necessary movement of the chain. During this operation the pawl or pawls $b^{24}$ permit the teeth of the gears in contact therewith to pass but on the conclusion of their retrograde motion again hold them against movement by the weight $k^{20}$ until another clerk key is again pressed.

The operation of the machine briefly summed up is as follows: The clerk making the transaction pushes upon the appropriate key. The clerk's key lever on first moving comes in contact with the arm $b^{102}$ and draws down the arm $b^{11}$. This arm engages the nose $b^{25}$ and depresses the shaft $b^{22x}$ and brings the gears carried thereby into mesh with the mutilated gears connected to the sections of the indicating drums. This depression of the shaft releases the gears carried thereby from the action of pawl or pawls $b^{24}$ and the weight $k^{20}$ through the sprocket chain $k^{17}$ turns the shaft $b^{22x}$ until the untoothed portion of all of the mutilated gears come opposite the gears of shaft $b^{22x}$, or until the projection $k^{18}$ of the sprocket chain comes into contact with the projection $b^{26}$ and disengages the nose $b^{25}$ from the arm $b^{11}$ and permits the springs $b^{25x}$ to raise the shaft $b^{22x}$ and raising its gears into normal position. This normalizing of the machine takes but a small fraction of time and the pressure upon the clerk key being maintained the rack connected with lever $c^3$ moves the clerk indicating drum $c^{10}$ to show the clerk's designating character and the word "Charge." This movement of the clerk indicating drum through the shaft $m'$ and connections moves the selector shaft $m^4$ to bring the clerk's credit printing drum and the clerk's credit registering drum into operative connection with the "Sale" drum in the manner already set forth in detail. If the transaction is a credit sale, the clerk presses the proper keys to indicate and register the amount of the sale. The clerk then turns the crank shaft and the amount of the sale is printed in the clerk's credit sale column.

During the operation of the crank shaft and the printing of the amount the master drums are drawn rearwardly, but this movement effects nothing as the slides or bars that might otherwise be affected thereby are below the reach of the master drums, as they rest upon the bar $f^{100}$ which remains in its lowered position. A row of bill buckets will be projected but as only empty buckets are opposite the openings in the main casing no bills will be exposed. If the transaction should be a cash transaction, the clerk would receive money either in coin or in bills. Should a coin be received the clerk would insert the same in its appropriate chute. The insertion of the coin would operate one of the levers $b^8$ turning the shaft $b^{8x}$. The lever $c^3$ having been returned to normal position by its attached spring the turning of shaft $b^{8x}$ through arms $b^9$, shaft $a^{50x}$ and link $b^{13}$ will turn the shaft $b^{15}$ causing the arm $b^{16}$ to move the lever $c^3$ to cause the clerk indicating drum to show the clerk's indicating character together with the word "Cash." The movement of a lever $b^8$ will actuate a lever $b^{10}$ which will turn the "Amount rec'd" drum to indicate the amount of the coin through one or the other of the shafts $b^{17x}$ or $b^{17y}$ and their connections. Should the coin be a twenty-five cent piece, both shafts will be actuated and both units and tens sections of the indicating drum will be moved accordingly. The clerk will now press the "Sale" key and the sale indicating drum will be moved to show the amount of the sale, and the change drum will also be moved to show the amount of change required, and the master drums will also be positioned to bring the pins on the periphery of the same to position to discharge the desired amount of change.

The movement of the lever $b^8$ will in addition to the movements already described depress the bar $a^{54}$ which will, through the arm or lever $f^{104}$ and connections, raise the bar $f^{100}$ and the slides or bars resting thereon into operative position. The crank shaft will now be turned drawing the master drums backward and discharging the change. This action will also project a row of bill boxes but if the amount of the transaction and change is below one hundred cents, only empty buckets will be projected.

If the amount of the transaction involves the receipt and paying out of bills, on drawing down the lever $a$ connected with the series of buckets of the denomination of the bill received, a single empty bill bucket of that denomination will be projected in which the bill will be deposited. On the release of the lever $a$ one of the shafts $a^{46x}$ or $a^{47x}$ will be turned by the spring $a^{40}$ connected with said lever and the rack $a^{52}$ will move the master drum to cause the amount received and change indicating drums to show the amount of the bill. The pressing of the sale key thereafter will first move the frame $b^{31}$ rearwardly through the intervention of shaft $b^{50}$ and arms $b^{51}$ and then will turn the master drum to indicate the amount of sale and the change required. This action will also position the master drum actuated to act upon the proper slide or bar to expose the bill required in change. Upon turning the crank shaft thereafter, the first action will be to move the master drums backward and actuate the proper slide or bar $f^4$ which will, through its connected rack bar $f'$ impart a reverse movement of the sprocket chain and its series of buckets bringing a bucket containing bills of the denomination required in position before an opening in the casing. The further movement of the crank shaft will through the movement of the rock shaft $k'$ project a series of buckets, only one of which, the bucket of the denomination of the bill required in change, will expose any bills. The motion of the crank shaft will be arrested while the bill required for change is removed from the bucket and the completion of the revolution of the shaft withdraws the buckets within the casing.

The downward movement of a lever $a$ will through the shaft $a^{58}$, the arm $a^{59}$ beneath the lever and link $a^{54}$, produce a normalization of the parts remaining in moved position from the previous transaction in a manner similar to that brought about by the insertion of a coin, and during the revolution of the crank shaft just described the toothed wheel $k^{25}$ will actuate chain $k^{22}$ to rewind the weight $k^{20}$ and return the sprocket chain $k^{17}$ to normal position. This movement of the chain permits the spring $b^{10x}$ to move the nose $b^{25}$ back to normal position beneath the arm $b^{31}$. The coin stamping or marking devices are called into operation by the return movement of the shaft $b^{8x}$ after the insertion of a coin, such movement raising the link or bar $l^{35}$ causing the hood $l^{34}$ to move the shaft $l^{26}$ to the left with a quick movement, the marking devices having been previously positioned from the clerk indicating drum through shaft $l^{23}$ and gearing connecting it with shaft $l$.

Having fully described my invention, what I claim as new and desire to secure by Letters Patent, is:—

1. In a machine of the character described, the combination with an exposed "Amount received" indicating device, of a bill receiving means, keys operating said bill receiving device and said indicating device, and coin receiving devices and means connected with said coin receiving devices whereby a coin when inserted operates the "Amount received" indicating device.

2. In a machine of the character described, the combination with an exposed "Amount received" indicating device, of a bill receiving means and coin receiving devices and means connected with the money receiving means whereby the "Amount received" indicating device is actuated from the bill receiving means, and means whereby a coin when inserted also actuates the said indicating device.

3. In a machine of the character described, the combination with a clerk indicating device and a series of keys for operating the same, of a cash and a credit registering device for each clerk, money receiving means, a series of sale keys and means whereby the keys for actuating the clerk indicating device will bring the credit registering device of the clerk shown by the clerk indicating device into operative relation with the sale keys and means whereby the money receiving means when operated will bring the cash registering device of such clerk into such operative relation.

4. In a machine of the character described, the combination with a clerk indicating device and a series of keys for operating the same, of a series of registering devices for each clerk, a series of sale keys for actuating said registering devices and a series of conjointly moving selectors actuated by the clerk keys for bringing the registering device of the clerk shown by the clerk indicating device into operative connection with said sale keys.

5. In a machine of the character described, the combination with a clerk indicating device and a series of keys for actuating the same, of a credit registering device and a cash registering device for each clerk, sales keys and money receiving devices, means connected with said clerk keys for bringing the credit registering device of the clerk shown in the clerk indicating device into operative relation with the sale keys, and means connected with the money receiving devices for bringing the cash registering device of such clerk in o operative relation with said sales keys, the construction including means whereby the money receiving devices also move the clerk indicating device to indicate a cash transaction.

6. In a machine of the character described, the combination with a clerk indicating device having a designating character for each clerk thereon with the word "Charge" associated therewith, and also such character with the word "Cash" in like relation, of clerk keys, sales keys, a credit registering device and a cash registering device for each clerk, money receiving devices, said clerk keys being adapted to cause the said indicating device to show the clerk's character and the word "Charge," means connected with the money receiving devices to cause the said indicating device to show the clerk's character and the word "Cash," and means whereby proper operation of the said devices will bring the appropriate registering device into operative relation with the sales keys.

7. In a machine of the character described, the combination with a clerk indicating device, and a series of keys for operating the same, of a series of registering and recording devices one for each clerk, a series of sale keys for actuating the same, and a single series of selectors actuated by said clerk keys for bringing said registering and recording devices of the clerk shown on the clerk indicating device into operative relation with the sale keys.

8. In a machine of the character described, the combination with a clerk indicating device, of a series of keys for actuating the same, a registering device for the cash and one for the credit sales of each clerk, a series of sale keys for actuating said registering devices, recording devices, and a single set of selectors for bringing the appropriate registering device and the recording device into operative relation with the sale keys.

9. In a machine of the character described, the combination with a clerk indicating device, of a series of keys for actuating said indicating device, a registering device for the cash sales, and one for the credit sales of each clerk, sale keys for operating said registering devices, a cash and a credit recording device and a single series of selectors for bringing the appropriate registering and recording devices into operative relation with the sale keys.

10. In a machine of the character described, the combination with clerk indicating devices, a cash and a credit registering drum, and a cash and a credit printing drum, sale keys for operating the registering devices and for setting up the amount of sale on the printing devices, a single series of selectors for bringing the appropriate registering and the appropriate printing drum into operative relation with the sale keys.

11. In a machine of the character described, the combination with a clerk indicating device having on it each clerk's indicating character, and the word "Charge" and each clerk's indicating character and the word "Cash," a series of keys adapted to operate the said indicating device to show the clerk's designation and the word "Charge," money receiving devices and connections to operate the said indicating device to show the clerk's indicating character and the word "Cash."

12. In a machine of the character described, the combination with a clerk indicating device having on it each clerk's designating character and the word "Charge" in close proximity and having also the clerk's designating character and the word "Cash" in like relation, a series of keys adapted to operate the said indicating device to show a clerk's indicating character and the word "Charge" and coin receiving devices in which a coin when inserted will operate said indicating device to show the clerk's indicating character and the word "Cash."

13. In a machine of the character described, the combination with a clerk indicating device having thereon each clerk's designating character and the words "Charge" and "Cash" associated therewith, of a series of keys to actuate the same and show the clerk's designating character and the word "Charge," a series of bill receiving receptacles normally closed and a series of keys each adapted to open a bill receptacle and change the clerk's indicating device to show the clerk's designating character and the word "Cash."

14. In a machine of the character described, the combination with an indicating device and key mechanism to operate the same to show the word "Charge" when a sale is made, of bill and coin receiving devices adapted on the insertion of a bill or coin to cause the said indicating device to show the word "Cash."

15. In a machine of the character described, the combination with a clerk indicating device having on it each clerk's designating character and the word "Charge" associated therewith, and one step in advance thereof, the same clerk designating character and the word "Cash," a series of keys to actuate said indicating character and the word "Charge," money receiving devices and connections adapted when actuated by the act of receiving money to advance the said indicating device one step to show the same clerk's indicating character and the word "Cash."

16. In a machine of the character described, the combination with a clerk indicating drum, said drum having thereon in two places adjacent to each other a designating character for each clerk, in one place the character being associated with the word "Charge" and in the other the character associated with the word "Cash," keys to rotate the said drum to show a clerk's designating character and the word "Charge," coin receiving devices and means connected therewith whereby a coin when inserted will rotate said indicating drum to show the same clerk indicating character and the word "Cash."

17. In a machine of the character described, the combination with an indicating device and key mechanism to operate the same to show the word "Charge" when a sale is made, of bill receiving devices, keys for operating the same, and coin receiving devices adapted to be operated by the insertion of a coin, the bill receiving and coin receiving devices adapted when actuated to cause the indicating device to show the word "Cash."

18. In a machine of the character described, the combination with exposed "Amount received," "Sale" and "Change" indicating devices, of coin receiving and bill receiving mechanism, of mechanism connecting the said money receiving devices to move the "Amount received" and "Change" indicating devices in one direction and sale keys for moving the "Sale" and "Change" indicating devices in the opposite direction and means for returning said indicating devices to normal after each transaction.

19. In a machine of the character described, the combination with exposed "Amount received," "Sale" and "Change" indicating devices, of a coin receiving mechanism adapted to be operated by the insertion of a coin, and connections for moving the "Amount received" and "Change" indicating devices in one direction and sale keys for moving the "Sale" and "Change" devices in the opposite direction and means for returning said indicating devices to normal after each transaction.

20. In a machine of the class described, the combination with a clerk indicating device and keys for actuating the same to show a clerk's character and the word "Charge," of coin receiving means, devices whereby the insertion of a coin will change the word "Charge" to "Cash" and means for marking the coin inserted with the clerk character shown by the clerk indicating means.

21. In a machine of the character described, the combination with a clerk indicating device, of a plurality of registering devices for each clerk, sale keys for actuating said registering devices, a separate printing mechanism for each clerk, and selectors for selecting the printing device of the clerk shown by the clerk indicating device, the said selectors being adapted to move the selected printing device, which movement brings the printing device and its corresponding registering device into operative relation with the sale keys.

22. In a machine of the character described, the combination with a clerk indicating device, of a coin receiving means, keys for operating the clerk indicating device and positioning a printing device to print the clerk indicating character and mechanism connected with the said coin receiving means whereby a coin when inserted causes said printing device to print the clerk character shown by the indicating device upon the coin.

23. In a machine of the character described, the combination with bill receiving devices, of means for marking a paper with a mark designating the clerk depositing the bill and depositing it with the bill, and means for supplying said paper to said marking means.

24. In a machine of the character described, the combination with a bill receiving mechanism, of means for supplying a paper strip, devices for marking said strip with a character designating the clerk depositing the bill and depositing a section of said strip with the bill deposited.

25. In a machine of the character described, the combination with a bill receiving mechanism, of mechanism for marking a strip of paper with a mark designating the clerk depositing a bill, means for supplying a strip of paper to said marking means, and means for severing the marked portion from the strip and depositing it with the bill.

26. In a machine of the character described, the combination with a clerk indicating device and keys for operating the same, of a bill receiving mechanism, means for marking a paper with the designation of the clerk shown by the clerk indicating means and depositing it with a bill in the bill receiving devices, and means for supplying paper to said marking means.

27. In a machine of the character described, the combination with a bill receiving means normally inaccessible, of keys for making the same accessible, means operated by said keys for marking a paper with the designation of a clerk and dropping it into the bill receiving devices, and means for supplying paper to said marking means.

28. In a machine of the character described, the combination with a clerk indicating device and keys for operating the same, of bill receiving devices normally inaccessible, keys for making them accessible, a marking device operated by said bill receiving keys for marking the clerk designation shown by the clerk indicating device on paper and placing the same in the bill receiving devices, and means for supplying paper to said marking means.

29. In a machine of the character described, the combination with bill receiving means normally inaccessible, of keys for actuating such means to make the same accessible, of means actuated by said keys to impress a clerk's designating character upon a paper, and to deposit it in the bill receiving device brought to accessible position by the key actuated.

30. In a machine of the character described, the combination with a clerk indicating device and a device for marking the characters of the said indicating device, the same being connected for joint movement, of keys for actuating the indicating device and positioning the marking device, bill receiving means normally inaccessible, keys for bringing them to accessible position and impressing the clerk designating character shown by said indicating device upon paper and depositing it in the bill receiving device.

31. In a machine of the character described, the combination with a clerk indicating device and a device for marking the clerk indicating characters, the same being connected for joint movement, of keys for actuating said devices to properly position the same, means for supplying a strip of paper to said marking device, bill receiving devices normally inaccessible, keys for bringing said bill receiving devices to accessible position and for impressing the clerk's designating character upon said strip and a device also operated by said keys for severing the marked portion of said strip and depositing it in said bill receiving device then in accessible position.

32. In a machine of the character described, the combination with the coin receiving means, consisting of receptacles for said coins and chutes for conducting coins thereto, of means for marking the coins with a mark designating the clerk making the transaction, means for arresting and holding a coin in said chutes to be marked and means for releasing it after marking.

33. In a machine of the character described, the combination with an exposed clerk indicating device, and keys for operating the same, of coin receiving chutes and means for marking said coins with the clerk designation shown by said clerk indicating mechanism, means for holding a coin in said chutes to be marked and means for releasing it after marking.

34. In a machine of the character described, the combination with a plurality of cents receiving receptacles, of a means for expelling said coins unequally from said receptacles and a chute for conducting said coins to said receptacles, said construction including means for distributing said coins unequally to said receptacles.

35. In a machine of the character described, the combination with a plurality of cents receiving receptacles, of a chute for conducting said coins to said receptacles, said construction including means for distributing said coins unequally among said receptacles.

36. In a machine of the character described, the combination with a plurality of cents receiving receptacles, of means for expelling said coins unequally from said receptacles and a chute for conducting said coins to said receptacles, said chute construction including means for distributing said coins among said receptacles in proportion to the number of coins discharged from each by the coin expelling mechanism.

37. In a machine of the character described, the combination with a plurality of cents receiving receptacles, if a chute for conducting said coins to said receptacles, the discharge end of said chute being adapted to swing from one receptacle to another and means for swinging the same to convey the coins to the different receptacles.

38. In a machine of the character described, the combination with a plurality of cents receiving receptacles, of a means for conducting the coins to said receptacles, comprising a chute provided with a swinging discharge section, means to cause the said swinging portion to move from one position to another to deposit said coins in succession in said receptacles and to automatically return to its original position and repeat the operation.

39. In a machine of the character described, the combination with a plurality of cents receiving receptacles, of means for conducting said coins to said receptacles, comprising a chute having a movable discharge section, means for moving said movable section and depositing a different number of coins in each receptacle, and means to automatically repeat the operation.

40. In a machine of the character described, having registering devices for a plurality of clerks, the combination with means for separately registering the credit and cash sales of each clerk, of means for separately recording each credit and each cash sale of each clerk, and means for registering the total sales of each clerk.

41. In a machine of the character described, having registering devices for a plurality of clerks the combination with means for separately registering the cash sales of each clerk, of means for separately registering the total charge or credit sale of each clerk, and means for separately registering the total sales both cash and credit of each clerk.

42. In a machine of the character described, having registering devices for a plurality of clerks the combination with means for separately registering the total cash sales of each clerk, means for separately registering the total credit sales of each clerk, means for registering the total cash and credit sales of each clerk and means for registering the total cash sales of all the clerks and means for registering the total credit sales of all the clerks.

43. In a machine of the character described, having registering devices for a plurality of clerks the combination with means for separately registering the total cash sales of each clerk, means for separately registering the total credit sales of each clerk, means for separately registering the total sales of each clerk and means for registering the total sales of all the clerks.

44. In a machine of the character described, the combination with a clerk indicating device for indicating the clerk making a sale, a cash and a credit registering device for the clerk shown by the indicating device, means for actuating said clerk indicating device, a sale indicating device and means for actuating the same, cash receiving devices, means connected with the clerk indicating device to bring the credit registering device into operative relation with the sale indicating device and mechanism connected with the cash receiving devices for bringing the cash registering device into operative relation with the sale device.

45. In a machine of the character described, the combination with a cash registering device for each clerk, of a sale indicating device, cash receiving devices, means connected with said cash receiving devices for bringing said clerk registering devices into operative relation with said sale indicating device and means for actuating said sale indicating device and clerk's registering device.

46. In a machine of the character described, the combination with a cash registering device and a credit registering device for each clerk, means for selecting the credit registering device of a clerk making a sale, cash receiving devices and means connected therewith for changing said selection from credit to a cash registering device on inserting money in said cash receiving devices.

47. In a machine of the character described, the combination with a clerk indicating device, of a cash and a credit registering device for each clerk, a sale indicating device, and means for actuating said clerk indicating device and bringing a credit registering device into operative relation with said sale indicating device, cash receiving devices and means connected therewith for substituting a clerk's cash registering device for the clerk's credit registering device for operation from the sale mechanism, and means for actuating said sale mechanism.

48. In a machine of the character described, the combination with an amount received indicating means, of coin receiving means and mechanism actuated by the insertion of a coin as it is inserted to operate the amount received indicating means to show the value of the coin inserted, a sale and change indicating means, and keys to actuate the sale indicating means to show the amount of a sale and the change indicating device to show the difference between the amount of sale and the amount received.

49. In a machine of the character described, the combination with an amount received indicating means, of a coin receiving means, and mechanism connected therewith to cause the coin as it is inserted to actuate the amount receiving means to show the value of the coin deposited, a sale and change indicating means and keys for actuating said sale indicating means to show the amount of sale and the change indicating means to show the change required, said combination showing the amount received, amount of sale and amount of change at one and the same time.

50. In a machine of the character described, the combination with an exposed amount received indicating means, of bill receiving means and operating the amount received means to show the amount of the bill deposited in the machine, exposed sale and change indicating mechanism and keys for actuating the sale indicating mechanism to show the amount of sale and the change indicating mechanism to show the change required, said combination showing the amount of bill, the amount of sale and the amount of change at the same time.

51. In a machine of the character described, the combination with a bill receiving mechanism, an exposed amount received indicating device to show the amount of the bill received, an exposed sale and change indicating means, keys for operating the same, and manually operated means for exposing the bill and discharging the amount of coin shown by the change indicating device.

52. In a machine of the character described, the combination with a connected series of bill receptacles, all adapted to receive bills of the same denomination and all of which are normally within the casing and closed against access thereto, of means for bringing different receptacles into position and projecting the positioned receptacle from the casing and opening the same.

53. In a machine of the character described having a casing provided with an aperture for the passage of a bill receptacle outward therethrough, the combination with said casing, of a series of bill receptacles movably mounted in operative relation to said aperture, means for moving said buckets to bring one of the series at a time to register with said aperture and means for projecting said positioned receptacle outward through the casing.

54. In a machine of the character described, the combination with an "amount received" indicating device, of a connected series of bill receptacles all designed and adapted to receive bills of the same denomination, all of which are normally inaccessible, of manually operated devices for moving the series of receptacles and bringing them one at a time into accessible position, said manually operated means being connected with the said indicating device for operating the same to show the amount of the bill or bills deposited in the said receptacles.

55. In a machine of the character described, the combination with a plurality of series of connected bill receiving receptacles, each series designed and adapted to receive bills of the same denomination, all of said receptacles being normally within the casing and inaccessible, of manually operated means to actuate each series separately and project the receptacles one at a time out from said casing to give access thereto.

56. In a machine of the kind described, the combination with a plurality of series of bill buckets normally inaccessible, of a lever for each series for bringing a bucket of each series to an accessible position, holding means for holding each of said levers from moving to make its associated bill bucket accessible, a clerk indicating drum, keys for actuating said clerk drum and means whereby a movement of said clerk drum releases the said levers.

57. In a machine of the character described, the combination with a plurality of series of bill receiving buckets normally inaccessible, of keys for putting one of the buckets of a series in an accessible condition and returning it to inaccessible condition, a series of sale keys and a further means for reversing one or more series of buckets and putting one of the buckets of each series in accessible condition.

58. In a machine of the character described, the combination with a plurality of series of bill receiving receptacles normally inaccessible, of keys one for each series for momentarily putting one receptacle of the series in accessible condition, sales keys and a further means for reversing one of said series, and for putting one receptacle of each series in accessible condition.

59. In a machine of the character described, the combination with amount received, sale, change and clerk indicating devices, of means for actuating said clerk indicating device, means for restoring all of said indicating devices to normal or zero position controlled by the said means for operating said clerk indicating device.

60. In a machine of the character described, the combination with means for restoring the parts moved out of normal position in one transaction to normal position, of a clerk indicating device, a lever for operating said clerk indicating device, keys for actuating said lever, devices connecting said lever with the normalizing means for setting the normalizing means into operation, said connecting devices including means for holding said lever from actuating the clerk indicating device until the action of the normalizing mechanism is completed.

61. In a machine of the character described, the combination with a mechanism for normalizing all parts out of normal position at the close of each transaction, of the clerk indicating device, means for actuating the same including a lever and keys for moving said lever and means connected with said lever for causing the initial pressure of said keys upon the said lever to first normalize the parts out of position, and a continuance of the pressure to actuate the clerk indicating device.

62. In a machine of the character described, the combination with a series of closed bill carrying buckets, means for projecting the said bill carrying buckets singly and means for opening said buckets when projected to give access thereto.

63. In a machine of the character specified, the combination with sprocket gears, of a sprocket chain, a series of bill receiving buckets carried by said sprocket chain members, means for operating said sprocket gears in two directions, means for selecting the direction of movement of the sprocket gears, and setting means for the selecting means.

64. In a machine of the character specified having an inclosing or machine casing, the combination with bill carrying buckets, of manually operated means for projecting said buckets individually from the casing, and a further means for projecting the said buckets, said further means being in addition to said manual means and operating independently therefrom.

65. In a machine of the character described, the combination with sprocket gears, of a sprocket chain composed of pivotally connected members, bill receiving buckets carried by said members and means for actuating said sprocket gears and chain.

66. In a machine of the character described, the combination with a casing, of a series of bill carrying buckets within said casing, a manually operated means for projecting said buckets singly from the casing of the machine, and additional means for simultaneously projecting a number of buckets from said casing.

67. In a machine of the character described, the combination with a series of bill receiving buckets and coin receiving receptacles, of devices for discharging coins for change and for projecting a bucket containing bills, sale keys for positioning said devices, and a crank shaft and connections for actuating said devices.

68. In a machine of the character described, a bill receiving means comprising an outer casing and a bill receptacle within said casing, means for moving said outer casing to different positions within the machine and means for moving said bill receptacle in said outer casing.

69. In a machine of the character described having an inclosing casing provided with openings in the same, the combination with said inclosing casing, of a bill receiving means comprising an outer casing and a bill receptacle within said outer casing, the said outer casing being movable to different positions in the inclosing casing and means for moving the bill receptacle in said outer casing and outward through one of the openings in said inclosing casing.

70. In a machine of the character specified, having an inclosing or machine casing having openings therein, the combination with said inclosing casing, of a bill bucket comprising an outer casing, a bill receptacle within it, a device for closing said inner bill receptacle and means for removing said closing device and projecting said bill receptacle outward through one of the openings in said inclosing casing.

71. In a machine of the character described, the combination with the machine or inclosing casing, of a sprocket chain movably mounted within said casing, a bill receiving means mounted on and moving with said chain, a closing device for said bill receiving means, means for properly positioning said bill receiving device and means for moving said closing device and projecting the said bill receiving means outward through openings in the machine casing.

72. In a machine of the character described, the combination with a sprocket chain, of buckets carried thereby, each having a closing device and an actuating device for said buckets, said actuating device having a rectilinear movement and a bucket opening device forming part of the actuating device.

73. In a machine of the character described, the combination with the machine casing, of a chain of buckets within said casing, a manually operated device for projecting said buckets outward beyond said casing, and a further means for projecting said buckets acting independently of the manually operated means.

74. In a machine of the character described, the combination with the machine casing, of sprocket gearing, a bucket chain carried thereby, means for moving the chain in one direction and projecting a bucket outward through the casing and means for moving the chain in the reverse direction.

75. In a machine of the character described, the combination with two shafts provided with a plurality of sprocket wheels arranged in pairs, of sprocket chains mounted on said sprocket wheels, a series of bill receiving buckets mounted on each chain and means for moving said chains and buckets in either direction.

76. In a machine of the character described, the combination with an inclosing casing, having openings thereon, of a sprocket chain carrying bill receiving buckets, a manually operated means for moving said chain of buckets and an independently operated manual means for projecting the buckets from the casing.

77. In a machine of the character described, the combination with sprocket chains and bill receiving buckets consisting of an outer casing connected to said chain and an inner casing, means for actuating said chain in one direction, and means for moving it in the reverse direction combined with means for projecting the inner casing of said buckets.

78. In a machine of the character described, the combination with a coin receiving chute, having an opening therein, of a coin stamping mechanism adapted to engage a coin in said chute through said opening, and means for operating said coin stamping mechanism.

79. In a machine of the character described, the combination with a coin receiving chute having an opening therein, of a coin stamping device adapted to engage a coin in said chute through said opening, said stamping device being provided with a plurality of marking characters, means to position said marking characters and means to impress the positioned character upon a coin.

80. In a machine of the character specified, the combination with an amount received indicating device, of coin operated mechanism for operating the same, coin discharging mechanism, exposed sale indicating devices, sale keys for operating the sale indicating devices and positioning a part of the coin discharging mechanism and manually operated means for actuating the coin discharging mechanism.

81. In a machine of the character described, the combination with a clerk indicating device, of a coin receiving chute having an opening therein, a coin stamping or marking device adapted to engage a coin through the opening in said chute, said coin marking device including a part having the same characters thereon as the clerk indicating device and connected with the same for joint movement and means to operate the clerk indicating device and means for forcing the stamping or marking device against the coin.

82. In a machine of the character described, the combination with a clerk indicating means, of a coin marking device having marking characters corresponding with those of the clerk indicating means, the two connected for joint movement, a coin chute to receive coins, a stop for arresting and holding the coin in said coin chute and means for actuating said clerk indicating device and for forcing the marking device against a coin in said chute and means for removing the stop from holding said coin.

83. In a machine of the character described, the combination with a coin receiving chute having an opening therein, of a coin marking device adapted to engage a coin through said opening, means operating said coin marking device consisting of a shaft adapted to be rotated and reciprocated, and means to rotate said shaft and to reciprocate the same.

84. In a machine of the character described, the combination with a coin receiving chute, a stop for the coin within said chute, a rotary marking device adapted to engage a coin within said chute, means for rotating said marking device and means for disengaging said marking device from its rotating means and forcing it into contact with the coin.

85. In a machine of the character described, the combination with a coin receiving chute having an opening therein, a stop for holding a coin opposite said opening, a movable printing or marking device for engaging a coin when held by said stop, means for moving said marking device toward and away from said chute and coin and means whereby said stop is released as the marking device moves away from the coin.

86. In a machine of the character described, the combination with amount received, sale and change indicating devices for each transaction of operative mechanism therefor, adapted to be connected with the amount received and change indicating devices and thereafter disconnected from the amount received indicating devices and connected with the sale and change indicating device, means for operating said connecting mechanism in one direction and thereafter in a reverse direction and normalizing mechanism for said indicating devices.

87. In a machine of the character described, the combination with amount received, sale and change indicating devices, of operating mechanism adapted to be connected with the amount received and change indicating devices and thereafter to be connected with the sale and change indicating devices, normalizing devices for said indicating device and means connecting said normalizing devices and the indicating operating devices for returning said operating devices to connection with the amount received and change indicating devices.

88. In a machine of the character specified, the combination of coin receptacles, individual release mechanism for said coin receptacles, comprised in part of slides, a selector having means for moving the same laterally bodily to move the slides to effect the release of the selected coins, and a plurality of lifters operating upon said slides for lifting two or more of said slides clear of the path of the selector.

89. In a machine of the character described, the combination with a mechanism for stamping each coin received, of a mechanism for stamping and depositing a paper with each bill received, a clerk indicating device, clerk keys and connecting mechanism for simultaneously positioning said indicating device and stamping mechanisms.

90. In a machine of the class described, the combination with a mechanism for stamping a clerk's indicating character on each coin received, of a mechanism for stamping a clerk's indicating character on a paper and depositing it with each bill deposited, a clerk indicating device, clerk keys and connecting devices for positioning the indicating device and the stamping mechanisms and operating devices for said stamping mechanisms.

91. In a machine of the character described, the combination with a clerk indicating device, keys for actuating the same, sale keys and means connected therewith for giving said clerk indicating device a further movement.

92. In a machine of the character described, the combination with a series of coin receiving receptacles, of means connected with each receptacle for discharging coins therefrom, actuating devices for such discharging means, including a plurality of sliding bars, means for actuating all of said sliding bars when in operative position, and means for moving all of said bars into a position in which they cannot be engaged by said actuating means after each transaction.

93. In a machine of the character described, the combination with a series of coin holding receptacles, of a discharging slide for each receptacle, means for actuating said discharging slides, including a plurality of sliding bars, means for actuating said sliding bars when in operative position, and means for simultaneously moving said sliding bars into a position in which they cannot be engaged by their said actuating means.

94. In a machine of the character described, the combination with a series of coin holding receptacles, of a discharging slide for each receptacle, means for actuating said slides including a plurality of sliding bars, means for actuating said sliding bars, means for moving said sliding bars at the close of each movement of the actuating means out of operative position, a clerk indicating device, actuating means therefor and connections for moving the said sliding bars into operative position when the clerk indicating device is actuated.

95. In a machine of the character described, the combination with a clerk indicating device, a coin marking device, a slip stamping device, a series of keys for actuating said clerk indicating device to show clerk indicating characters, and means for bringing the character shown on the clerk indicating device into operative position on the coin marking and on the slip stamping devices.

96. In a machine of the character described, the combination with a clerk indicating device, a coin marking device, a slip stamping device, keys for simultaneously positioning all of said devices, and actuating devices for said marking and stamping devices acting independently of said keys.

97. In a machine of the character described, the combination with a clerk indicating device, of a coin marking device, a slip stamping device, all connected for joint movement, and a clerk key for actuating the same whereby all of said devices are simultaneously positioned.

98. In a machine of the character described, the combination with a series of coin holding receptacles, of mechanism for discharging coins from said receptacles, including a series of sliding bars connected with the coin engaging slides for actuating the same, a rotary selecting device, sale keys connected with said selector for rotating the same, a positive lock called into action after the selector has been rotated, a crank shaft and connecting means for moving the selector.

99. In a machine of the character described, the combination with a series of bill receiving buckets, levers for moving said bill buckets to give access thereto, a shaft provided with arms for holding said levers from movement to expose said bill buckets and locking means for locking said shaft from movement.

100. In a machine of the class described, the combination with a series of bill receiving buckets, levers for moving said bill buckets to give access thereto, a shaft provided with arms for holding said levers from movement to expose said bill buckets, locking means for said shaft, a series of clerk keys and connections for unlocking said shaft.

101. In a machine of the character described, the combination with change making mechanism, of a rotary device provided with peripheral selecting projections for engaging parts of said change making mechanism to actuate the same, sale keys for positioning the said rotary device, means for positively locking said rotary device from rotation, a crank shaft and connecting means for moving said selecting device laterally.

102. In a machine of the character described, the combination with sale and change indicating devices, of change making devices, a rotary device forming a part of the mechanism for operating said indicating devices, sale keys for positioning said rotary device, a device for positively locking said rotary device from rotation, and means for moving said rotary device laterally to actuate the change making mechanism.

103. In a machine of the character described, the combination with a main crank shaft, of bill carrying mechanism having buckets for holding and carrying bills, mechanism for projecting said bill buckets and means for actuating the bucket projecting mechanism from the crank shaft.

104. In a machine of the character described, the combination with the inclosing casing, of bill receiving devices comprised in part of movable buckets, means for moving said buckets in one direction, means for projecting said buckets from the casing, and a crank shaft for operating said bucket projecting means.

105. In a machine of the character described, the combination with an inclosing casing, of a plurality of series of bill carrying buckets, means for projecting a single bucket from said casing, a crank shaft and mechanism connected therewith for simultaneously projecting a single bucket of each series.

106. In a machine of the character described, the combination with an inclosing casing, of a plurality of series of bill carrying buckets, means for moving all of the buckets of one series in one direction and projecting a single bucket of such series from said casing.

107. In a machine of the character described, the combination with an inclosing casing, of a plurality of series of bill carrying buckets, means for moving all the buckets of one series, and projecting a single bucket of the series from the casing, a crank shaft and means connected therewith for projecting a single bucket of each series from the casing.

108. In a machine of the character described, the combination with an inclosing casing provided with a plurality of openings therein, of a series of bill carrying buckets for each opening, means for projecting a single bucket through the opening in the casing in line therewith, means for retracting such bucket and connections with said retracting means to move the series of which the projected bucket forms a part to bring another bucket in line with the same opening.

109. In a machine of the character described, the combination with an inclosing casing having a series of openings therein, of a series of bill carrying buckets for each opening, means for positioning a single bucket of each series in line with its opening, means for projecting said buckets outward through said openings, and a closing device for each bucket when within the casing, whereby access to said buckets is prevented except when projected.

110. In a machine of the character described, the combination with an inclosing casing having a plurality of openings therein, of a movable series of bill carrying buckets for each opening, means for projecting and retracting a single bucket of one series and a connected mechanism for moving said retracted bucket away from its opening, means for moving one of said series of buckets in the reverse direction and projecting a bucket of each series from the casing.

111. In a machine of the character described, the combination of a plurality of series of bill receiving and carrying buckets, means for projecting individual buckets, and independent means for simultaneously projecting a bucket of each series.

112. In a machine of the character described, the combination with a plurality of series of bill receiving and carrying buckets, of means for projecting an individual bucket, a crank shaft and means connected therewith for simultaneously projecting a bucket of each series.

113. In a machine of the character described, the combination with a plurality of series of bill receiving and carrying buckets, of means for projecting an individual bucket of any series, a crank shaft, and means connected therewith for simultaneously projecting a bucket of each series.

114. In a machine of the character described, the combination with a clerk indicating mechanism, of cash and a credit printing device for each clerk, clerk keys for actuating the clerk indicating device and connections for selecting the credit printing device, money receiving devices and connections for changing the printing device from credit to cash, sale keys for positioning the printing device to print the amount of sale, a crank shaft and connections for making the printing impression.

115. In a machine of the character described, the combination with bill receiving and carrying bill buckets, of means for positioning said bill buckets, a main crank shaft and connections to actuate the positioning device and project the bill buckets.

116. In a machine of the character described, the combination with the main crank shaft, of bill buckets, a device for positioning said bill buckets, a bill bucket projecting mechanism, a printing device and means whereby the crank shaft effects the printing and actuates the positioning and projecting mechanism.

117. In a machine of the character described, the combination with a series of drums arranged in a line from side to side of the machine, of a locking mechanism comprising among its members, a bar extending parallel with said line of drums, said bar being movable longitudinally and having a fin for each drum for engaging a recess in said drum.

118. In a machine of the character described, the combination with a drum, of means for rotating the same, means for moving the same laterally, locking means therefor and means for throwing said locking means into action when the bodily movement of the drum takes place.

119. In a machine of the character specified, the combination with a drum, of means for rotating the drum, means for moving the drum bodily, locking means for the drum, a pivoted lever for actuating said locking means, and means for swinging said lever upon the bodily movement of the drum.

120. In a machine of the character described, the combination with a series of drums arranged in a line from side to side of the machine, of locking means for all of said drums comprising among its members a bar extending parallel with a series of drums and having a fin to engage a recess in each drum, means for moving said series of drums bodily toward the rear of the machine and means for moving said bar to lock all of said drums.

121. In a machine of the character specified, the combination with a cents distributing device comprising a series of chutes of varying sizes, and a distributing chute with a step-by-step means for moving the same.

122. In a machine of the character specified, the combination of cents distributing device, comprising a series of chutes of varying sizes, and a distributing chute, a step-by-step means for moving said distributing chute, and means for effecting the step-by-step movement.

123. In a machine of the character described, the combination with a series of sale keys, of a credit registering device, and a cash registering device for each clerk, clerk keys and means for bringing the clerks credit registering device into operative relation with said sale keys, money receiving devices and mechanism connected therewith for bringing the clerks cash registering device into operative relations with the sale keys.

124. In a machine of the class described, the combination with an amount received indicating device provided with sections for indicating units and tens of cents, chutes for receiving cent, five cent and ten cent, twenty-five and fifty cent coins, two shafts one connected with the tens and the other with the units of cents sections of the indicating device, one of said shafts having arms adapted to be engaged by ten and fifty cent coins when inserted to move said shaft, the other shaft having arms adapted to be engaged by cent and five cent coins when inserted to move the last named shaft and means adapted to be engaged by twenty-five cent coins when inserted to move both of said shafts.

125. In a machine of the character described, the combination with an amount received indicating device having sections for indicating units and tens of cents, of chutes for receiving cent, five cent, ten cent, twenty-five cent and fifty cent coins, a shaft for operating the units section, a shaft for operating the tens section, and means for actuating said shafts, whereby the cent and five cent coins when inserted by the hand of the operator will engage parts of said means and actuate the shafts connected with the units section, means whereby the ten and fifty cent coins when inserted in like manner will engage parts of said means and actuate the shaft connected with the tens section, and means whereby a twenty-five cent coin when inserted will engage other parts and actuate both of said shafts.

126. In a machine of the character described, the combination with an indicating device and a key mechanism for actuating the same to show the word "Charge" when a sale is made, of money receiving devices and connections to cause the said indicating device to move so as to show the word "Cash" instead of "Charge" on the insertion of money in the machine.

127. In a machine of the character described, the combination with an indicating device, a spring controlled lever and keys for moving said lever to actuate said indicating device, to show the word "Charge" when a sale is made, an arm pivoted to engage said lever when in normal position, bill receiving devices and coin receiving devices and means connecting each of said money receiving devices with said pivoted arm to cause it to move the said indicating device to show the word "Cash" on the insertion of bills or coins in the machine.

128. In a machine of the character described, the combinat  with a series of rotary devices adapted to be moved during the operation of the machine for a single transaction and mutilated gears secured to said rotary devices, of a shaft having an actuating gear for each of said mutilated gears, said actuating gears being normally out of engagement with the same, means for moving said shaft to bring the actuating gears into mesh with the mutilated gears, and means for actuating said shaft when its gears are in mesh, the mutilated gears and their attached devices being brought to normal position when the actuating gears reach the untoothed portion of the mutilated gears.

129. In a machine of the character described, the combination with rotary parts adapted to be operated during the operation of the machine for a single transaction, and mutilated gears secured thereto, of a shaft having actuating gears for said mutilated gears normally out of mesh with the same, a weight and connections for operating said actuating gears and means for bringing said actuating gears into mesh with said mutilated gears.

130. In a machine of the character described, the combination with rotary parts adapted to be rotated during the operation of the machine for a single transaction and mutilated gears secured thereto, of a shaft having actuating gears for said mutilated gears, said actuating gears being normally out of mesh with the same, a weight for actuating said shaft, means for moving said shaft to bring the actuating gears into mesh with the mutilated gears, a crank shaft and means for rewinding said weight.

131. In a machine of the kind described, the combination with rotary devices adapted to be rotated during the operation of the machine for a single transaction and mutilated gears secured thereto, of a shaft having actuating gears for said mutilated gears normally out of mesh with the same, a series of clerk keys and connections for moving said shaft to bring the actuating gears in mesh with said mutilated gears and means for operating said shaft.

132. In a machine of the kind described, the combination with rotary devices adapted to be rotated during the operation of the machine for a single transaction and mutilated gears secured thereto, of a shaft carrying actuating gears for said mutilated gears, means for actuating said shaft, means normally holding said actuating gears out of mesh with said mutilated gears and from movement, clerk keys and means connected therewith for moving said shaft to bring said actuating gears into mesh with said mutilated gears and permit the rotation thereof.

In testimony that I claim the foregoing as my invention I have signed my name in presence of the subscribing witnesses this 18th day of January, 1907.

MONTFORD P. MORRISON.

Witnesses:
C. E. MULREANY,
A. WORDEN GIBBS.